(12) United States Patent
Kondo et al.

(10) Patent No.: US 9,335,512 B2
(45) Date of Patent: *May 10, 2016

(54) IMAGE CAPTURING LENS AND IMAGE CAPTURING APPARATUS PROVIDED WITH THE IMAGE CAPTURING LENS

(71) Applicant: FUJIFILM Corporation, Tokyo (JP)

(72) Inventors: Masato Kondo, Saitama-ken (JP); Takayuki Noda, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 14/328,260

(22) Filed: Jul. 10, 2014

(65) Prior Publication Data

US 2014/0313599 A1 Oct. 23, 2014

Related U.S. Application Data

(60) Division of application No. 14/068,565, filed on Oct. 31, 2013, now Pat. No. 8,810,924, which is a continuation of application No. PCT/JP2012/008355, filed on Dec. 27, 2012.

(60) Provisional application No. 61/607,933, filed on Mar. 7, 2012.

(30) Foreign Application Priority Data

Dec. 28, 2011 (JP) .................. 2011-287193
Jun. 28, 2012 (JP) .................. 2012-145172

(51) Int. Cl.
*G02B 9/60* (2006.01)
*G02B 13/00* (2006.01)

(52) U.S. Cl.
CPC .............. *G02B 9/60* (2013.01); *G02B 13/0045* (2013.01)

(58) Field of Classification Search
CPC ............. G02B 13/0045; G02B 13/001; G02B 13/002; G02B 9/60
See application file for complete search history.

(56) References Cited

U.S. PATENT DOCUMENTS 8,810,924 B2 * 8/2014 Kondo .................. G02B 9/60
359/714
2007/0229984 A1 10/2007 Shinohara
2012/0087019 A1 4/2012 Tang et al.
2013/0003195 A1 1/2013 Kubota et al.
2013/0057973 A1 3/2013 Kubota et al.

FOREIGN PATENT DOCUMENTS

CN 202110325 1/2012
JP 2007-264180 10/2007

(Continued)

OTHER PUBLICATIONS

International Search Report, PCT/JP2012/008355, Apr. 23, 2013.

*Primary Examiner* — David N Spector
(74) *Attorney, Agent, or Firm* — Young & Thompson

(57) ABSTRACT

An image capturing lens which substantially consists of five lenses, composed of a first lens having a positive refractive power with the object side surface being formed in a convex shape toward the object side, a second lens having a negative refractive power, a third lens having a positive refractive power, a fourth lens having a negative refractive power with the object side surface being formed in a concave shape toward the object side, and a fifth lens having a negative refractive power with a region in which the negative refractive power is gradually reduced outwardly in a radial direction from the optical axis, arranged in this order from the object side, and satisfies predetermined conditional expressions.

33 Claims, 24 Drawing Sheets

(56) References Cited

FOREIGN PATENT DOCUMENTS

| | | |
|---|---|---|
| JP | 2007-298572 | 11/2007 |
| JP | 2010-256608 | 11/2010 |
| JP | 2011-085733 | 4/2011 |
| JP | 2013-011710 | 1/2013 |
| JP | 2013-054099 | 3/2013 |

* cited by examiner

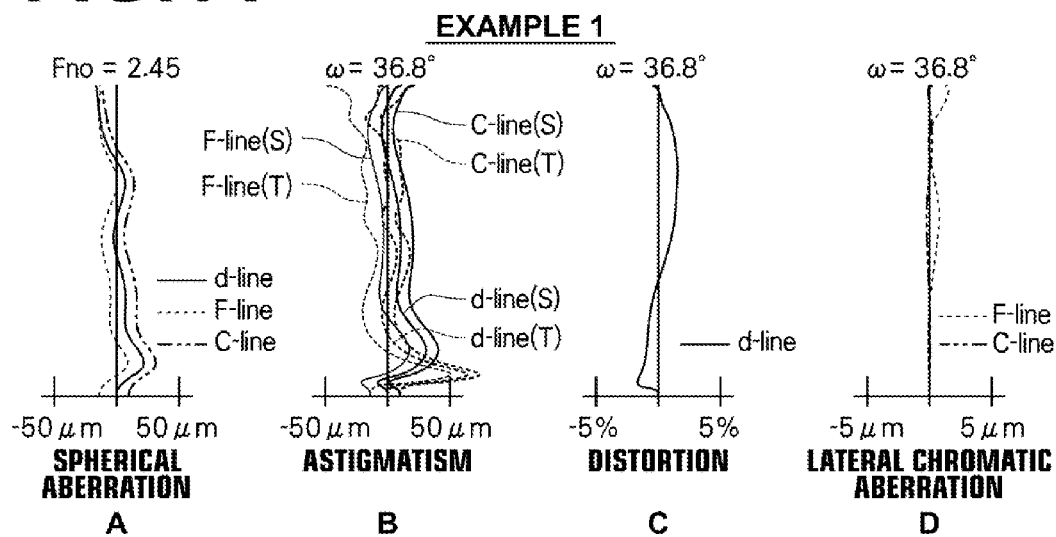
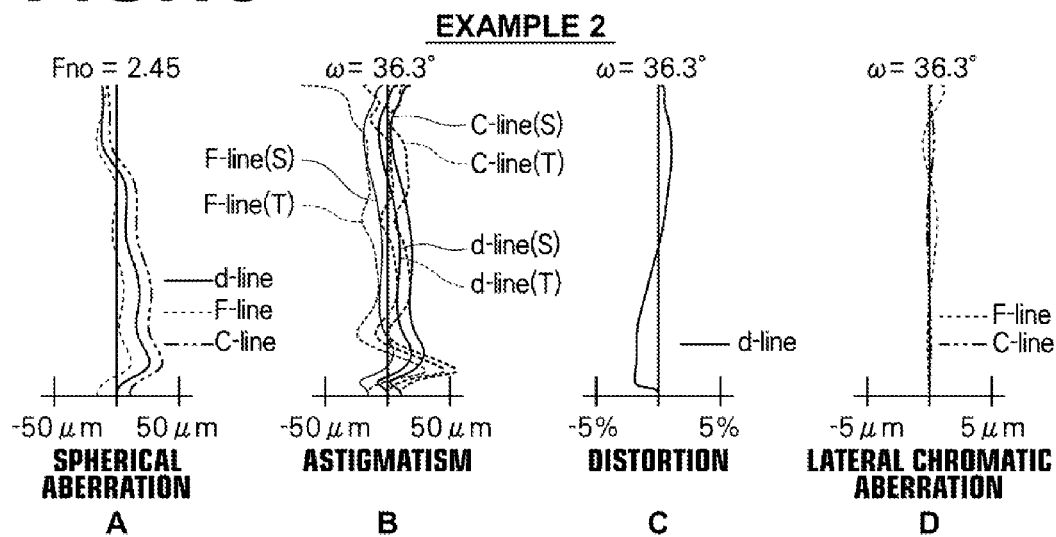

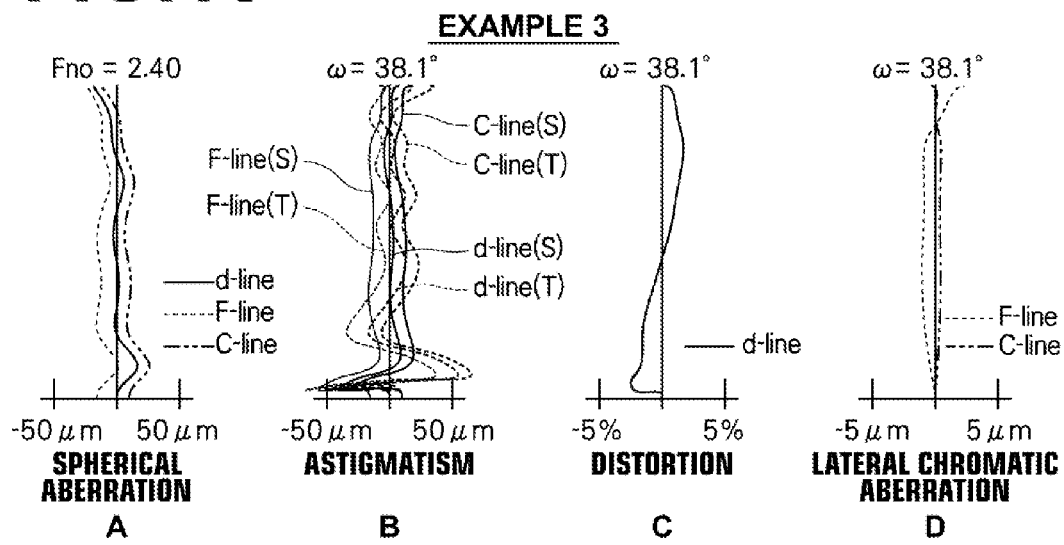
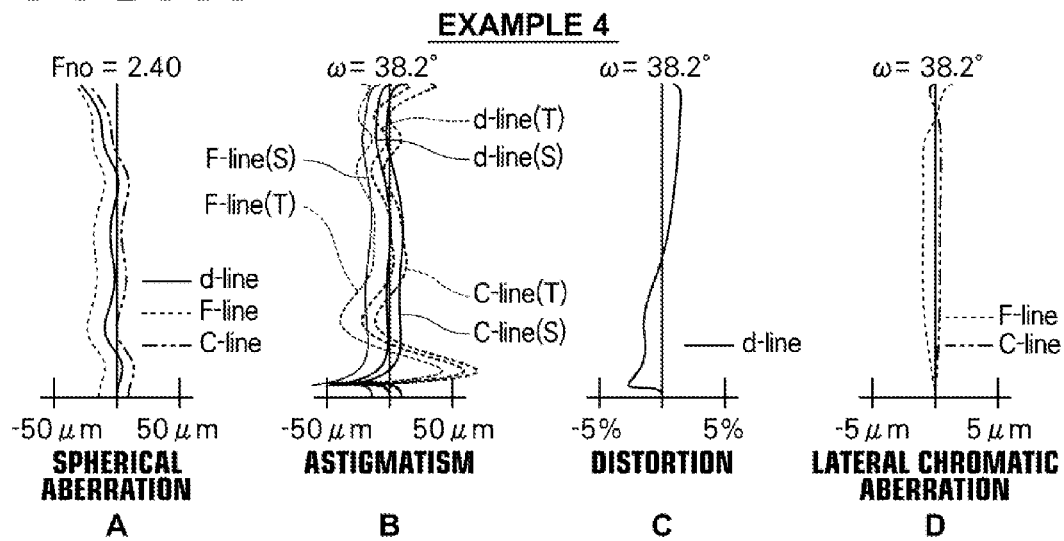

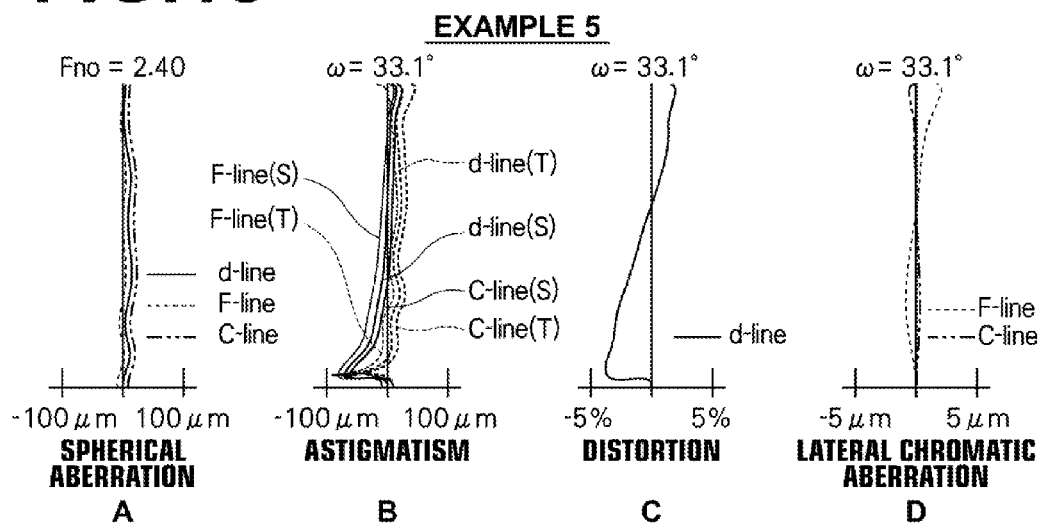
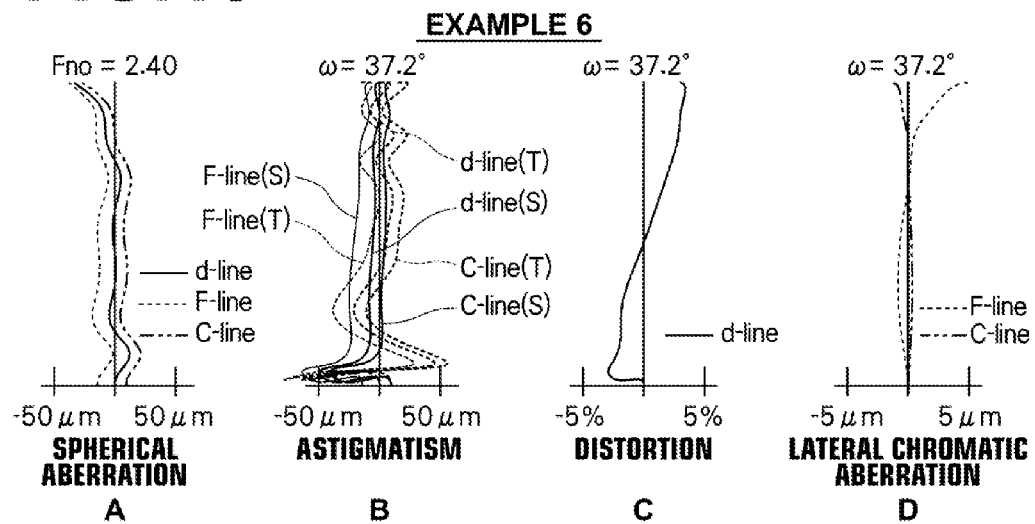

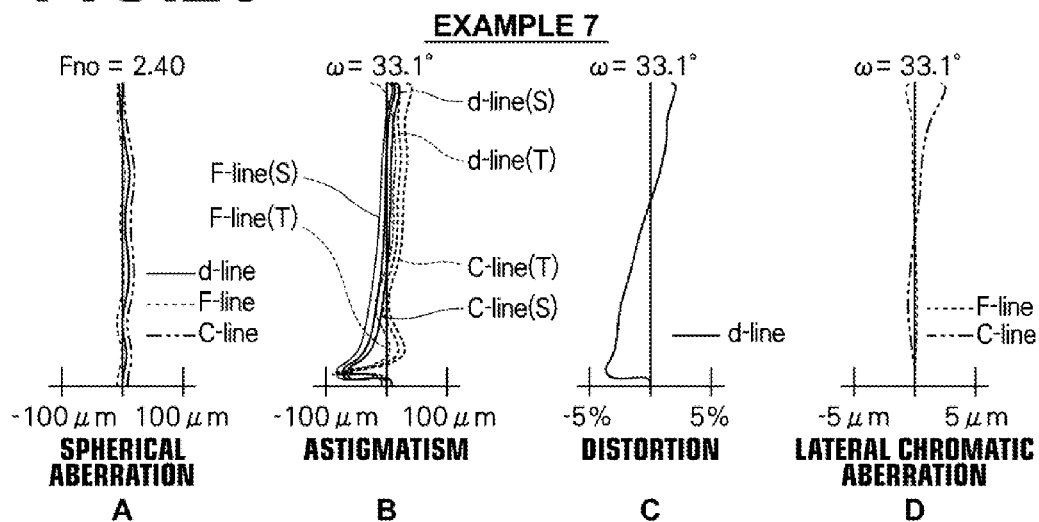
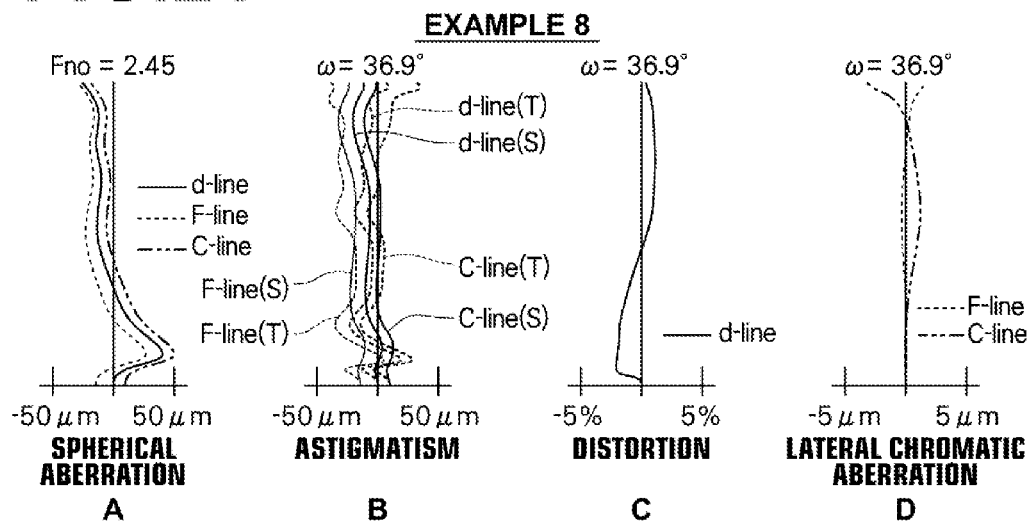

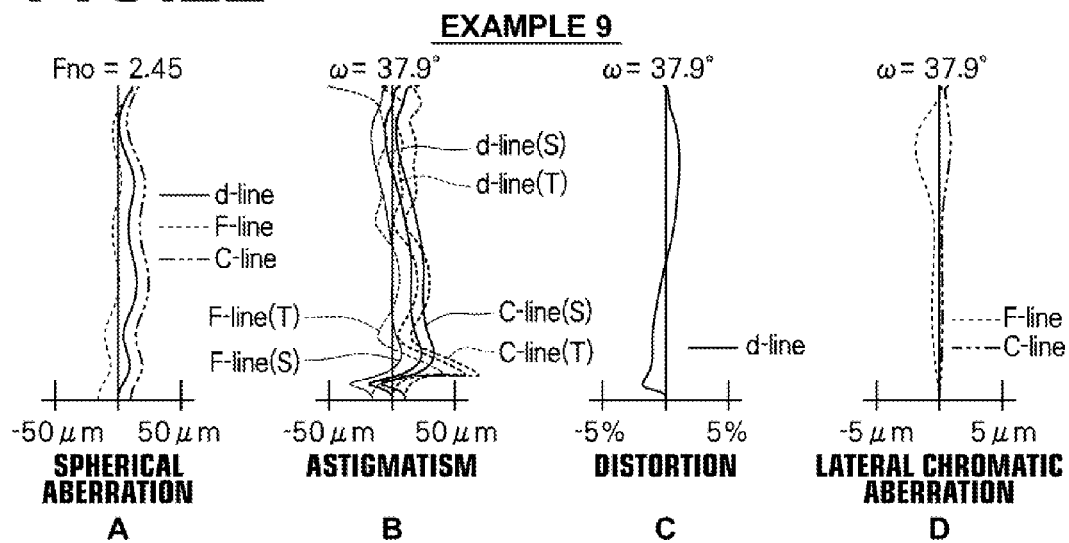
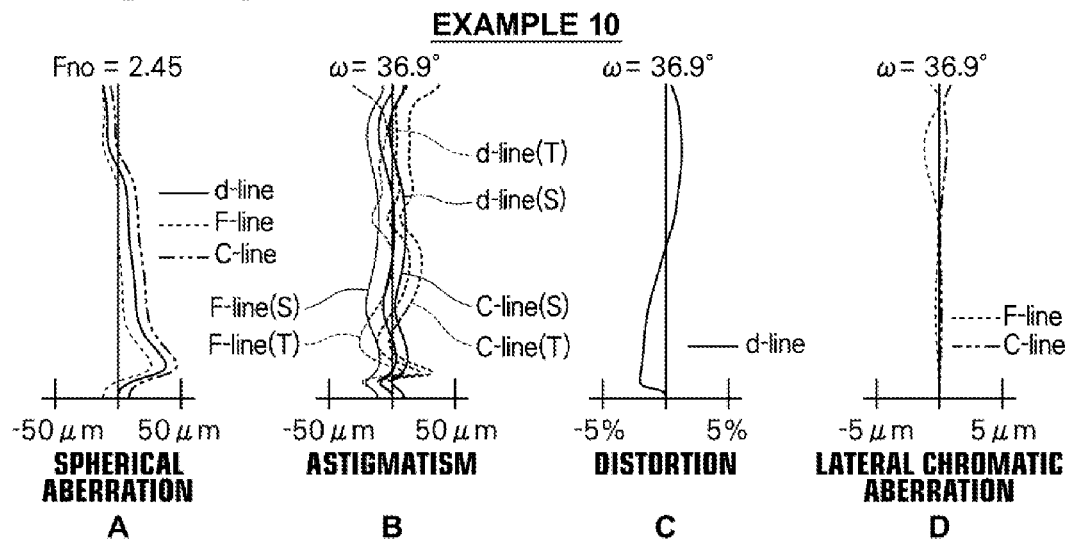

EXAMPLE 11

EXAMPLE 12

EXAMPLE 13

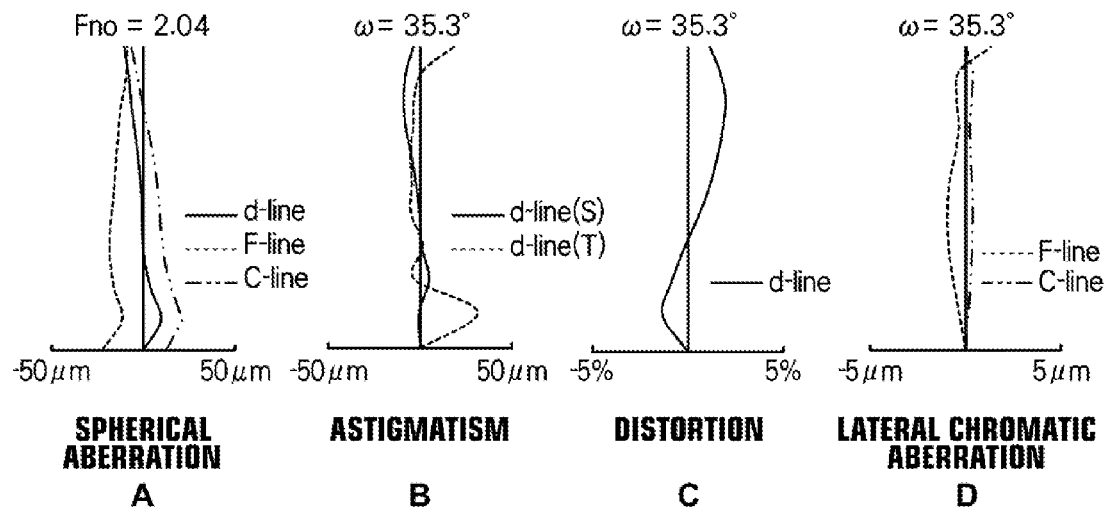
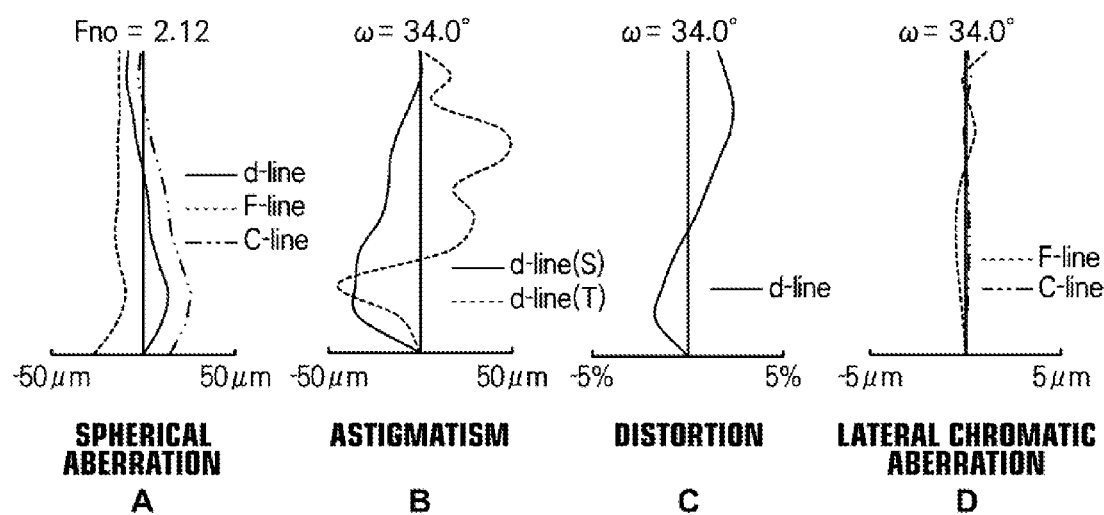

IMAGE CAPTURING LENS AND IMAGE CAPTURING APPARATUS PROVIDED WITH THE IMAGE CAPTURING LENS

BACKGROUND OF THE INVENTION

1. Field of the Invention

The present invention relates to an image capturing lens for forming an optical image of a subject on an image sensor, such as a CCD (Charge Coupled Device), CMOS (Complementary Metal Oxide Semiconductor), or the like, and an image capturing apparatus having the image capturing lens mounted thereon to perform image capturing, such as a digital still camera, camera-equipped cell phone, personal digital assistance (PDA), smartphone, tablet terminal, portable video game player, or the like.

2. Description of the Related Art

Recently, along with the spread of personal computers to homes and the like, digital still cameras capable of inputting image information obtained by imaging a landscape, a person, or the like to a personal computer have been spreading rapidly. In addition, more and more cell phones, smartphones, or tablet terminals have built-in camera modules for inputting images. Such devices with image capturing capabilities employ image sensors such as CCDs, CMOSs, and the like. Recently, these types of image sensors have been downsized greatly and, consequently, image capturing devices as a whole and image capturing lenses to be mounted on such devices have also been required to have more compact sizes. At the same time, the pixel count of image sensors has been increasing, thereby causing a growing demand for improvement of image capturing lenses in resolution and performance. For example, performance corresponding to high pixel counts, such as more than 2 mega pixels (MP), more preferably more than 5 MP, and further preferably more than 8 MP, is demanded.

For such demands, it is conceivable to employ a five-lens configuration having a relatively large number of lenses in order, for example, to achieve the reduction in overall length and the improvement in resolution (refer to Japanese Unexamined Patent Publication No. 2007-264180, Japanese Unexamined Patent Publication No. 2007-298572, Japanese Unexamined Patent Publication No. 2010-256608, Japanese Unexamined Patent Publication No. 2011-85733, Chinese Utility Model No. 202110325, and U.S. Patent Application No. 2012/087019).

SUMMARY OF THE INVENTION

The five-element lenses described in Japanese Unexamined Patent Publication No. 2007-264180, Japanese Unexamined Patent Publication No. 2007-298572, Japanese Unexamined Patent Publication No. 2010-256608, Japanese Unexamined Patent Publication No. 2011-85733, Chinese Utility Model No. 202110325, and U.S. Patent Application No. 2012/087019, however, require more satisfactory correction in longitudinal chromatic aberration. The image capturing lens described in Japanese Unexamined Patent Publication No. 2010-256608 requires further reduction in overall length. The image capturing lens described in Japanese Unexamined Patent Publication No. 2011-85733 requires more satisfactory correction in field curvature. The image capturing lens described in Chinese Utility Model No. 202110325 requires further reduction in overall length and more satisfactory correction in distortion.

The present invention has been developed in view of the circumstances described above and it is an object of the present invention to provide an image capturing lens well corrected, in particular, in longitudinal chromatic aberration and chromatic aberration in a peripheral region of the image forming area, thereby capable of realizing high image forming performance from the central angle of view to the peripheral angle of view with reduced overall length. It is a further object of the present invention to provide an image capturing apparatus with the image capturing lens mounted thereon and capable of capturing a high resolution image.

An image capturing lens of the present invention is an image capturing lens substantially consisting of five lenses, composed of:

an aperture stop;

a first lens having a positive refractive power with the object side surface being formed in a convex shape toward the object side;

a second lens having a negative refractive power;

a third lens having a positive refractive power;

a fourth lens having a negative refractive power with the object side surface being formed in a concave shape toward the object side; and a fifth lens having a negative refractive power with a region in which the negative refractive power is gradually reduced outwardly in a radial direction from the optical axis, arranged in this order from the object side, wherein the image capturing lens is configured to satisfy a conditional expression given below:

$$4.2 < f3/f1 < 25.0 \tag{1},$$

where:

f1 is a focal length of the first lens; and f3 is a focal length of the third lens.

According to the image capturing lens of the present invention, the structure of each lens element is optimized in a lens configuration of five lenses in total, so that a lens system having high resolution performance may be realized while the overall length is reduced. Particularly, the image capturing lens is configured such that the focal lengths of the first and third lenses satisfy the expression (1), so that the powers of the first and third lenses can be balanced and various types of aberrations, including spherical aberration and astigmatism, may be corrected satisfactorily, while the overall length is reduced.

In the image capturing lens of the present invention, further adoption and satisfaction of following preferable configurations may further improve the optical performance.

Preferably, the image capturing lens according to a first aspect of the present invention satisfies any of the conditional expressions (2) to (10) given below. As for a preferable aspect, the lens may satisfy any one or any combination of the conditional expressions (2) to (10), provided, however, that it is preferable that the conditional expressions (5) and (6) are satisfied simultaneously.

$$4.2 < f3/f1 < 20.0 \tag{1-1}$$

$$-4.0 < f2/f1 < -1.8 \tag{2}$$

$$-3.5 < f2/f1 < -1.8 \tag{2-1}$$

$$0.09 < D6/f < 0.20 \tag{3}$$

$$0.09 < D6/f < 0.18 \tag{3-1}$$

$$2.00 < D6/D8 < 6.00 \tag{4}$$

$$2.20 < D6/D8 < 5.60 \tag{4-1}$$

$$vd1 > 50 \tag{5}$$

$$vd1 > 53 \quad (5\text{-}1)$$

$$vd2 < 30 \quad (6)$$

$$vd2 < 25 \quad (6\text{-}1)$$

$$0.09 < D2/D1 < 0.25 \quad (7)$$

$$0.09 < D2/D1 < 0.22 \quad (7\text{-}1)$$

$$3.0 < |R3/f2| < 40.0 \quad (8)$$

$$3.3 < |R3/f2| < 35.0 \quad (8\text{-}1)$$

$$1.0 < TL/f < 1.2 \quad (9)$$

$$1.05 < TL/f < 1.15 \quad (9\text{-}1)$$

$$-1.9 < (R7-R8)/(R7+R8) < 0 \quad (10)$$

where:
  f1 is a focal length of the first lens;
  f2 is a focal length of the second lens;
  f3 is a focal length of the third lens;
  D6 is a distance between the third and fourth lenses on the optical axis;
  f is a focal length of the entire system;
  D8 is a distance between the fourth and fifth lenses on the optical axis;
  vd1 is an Abbe number of the first lens with respect to the d-line;
  vd2 is an Abbe number of the second lens with respect to the d-line;
  D1 is an axial thickness of the first lens;
  D2 is a distance between the first and second lenses on the optical axis;
  R3 is a paraxial radius of curvature of the object side surface of the second lens;
  TL is a length from the object side surface of the first lens to the image forming surface on the optical axis;
  R7 is a paraxial radius of curvature of the object side surface of the fourth lens; and
  R8 is a paraxial radius of curvature of the image side surface of the fourth lens.

Note that an air equivalent value is used for the back focus in the length TL from the object side surface of the first lens to the image forming surface on the optical axis. For example, in the case where a member having no power, such as a filter, cover glass, or the like, is inserted between the most image side lens and image forming surface, the thickness of the member is calculated by air conversion.

In the image capturing lens according to the first aspect of the present invention, it is preferable that the third lens has a convex surface on the object side near the optical axis.

Further, in the image capturing lens according to the first aspect of the present invention, it is preferable that the fifth lens has a meniscus shape with a convex surface on the object side near the optical axis.

The term "substantially consisting of five lenses" as used in the image capturing lens described above refers to that the image capturing lens of the present invention includes a lens substantially without any power, an optical element other than a lens, such as an aperture stop, cover glass, or the like, a lens flange, a lens barrel, an image sensor, and a mechanism, such as a camera-shake correction mechanism or the like, other than the five lenses.

The image capturing apparatus of the present invention is an image capturing apparatus provided with the image capturing lens of the present invention.

According to the image capturing apparatus of the present invention, a high resolution image signal may be obtained based on a high resolution optical image obtained by the image capturing lens of the present invention.

According to the image capturing lens of the present invention, the structure of each lens element is optimized in a lens configuration of five lenses in total. The image capturing lens is configured, in particular, such that the dispersion of the second lens becomes appropriate in addition to the appropriate setting of ratios between focal lengths of the third and first lenses and between focal lengths of the fourth and fifth lenses. This allows the realization of a lens system well corrected, in particular, in the longitudinal chromatic aberration and has high image forming performance from the central to peripheral angles of view, while the overall length is reduced.

Further, according to the image capturing apparatus of the present invention, an image capturing signal is outputted according to an optical image formed by the high performance image capturing lens of the present invention described above, so that a high resolution image may be captured.

BRIEF DESCRIPTION OF THE DRAWINGS

FIG. 14 shows aberration diagrams illustrating various types of aberrations of the image capturing lens according to Example 1 of the present invention, in which A illustrates spherical aberration, B illustrates astigmatism (field curvature), C illustrates distortion, and D illustrates lateral chromatic aberration.

FIG. 15 shows aberration diagrams illustrating various types of aberrations of the image capturing lens according to Example 2 of the present invention, in which A illustrates spherical aberration, B illustrates astigmatism (field curvature), C illustrates distortion, and D illustrates lateral chromatic aberration.

FIG. 16 shows aberration diagrams illustrating various types of aberrations of the image capturing lens according to Example 3 of the present invention, in which A illustrates spherical aberration, B illustrates astigmatism (field curvature), C illustrates distortion, and D illustrates lateral chromatic aberration.

FIG. 17 shows aberration diagrams illustrating various types of aberrations of the image capturing lens according to Example 4 of the present invention, in which A illustrates spherical aberration, B illustrates astigmatism (field curvature), C illustrates distortion, and D illustrates lateral chromatic aberration.

FIG. 18 shows aberration diagrams illustrating various types of aberrations of the image capturing lens according to Example 5 of the present invention, in which A illustrates spherical aberration, B illustrates astigmatism (field curvature), C illustrates distortion, and D illustrates lateral chromatic aberration.

FIG. 19 shows aberration diagrams illustrating various types of aberrations of the image capturing lens according to Example 6 of the present invention, in which A illustrates spherical aberration, B illustrates astigmatism (field curvature), C illustrates distortion, and D illustrates lateral chromatic aberration.

FIG. 20 shows aberration diagrams illustrating various types of aberrations of the image capturing lens according to Example 7 of the present invention, in which A illustrates spherical aberration, B illustrates astigmatism (field curvature), C illustrates distortion, and D illustrates lateral chromatic aberration.

FIG. 21 shows aberration diagrams illustrating various types of aberrations of the image capturing lens according to Example 8 of the present invention, in which A illustrates spherical aberration, B illustrates astigmatism (field curvature), C illustrates distortion, and D illustrates lateral chromatic aberration.

FIG. 22 shows aberration diagrams illustrating various types of aberrations of the image capturing lens according to Example 9 of the present invention, in which A illustrates spherical aberration, B illustrates astigmatism (field curvature), C illustrates distortion, and D illustrates lateral chromatic aberration.

FIG. 23 shows aberration diagrams illustrating various types of aberrations of the image capturing lens according to Example 10 of the present invention, in which A illustrates spherical aberration, B illustrates astigmatism (field curvature), C illustrates distortion, and D illustrates lateral chromatic aberration.

FIG. 30 shows aberration diagrams illustrating various types of aberrations of the image capturing lens according to Example 14 of the present invention, in which A illustrates spherical aberration, B illustrates astigmatism (field curvature), C illustrates distortion, and D illustrates lateral chromatic aberration.

FIG. 31 shows aberration diagrams illustrating various types of aberrations of the image capturing lens according to Example 15 of the present invention, in which A illustrates spherical aberration, B illustrates astigmatism (field curvature), C illustrates distortion, and D illustrates lateral chromatic aberration.

DESCRIPTION OF THE PREFERRED ASPECTS

Hereinafter, an aspect of the present invention will be described in detail with reference to the accompanying drawings.

Figure 1:
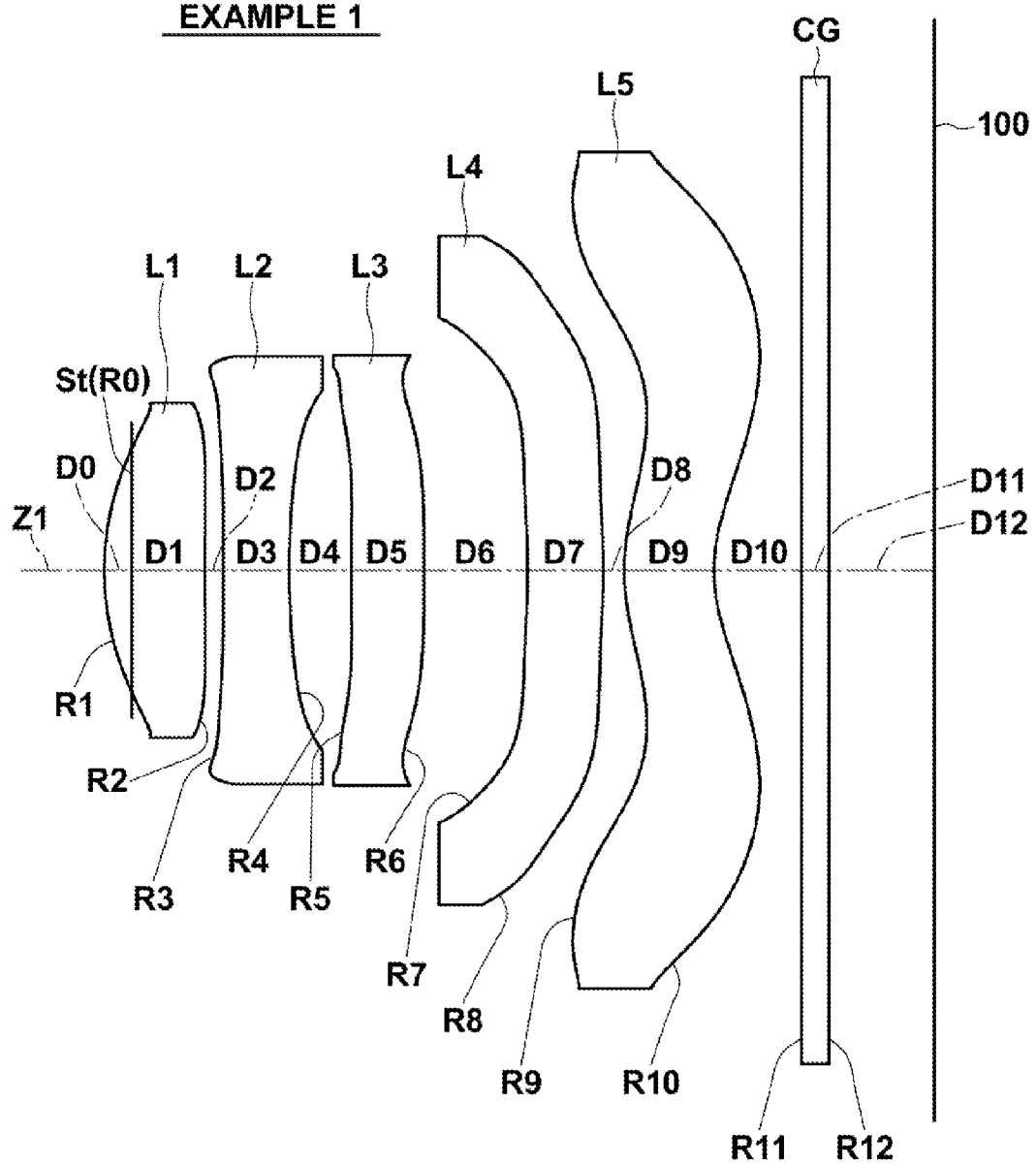
FIG. 1 illustrates a first configuration example of the image capturing lens according to an aspect of the present invention, which is a cross-sectional view of a lens corresponding to Example 1.

FIG. 1 illustrates a first configuration example of the image capturing lens according to a first aspect of the present invention. This configuration example corresponds to the lens configuration of a first numerical example (Table 1, Table 14) to be described later. Likewise, configurations of image capturing lenses according to second to thirteenth aspects, which correspond to the lens configurations of the second to thirteenth numerical examples (Tables 2 to 13 and Tables 15 to 26) to be described later, are illustrated, in cross-section, in FIGS. 2 to 13 respectively. Further, the configurations of image capturing lenses according to the fourteenth and fifteenth aspects, which correspond to the lens configurations of the fourteenth to fifteenth numerical examples (Tables 28 to 31), are illustrated, in cross section, in FIGS. 28 and 29 respectively. In FIGS. 1 to 13, 28, and 29, the symbol Ri represents a radius of curvature of $i^{th}$ surface, which is sequentially increased toward the image side (image forming side) with the most object side lens element surface being taken as the first surface. The symbol Di represents a surface distance between the $i^{th}$ surface and $(i+1)^{th}$ surface on the optical axis Z1. As the basic configuration is the same in each configuration example, the description will be made hereinafter based on the configuration example illustrated in FIG. 1 and configuration examples of FIGS. 2 to 13, 28, and 29 will be described as required.

An image capturing lens L according to an aspect of the present invention is suitably applied to various types of image capturing devices that use an image sensor, such as CCD or CMOS. It is particularly useful for relatively small portable terminal devices, such as digital still cameras, camera-equipped cell phones, and PDAs, smartphones or tablet terminals, and the like. The image capturing lens L has an aperture stop St, a first lens L1, a second lens L2, a third lens L3, a fourth lens L4, and a fifth lens L5 arranged in this order from the object side along the optical axis Z1.

Figure 27:
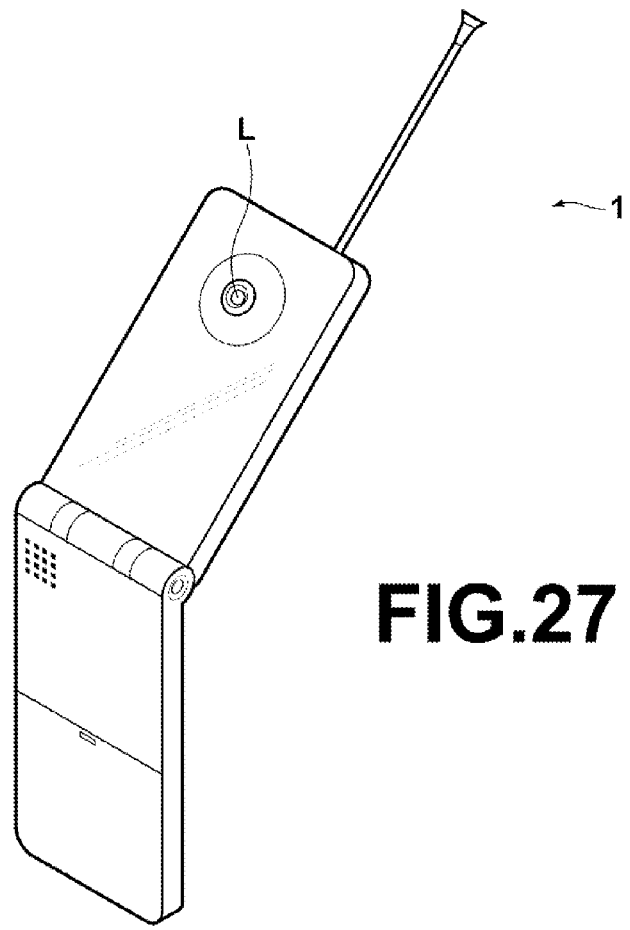
FIG. 27 illustrates an image capturing apparatus which is a cell phone terminal provided with the image capturing lens of the present invention.

FIG. 27 illustrates an overview of a cell phone terminal which is an image capturing apparatus 1 according to an aspect of the present aspect. The image capturing apparatus 1 according to an aspect of the present invention includes the image capturing lens L according to the present aspect and an image sensor 100 (FIG. 1) such as a CCD that outputs image capturing signal according to an optical image formed by the image capturing lens L. The image sensor 100 is disposed on the image forming surface (image capturing surface) of the image capturing lens L.

Figure 33:
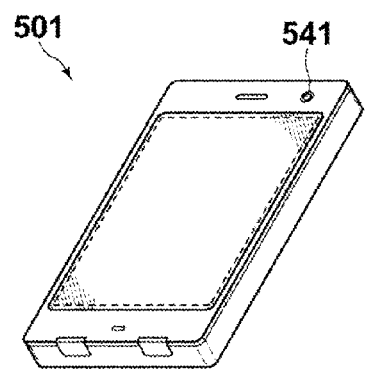
FIG. 33 illustrates an image capturing apparatus which is a smartphone terminal provided with the image capturing lens of the present invention.

FIG. 33 illustrates an overview of a smartphone which is an image capturing apparatus 501 according to an aspect of the present invention. The image capturing apparatus 501 includes a camera section 541 having the image capturing lens L according to the present aspect and an image sensor 100 (FIG. 1) such as a CCD that outputs image capturing signal according to an optical image formed by the image capturing lens L. The image sensor 100 is disposed on the image forming surface (image capturing surface) of the image capturing lens L.

Figure 32:
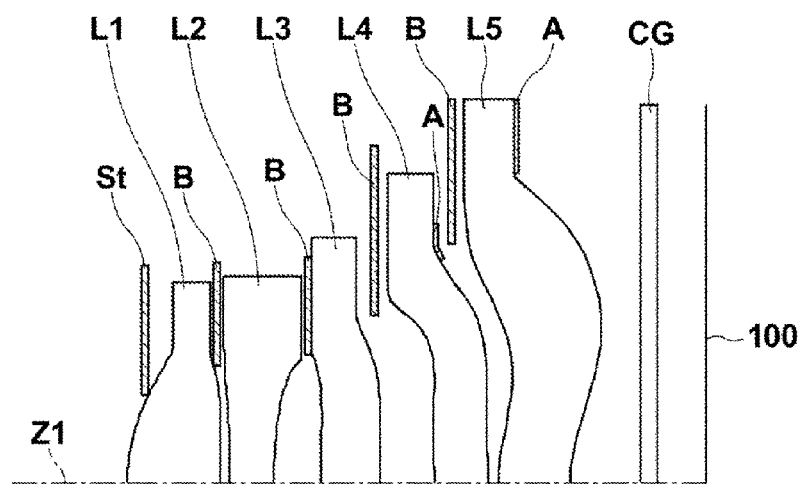
FIG. 32 illustrates an example flare blocking method for blocking a light flux not contributing to image formation in the image capturing lens of the present invention.

FIG. 32 illustrates an example flare blocking method for blocking a light flux not contributing to image formation in the image capturing lens according to an aspect of the present invention. FIG. 32 is an enlarged view of only the upper portion of the cross-sectional view of the lens of the fourteenth aspect (FIG. 28) from the optical axis Z1. As the light flux passing through the outside of the effective diameter of the image capturing lens and not contributing to image formation sometimes becomes harmful on the image forming surface, a method in which a flare stop is inserted between each lens at a position outside of the effective diameter is generally used in order to remove such light flux not contributing to image formation. In the image capturing lens shown in FIG. 32, an aperture stop St is provided on the object side of the first lens L1 so as to be located outside of effective diameter of the first lens and a flare stop B is provided between each adjacent lens of the first lens L1 to fifth lens L5 so as to be located outside of effective diameter of each lens. Further, in FIG. 32, a flare blocking coating A is applied to the region outside of the effective diameter of the image side surface of each of the fourth lens L4 and fifth lens L5. Application of the flare blocking coating to a desired region outside of the effective diameter of each lens in the manner described above allows light beams not contributing to image formation to be blocked satisfactorily even in a region where flare blocking is difficult by the flare stop alone due to the shape of the flare stop or installation space restrictions.

Various types of optical members CG may be disposed between the fifth lens L5 and image sensor 100 according to the structure on the camera side to which the lens is mounted. For example, a plate-like optical member, such as a cover glass for protecting the image capturing surface or an infrared cut filter may be disposed. In this case, for example, a plate-like cover glass with a coating applied thereon having a filtering effect, such as an infrared cut filter or ND filter, may be used as the optical member CG.

Further, the optical member CG may be omitted and the fifth lens L5 may be provided with a coating to have an effect identical to that of the CG. This may contribute to the reduction in the number of components used and reduction in overall length.

The image capturing lens L also has an aperture stop St. The aperture stop St is an optical aperture stop and a so-called "front aperture stop" in which the aperture stop is disposed on the most object side. The term "front aperture stop" as used herein refers to that the aperture stop is disposed, in an optical axis direction, at a position corresponding to the intersection point between the axial marginal ray and object side surface of the first lens L1 or on the object side of the intersection point. In the present aspect, lenses of the first to fifteenth configuration examples (FIGS. 1 to 13, 28, and 29) are configuration examples corresponding to the front aperture stop. Disposition of the front aperture stop St in the manner described above allows a longer distance to be set between the image forming surface and the pupil relative to the overall length, whereby the incident angle on the image sensor is reduced and higher optical performance is realized. Further, the overall length may be maintained short relative to the focal length and the overall length may be reduced satisfactorily.

Preferably, the image capturing lens L uses an aspherical surface on at least one surface of each of the first lens L1 to fifth lens L5 for performance improvement.

In the image capturing lens L, the first lens L1 has a positive refractive power near the optical axis. The object side surface of the first lens L1 is formed in a convex shape toward the object side near the optical axis. In this way, by forming the object side surface of the first lens L1, which plays a major image forming function, in a convex shape toward the object side, the first lens may have a sufficient power and the overall lens length may be reduced satisfactorily.

The second lens L2 has a negative refractive power near the optical axis.

The third lens L3 has a positive refractive power near the optical axis. Preferably, the object side surface of the third lens L3 is formed in a convex shape toward the object side near the optical axis. By forming the object side surface of the third lens L3 in a convex shape toward the object side allows longitudinal chromatic aberration to be corrected satisfactorily. In order to further enhance the advantageous effect, it is more preferable that the third lens L3 is formed in a bi-convex shape. Further, the third lens L3 may by formed in a meniscus shape with a convex shape on the object side near the optical axis. In the case where the third lens L3 is formed in a meniscus shape with a convex shape on the object side near the optical axis, the overall length may be reduced more satisfactorily.

Further, the third lens L3 may be formed in a meniscus shape with a convex surface on the image side near the optical axis. In this case, astigmatism may be corrected satisfactorily.

The fourth lens L4 has a negative refractive power near the optical axis. The object side surface of the fourth lens L4 is formed in a concave shape toward the object side near the optical axis. By forming the object side surface of the fourth lens L4 in a concave shape toward the object side near the optical axis, peripheral brightness falloff may be prevented.

The fifth lens L5 has a negative refractive power near the optical axis. Further, the fifth lens L5 has a region in which the negative refractive power is gradually reduced outwardly in a radial direction from the optical axis. In the case where the fifth lens L5 has a region in which the negative refractive power is gradually reduced outwardly in a radial direction from the optical axis, the incident angle on the image forming surface (image sensor) of a light beam passing through the optical system may be prevented from increasing. The term "the negative refractive power is gradually reduced outwardly in a radial direction from the optical axis" as used herein may be, on a surface having at least one concave region near the optical axis, that a negative refractive power is gradually reduced outwardly in a radial direction from the optical axis in any way, and it may be, for example, that a positive refractive power is gradually increased outwardly in a radial direction from the optical axis. For example, in the image capturing lenses shown in FIGS. 1 to 13, 28, and 29, the image side surface of the fifth lens L5 has a region in which the concave shape toward the image side is gradually changed to the convex shape, whereby the negative refractive power of the image side surface of the fifth lens L5 is gradually reduced outwardly in a radial direction from the optical axis. In this way, it is advantageous to correct various types of aberrations, in particular, spherical aberration and longitudinal chromatic aberration by forming the fifth lens to have a negative refractive power. Preferably, the fifth lens has a meniscus shape with a convex surface on the object side near the optical axis. In the case where the fifth lens has a meniscus shape with a convex surface on the object side near the optical axis, the spherical aberration and longitudinal chromatic aberration may be corrected more satisfactorily.

Preferably, each of the lenses L1 to L5 constituting the image capturing lens L is not a cemented lens but a single lens. This provides more aspherical surfaces in comparison with the case in which any of the lenses L1 to L5 is a cemented lens, resulting in higher design flexibility and the overall length may be reduced satisfactorily.

The function and advantageous effects of the image capturing lens L configured in the manner described above with respect to conditional expressions will be described in detail.

First, the focal length f3 of the third lens and focal length f1 of the first lens satisfy a conditional expression (1) given below.

$$4.2 < f3/f1 < 25.0 \quad (1).$$

The conditional expression (1) defines a preferable numerical value range of the ratio of the focal length f3 to the focal length f1 of the first lens when the image capturing lens L of the present invention is arranged in each configuration. If the ratio exceeds the upper limit of the conditional expression (1), the positive refractive power of the first lens L1 becomes too strong with respect to the entire lens system and it is difficult to sufficiently correct spherical aberration. If the ratio falls below the lower limit of the conditional expression (1), the positive refractive power of the third lens L3 becomes too strong relative to the first lens L1 and it is difficult to sufficiently correct astigmatism. Hence, by satisfying the range of the conditional expression (1), various aberrations may be corrected satisfactorily while the overall length of the lens system is reduced. From the viewpoint described above, it is more preferable that a conditional expression (1-1) given below is satisfied and it is further preferable that a conditional expression (1-2) given below is satisfied.

$$4.2 < f3/f1 < 20.0 \quad (1\text{-}1)$$

$$5.0 < f3/f1 < 20.0 \quad (1\text{-}2)$$

Preferably, the ratio of the focal length f2 of the second lens to the focal length f1 of the first lens L1 satisfies a conditional expression (2) given below.

$$-4.0 < f2/f1 < -1.8 \quad (2)$$

The conditional expression (2) defines a preferable numerical value range of the ratio of the focal length f2 of the second lens to the focal length f1 of the first lens. If the ratio exceeds the upper limit of the conditional expression (2), the negative refractive power of the second lens L2 having a major negative refractive function in the entire lens system becomes too strong relative to the positive refractive power of the first lens L1 having a major positive refractive function in the entire lens system thereby causing an increase in the spherical aberration and a difficulty in reducing the overall lens length. If the ratio falls below the lower limit of the conditional expression (2), the negative refractive power of the second lens L2 becomes too weak relative to the positive refractive power of the first lens L1, thereby causing a disadvantage in correcting chromatic aberration. Further, if the ratio falls below the lower limit of the conditional expression (2), it is difficult to correct astigmatism and to prevent peripheral brightness falloff. Hence, by satisfying the range of the conditional expression (2) above, various types of aberrations, such as chromatic aberration, astigmatism, spherical aberration, and the like may be corrected satisfactorily while the overall length of the lens system is reduced. From the viewpoint described above, it is more preferable that a conditional expression (2-1) given below is satisfied and it is further preferable that a conditional expression (2-2) given below is satisfied.

$$-3.5 < f2/f1 < -1.8 \quad (2\text{-}1)$$

$$-3.2 < f2/f1 < -1.8 \quad (2\text{-}2)$$

Preferably, the distance D6 between the third lens L3 and fourth lens L4 on the optical axis and the focal length f of the entire system satisfy a conditional expression (3) given below.

$$0.09 < D6/f < 0.20 \quad (3)$$

The conditional expression (3) defines a preferable numerical value range of the ratio of the distance D6 between the third lens L3 and fourth lens L4 on the optical axis to the focal length f of the entire system. If the ratio exceeds the upper limit of the conditional expression (3), the overall lens length is increased. If the ratio falls below the lower limit of the conditional expression (3), the thickness of the air lens formed by the gap between the image side surface of the third lens L3 and the object side surface of the fourth lens L4 is reduced and high resolution performance may not be obtained due to insufficient correction of various types of aberrations, in particular, field curvature, though it is advantageous for reducing the overall lens length. Hence, by satisfying the range of the conditional expression (3), various aberrations, including field curvature and the like, may be corrected satisfactorily while the overall length of the lens system is reduced. From the view point described above, it is more preferable that a conditional expression (3-1) is satisfied and it is further preferable that a conditional expression (3-2) given below is satisfied.

$$0.09 < D6/f < 0.18 \qquad (3\text{-}1)$$

$$0.09 < D6/f < 0.16 \qquad (3\text{-}2)$$

Preferably, the distance D6 between the third lens L3 and fourth lens L4 on the optical axis and the distance D8 between the fourth lens L4 and fifth lens L5 on the optical axis satisfy a conditional expression (4) given below.

$$2.00 < D6/D8 < 6.00 \qquad (4)$$

The conditional expression (4) defines a preferable numerical value range of the ratio between the distance D8 between the fourth lens L4 and fifth lens L5 and the distance D6 between the third lens L3 and fourth lens L4. If the ratio exceeds the upper limit of the conditional expression (4), the thickness of the air lens formed by the small gap between the image side surface of the fourth lens L4 and the object side surface of the fifth lens L5 becomes too thin relative to the thickness of the air lens formed by the gap between the image side surface of the third lens L3 and the object side surface of the fourth lens L4, thereby causing a difficulty in sufficiently correcting spherical aberration. If the ratio falls below the lower limit of the conditional expression (4), it is difficult to sufficiently correct astigmatism and field curvature. By satisfying the conditional expression (4), various types of aberrations, such as spherical aberration, astigmatism, field curvature, and the like may be corrected satisfactorily. From the view point described above, it is more preferable that a conditional expression (4-1) given below is satisfied and it is further preferable that a conditional expression (4-2) given below is satisfied.

$$2.20 < D6/D8 < 5.60 \qquad (4\text{-}1)$$

$$2.30 < D6/D8 < 5.40 \qquad (4\text{-}2)$$

Preferably, the Abbe number vd1 of the first lens L1 with respect to the d-line and the Abbe number vd2 of the second lens L2 with respect to the d-line satisfy conditional expressions (5) and (6) respectively.

$$vd1 > 50 \qquad (5)$$

$$vd2 < 30 \qquad (6)$$

The conditional expressions (5) and (6) defines a preferable numerical value range of the Abbe number vd1 of the first lens L1 with respect to the d-line and the Abbe number vd2 of the second lens L2 with respect to the d-line respectively when the image capturing lens L of the present invention is arranged in each configuration in the first aspect of the present invention. Satisfaction of the conditional expressions (5) and (6) simultaneously may provide advantages in chromatic aberration correction. As such, it is more preferable that either of the conditional expressions (5-1) and (6-1) is satisfied and it is further preferable that the conditional expressions (5-1) and (6-1) are satisfied simultaneously.

$$vd1 > 53 \qquad (5\text{-}1)$$

$$vd2 < 25 \qquad (6\text{-}1)$$

Preferably, the axial thickness D1 of the first lens L1 and the distance D2 between the first lens L1 and second lens L2 on the optical axis satisfy a conditional expression (7) given below.

$$0.09 < D2/D1 < 0.25 \qquad (7)$$

The conditional expression (7) defines a preferable numerical value range of the ratio of the distance D2 between the first lens L1 and second lens L2 on the optical axis to the axial thickness D1 of the first lens L1. If the ratio exceeds the upper limit of the conditional expression (7), it is difficult to sufficiently correct chromatic aberration. If the ratio falls below the lower limit of the conditional expression (7), it is difficult to sufficiently correct spherical aberration, though it is advantageous for correcting chromatic aberration. Hence, by satisfying the range of the conditional expression (7), the chromatic aberration may be corrected satisfactorily. From the view point described above, it is more preferable that a conditional expression (7-1) given below is satisfied and it is further preferable that a conditional expression (7-2) given below is satisfied.

$$0.09 < D2/D1 < 0.22 \qquad (7\text{-}1)$$

$$0.09 < D2/D1 < 0.20 \qquad (7\text{-}2)$$

Preferably, the ratio of the paraxial radius of curvature R3 of the object side surface of the third lens L3 to the focal length f2 of the second lens L2 satisfies a conditional expression (8) given below.

$$3.0 < |R3/f2| < 40.0 \qquad (8)$$

The conditional expression (8) defines a preferable numerical value range of the ratio of the paraxial radius of curvature of the object side surface of the third lens L3 to the focal length f2 of the second lens L2. If the ratio exceeds the upper limit of the conditional expression (8), it is difficult to sufficiently correct astigmatism. If the ratio falls below the lower limit, it is difficult to sufficiently correct longitudinal chromatic aberration. By satisfying the range of the conditional expression (8), the astigmatism and longitudinal chromatic aberration may be corrected satisfactorily. From the view point described above, it is more preferable that a conditional expression (8-1) given below is satisfied.

$$3.3 < |R3/f2| < 35.0 \qquad (8)$$

Preferably, the ratio of the length TL from the object side surface of the first lens L1 to the image forming surface to the focal length f of the entire lens system satisfies a conditional expression (9) given below.

$$1.0 < TL/f < 1.2 \qquad (9)$$

The conditional expression (9) defines a preferable numerical value range of the ratio of the length TL from the object side surface of the first lens L1 to the image forming surface to the focal length f of the entire lens system. Note that an air equivalent value is used for the back focus in the length TL from the object side surface of the first lens to the image forming surface on the optical axis. For example, in the case where a member having no power, such as a filter, cover glass, or the like, is inserted between the most image side lens and image forming surface, the thickness of the member is calculated by air conversion. The term "overall lens length" as used herein refers to the length TL from the object side surface of the first lens to the image forming surface on the optical axis. If the ratio exceeds the upper limit of the conditional expression (9), the overall length of the lens system TL becomes too large and disadvantageous for reducing the overall length of the lens system TL. If the ratio falls below the lower limit, it is difficult to obtain high resolution performance due to a difficulty in sufficiently correcting various types of aberrations, though it is advantageous for reducing the overall length TL. Hence, by satisfying the conditional expression (9), various types of aberrations may be corrected satisfactorily while the overall length of the lens system TL is reduced.

From the viewpoint described above, it is more preferable that a conditional expression (9-1) given below is satisfied.

$$1.05 < TL/f < 1.15 \quad (9\text{-}1)$$

Preferably, the paraxial radius of curvature R7 of the object side surface of the fourth lens L4 and the paraxial radius of curvature R8 of the image side surface of the fourth lens L4 satisfy a conditional expression (10) given below.

$$-1.9 < (R7-R8)/(R7+R8) < 0 \quad (10)$$

The conditional expression (10) defines a preferable numerical value range with respect to the paraxial radius of curvature R7 of the object side surface of the fourth lens L4 and the paraxial radius of curvature R8 of the image side surface of the fourth lens L4. If they exceed the upper limit of the conditional expression (10), it is difficult to sufficiently correct various types of aberrations, in particular, astigmatism, though it is desirable to prevent a decrease in the relative illumination. If they fall below the lower limit, it is difficult to sufficiently prevent a decrease in the relative illumination. Hence, by satisfying the range of the conditional expression (10), various types of aberration may be corrected satisfactory while a decrease in the relative illumination is prevented.

As described above, according to the image capturing lens L according to an aspect of the present invention, the structure of each lens element is optimized in a lens configuration of five lenses in total, in which, in particular, the ratio between the focal lengths of the third and first lens is set appropriately. This allows the realization of a lens system well corrected, in particular, in the spherical aberration and astigmatism, and has high image forming performance with a small F-number, while the overall length is reduced.

Further, by satisfying preferable conditions, higher image forming performance may be realized. Further, according to the image capturing apparatus according to the present aspect, an image capturing signal is outputted according to an optical image formed by the high performance image capturing lens L of the present aspect, so that a high resolution image may be captured from the central to peripheral angles of view.

Next, specific numerical examples of the image capturing lens according to an aspect of the present invention will be described. Hereinafter, a plurality of numerical examples will be described collectively.

Tables 1 and 14, to be shown later, indicate specific lens data corresponding to the configuration of image capturing lens shown in FIG. 1, in which Table 1 mainly indicates basic lens data while Table 14 indicates data with respect to the aspherical surfaces. The column of surface number Si in the lens data shown in Table 1 indicates $i^{th}$ surface number of Example 1, which is sequentially increased toward the image side with the most object side lens element surface being taken as the first surface (the aperture stop St being taken as the $0^{th}$ surface). The column of radius of curvature Ri indicates the value of radius of curvature (mm) of $i^{th}$ surface from the object side, the symbol Ri being corresponding to the symbol Ri in FIG. 1. Likewise, the column of surface distance Di indicates the distance between $i^{th}$ surface Si and $(i+1)^{th}$ surface Si+1 on the optical axis (mm). The column of Ndj indicates the value of refractive index of $j^{th}$ optical element from the object side with respect to the d-line (587.56 nm). The column of vdj indicates the Abbe number of $j^{th}$ optical element with respect to the d-line.

In the image capturing lens according to Example 1, each of the first lens L1 to fifth lens L5 has an aspherical shape on both sides. In the basic lens data in Table 1, the values of radii of curvature near the optical axis (paraxial radii of curvature) are indicated as the radii of curvature of these aspherical surfaces.

Table 14 indicates aspherical surface data of image capturing lens of Example 1. In the values indicated as the aspherical surface data, the symbol "E" represents that the subsequent value is a base-10 "exponent" and the numerical value preceding the symbol "E" is multiplied by the numerical value represented by the base-10 exponent function. For example, "1.0E-02" is "$1.0 \times 10^{-2}$".

As for the aspherical surface data, a value of each of coefficients Ai and K in the aspherical surface expression represented by the formula (A) given below is indicated. More specifically, Z is a length of a perpendicular line drawn from a point on the aspherical surface at a height h from the optical axis to a tangent plane to the apex of the aspherical surface (plane orthogonal to the optical axis) (mm).

$$Z = C \cdot h^2 / \{1 + (1 - K \cdot C^2 \cdot h^2)^{1/2}\} + \Sigma A i \cdot h^i \quad (A)$$

where:
  Z is the depth of an aspherical surface;
  h is a distance (height) from the optical axis to the lens surface (mm);
  C is a paraxial curvature (=1/R);
  R is a paraxial radius of curvature;
  Ai is an $i^{th}$ order (i is an integer greater than or equal to 3) aspherical surface coefficient; and
  K is an aspherical surface coefficient.

Figure 2:
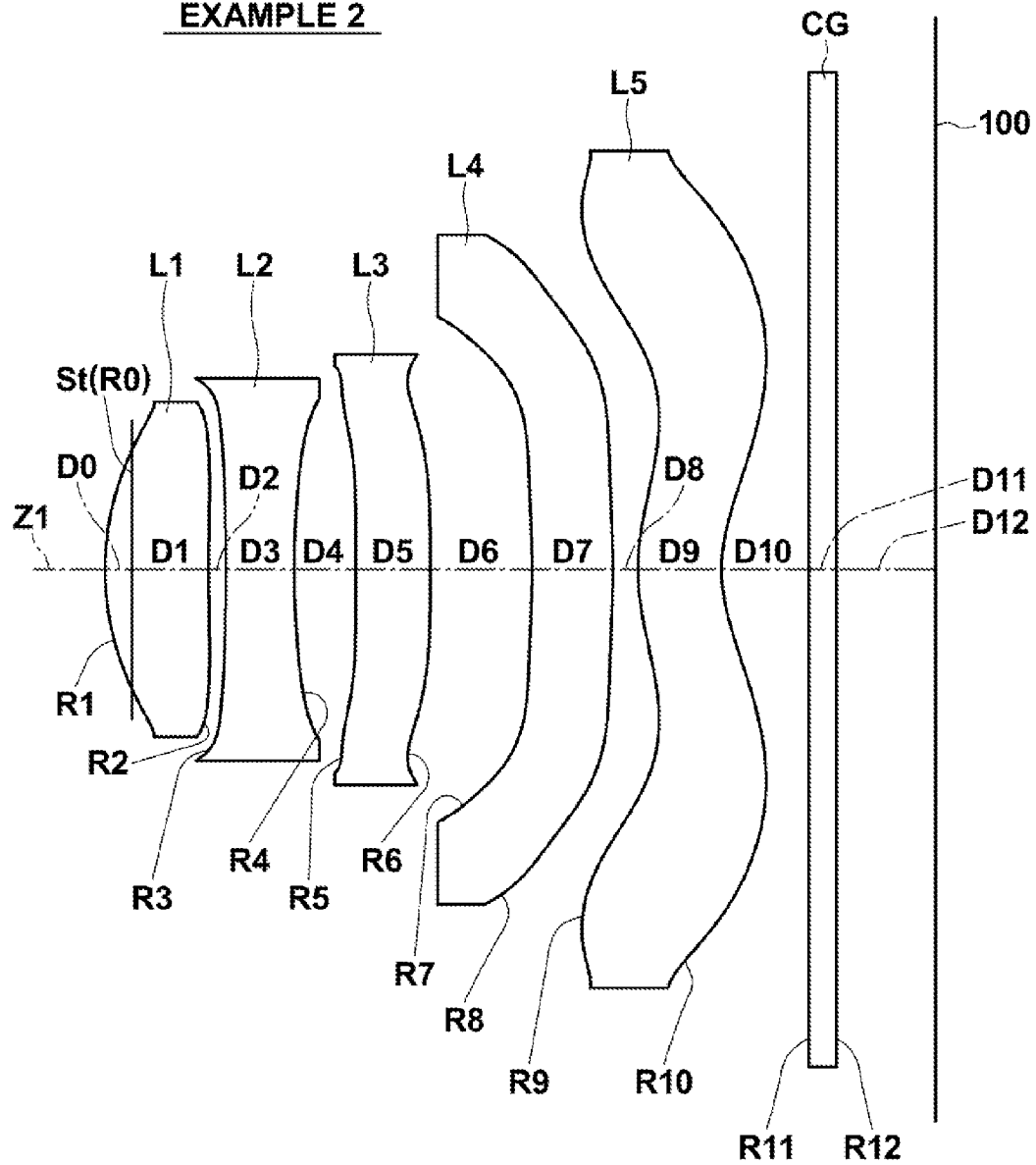
FIG. 2 illustrates a second configuration example of the image capturing lens according to an aspect of the present invention, which is a cross-sectional view of a lens corresponding to Example 2.
Figure 3:
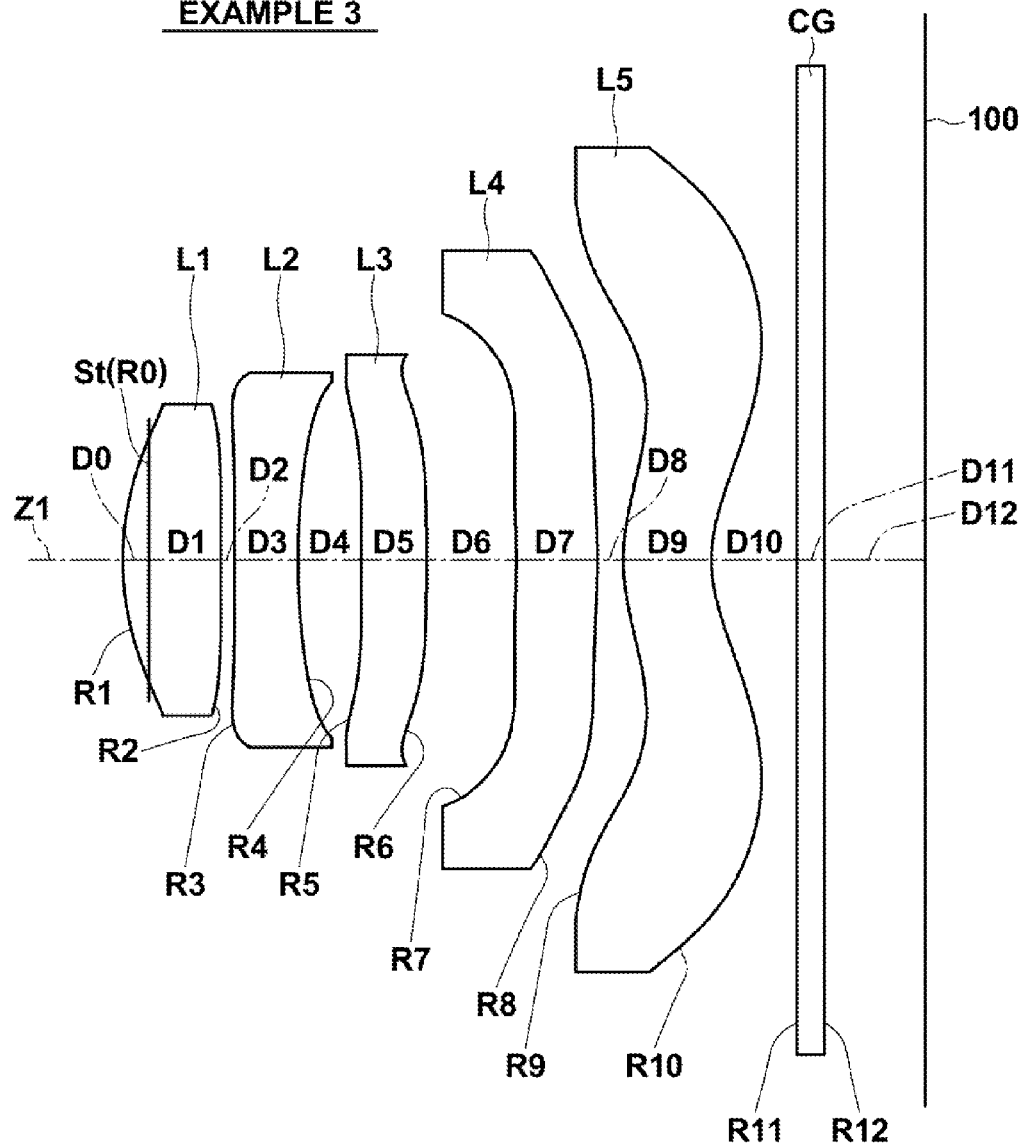
FIG. 3 illustrates a third configuration example of the image capturing lens according to an aspect of the present invention, which is a cross-sectional view of a lens corresponding to Example 3.
Figure 4:
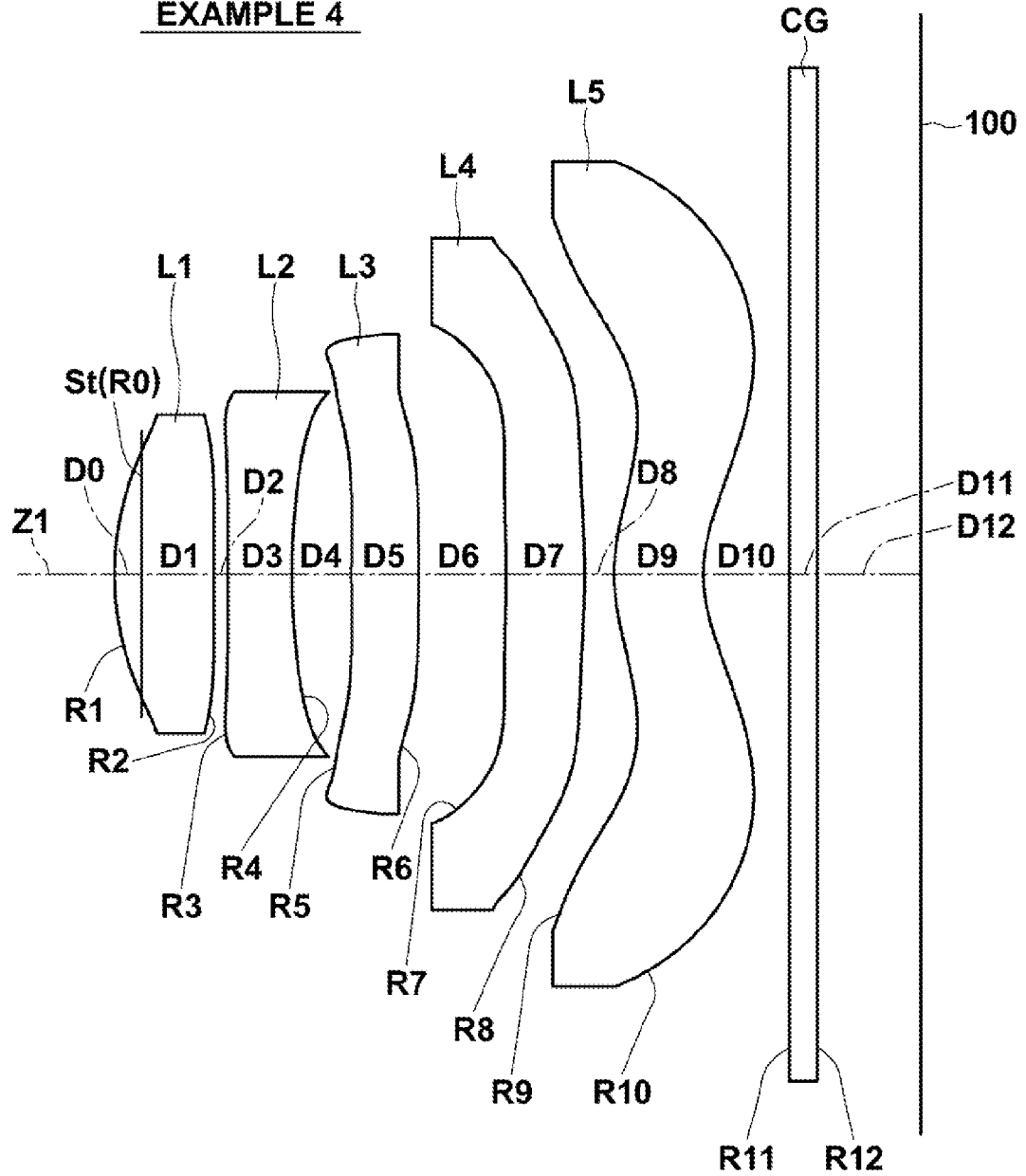
FIG. 4 illustrates a fourth configuration example of the image capturing lens according to an aspect of the present invention, which is a cross-sectional view of a lens corresponding to Example 4.
Figure 5:
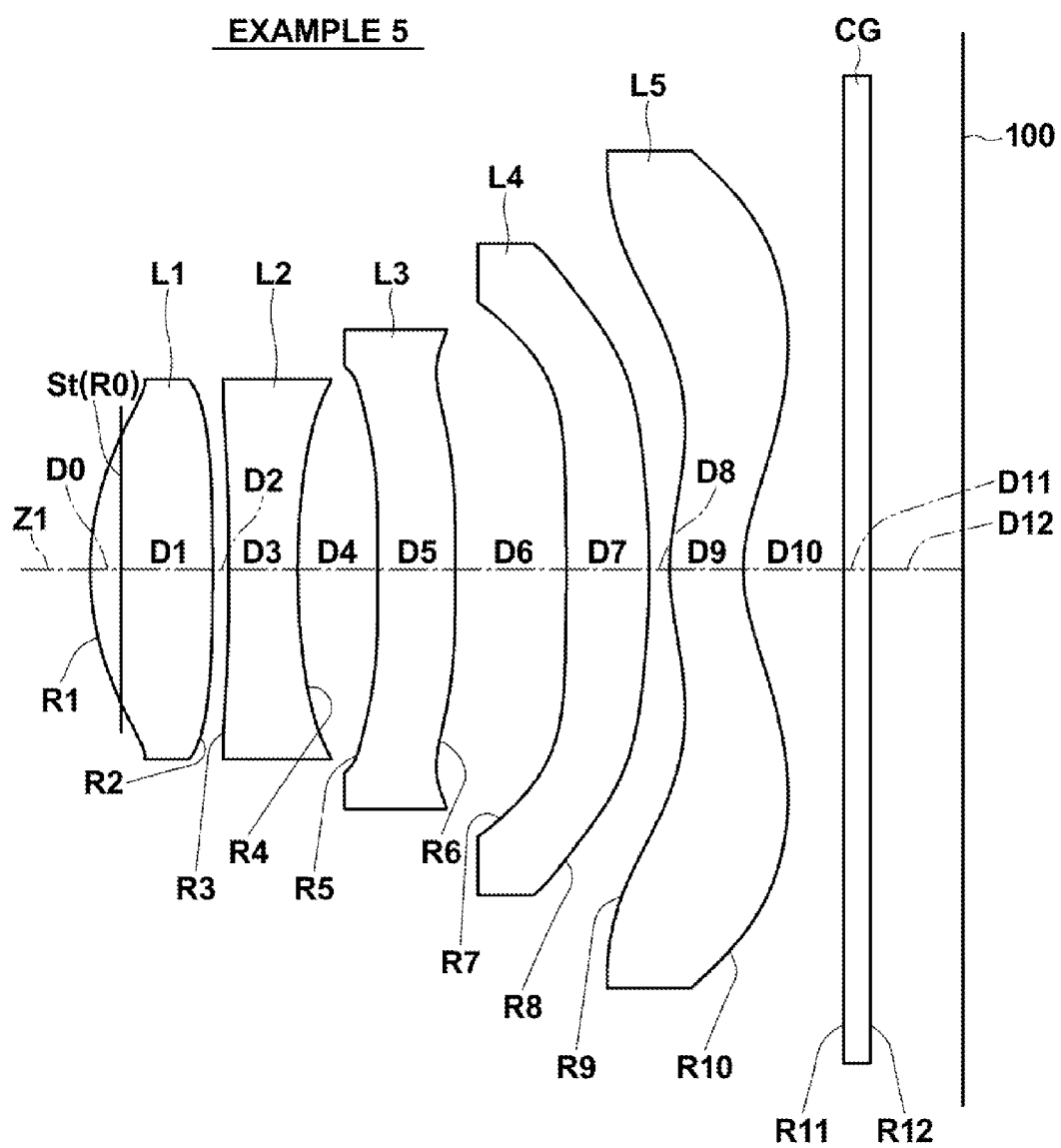
FIG. 5 illustrates a fifth configuration example of the image capturing lens according to an aspect of the present invention, which is a cross-sectional view of a lens corresponding to Example 5.
Figure 6:
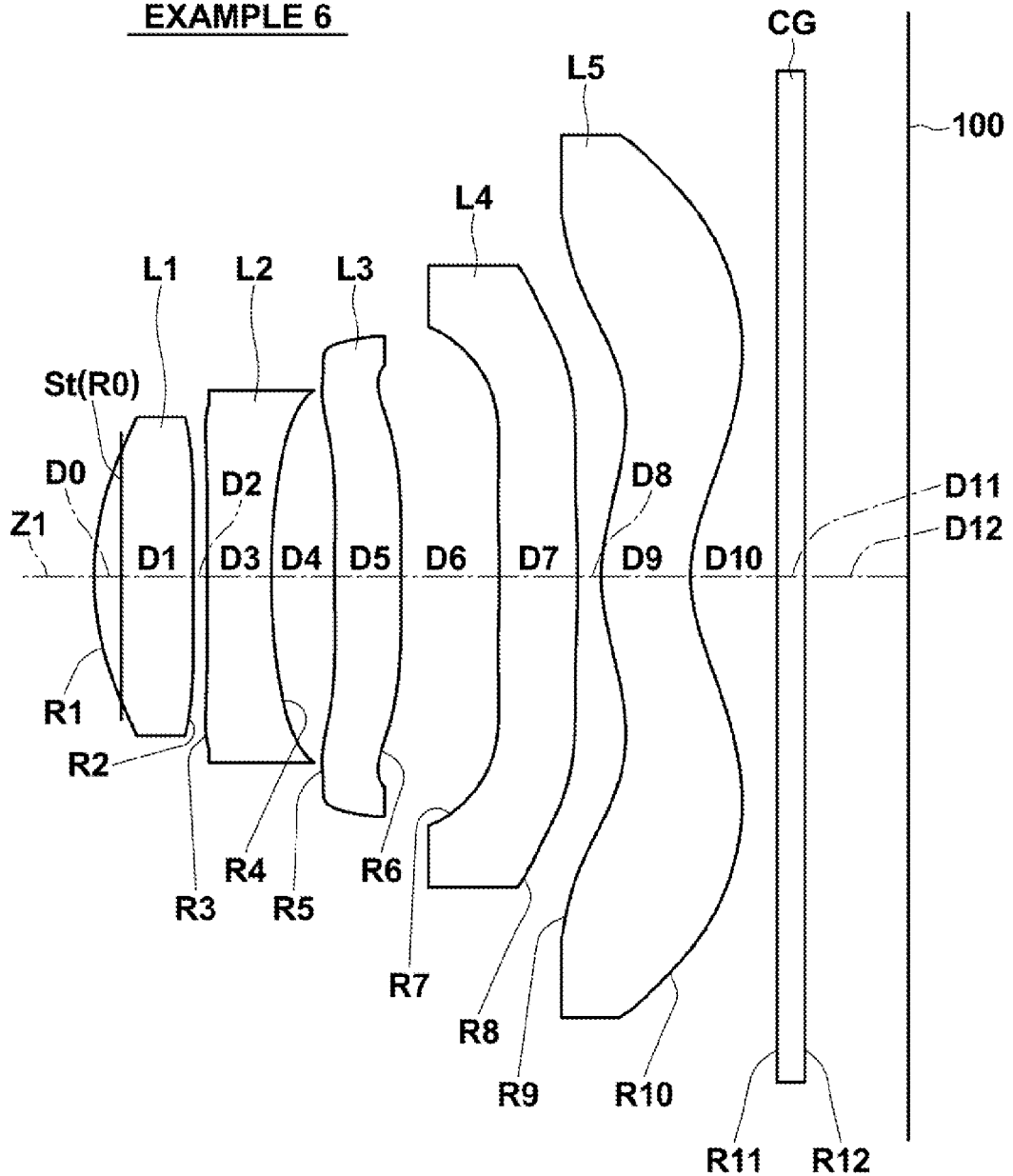
FIG. 6 illustrates a sixth configuration example of the image capturing lens according to an aspect of the present invention, which is a cross-sectional view of a lens corresponding to Example 6.
Figure 7:
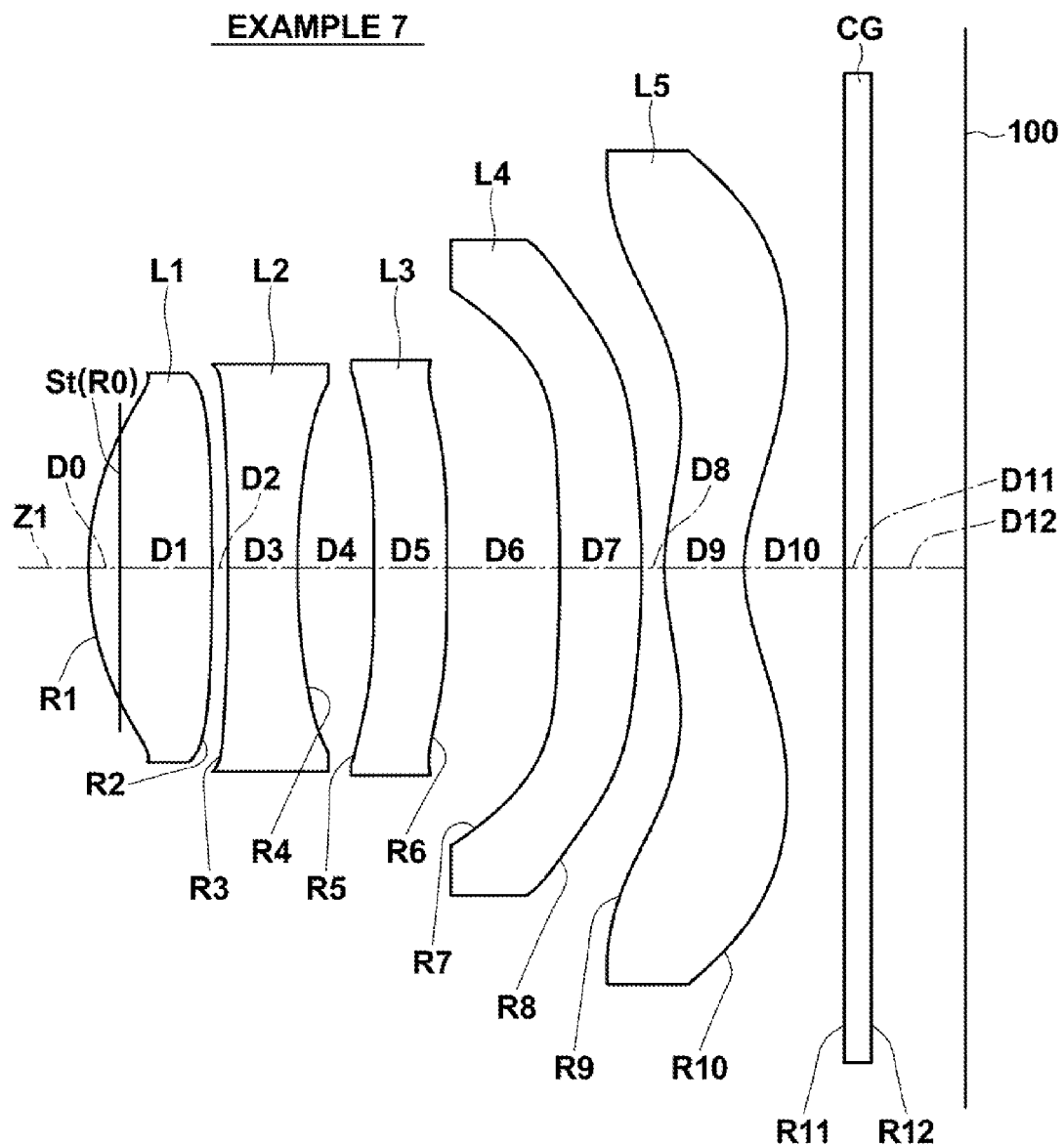
FIG. 7 illustrates a seventh configuration example of the image capturing lens according to an aspect of the present invention, which is a cross-sectional view of a lens corresponding to Example 7.
Figure 8:
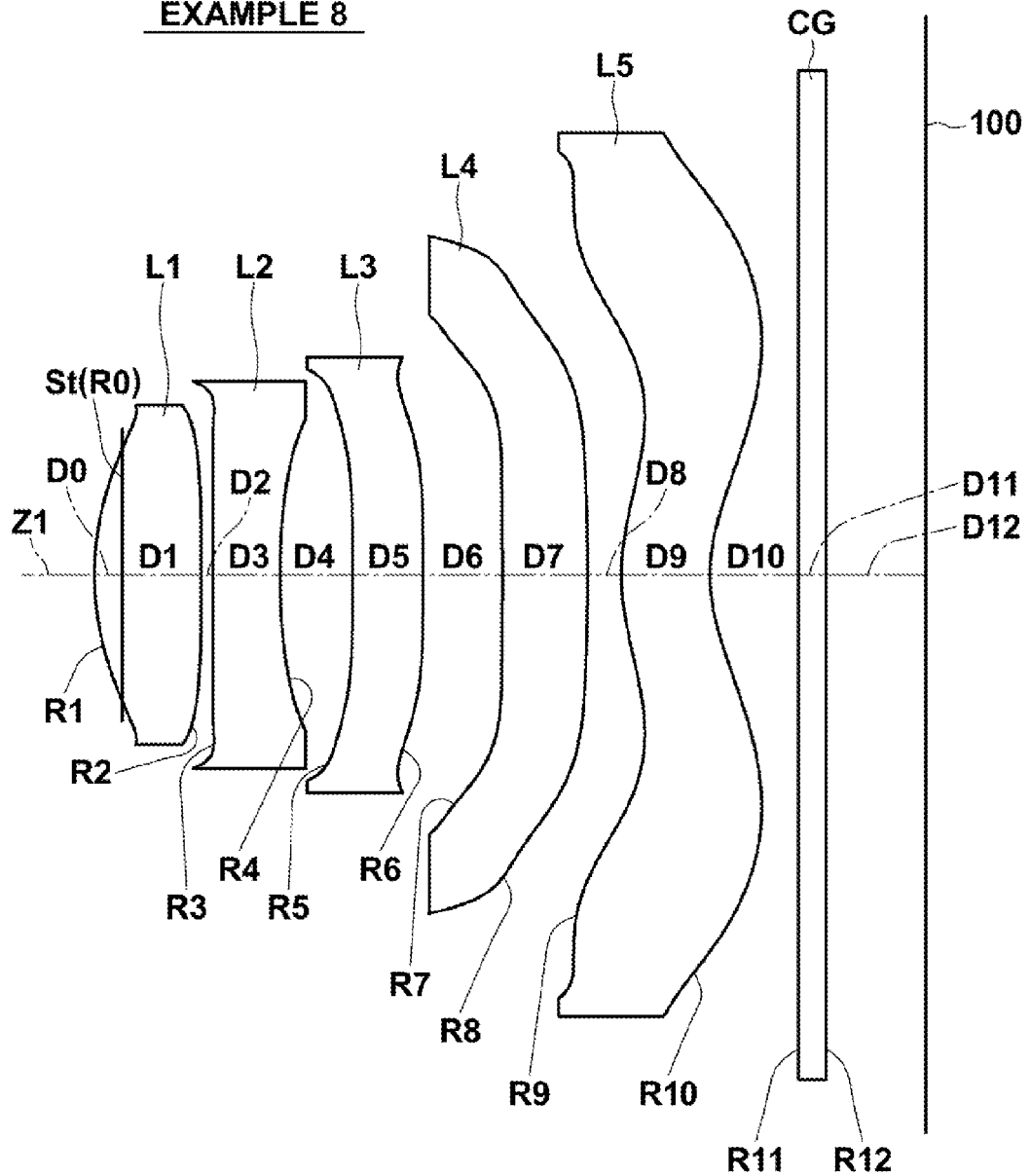
FIG. 8 illustrates an eighth configuration example of the image capturing lens according to an aspect of the present invention, which is a cross-sectional view of a lens corresponding to Example 8.
Figure 9:
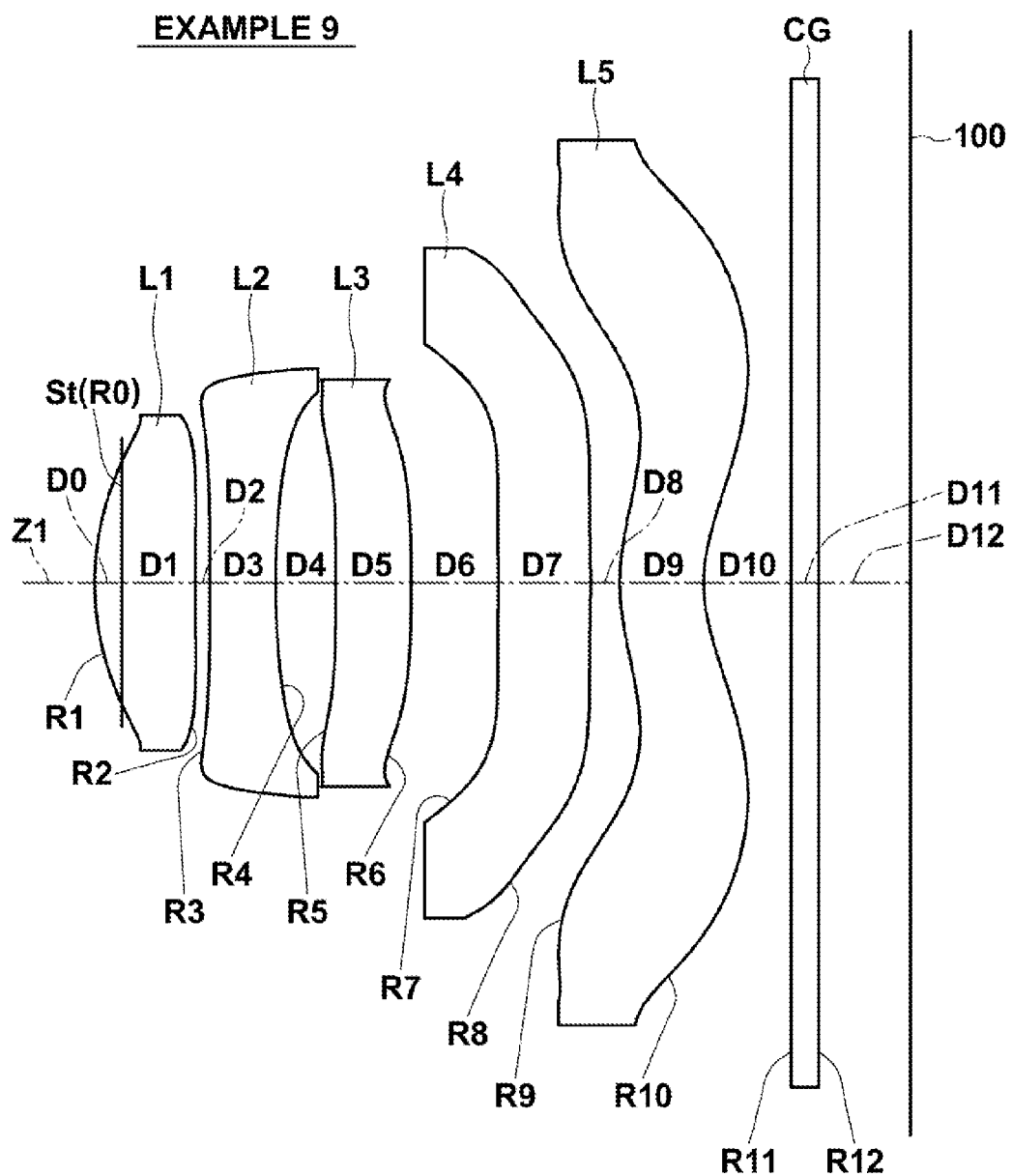
FIG. 9 illustrates a ninth configuration example of the image capturing lens according to an aspect of the present invention, which is a cross-sectional view of a lens corresponding to Example 9.
Figure 10:
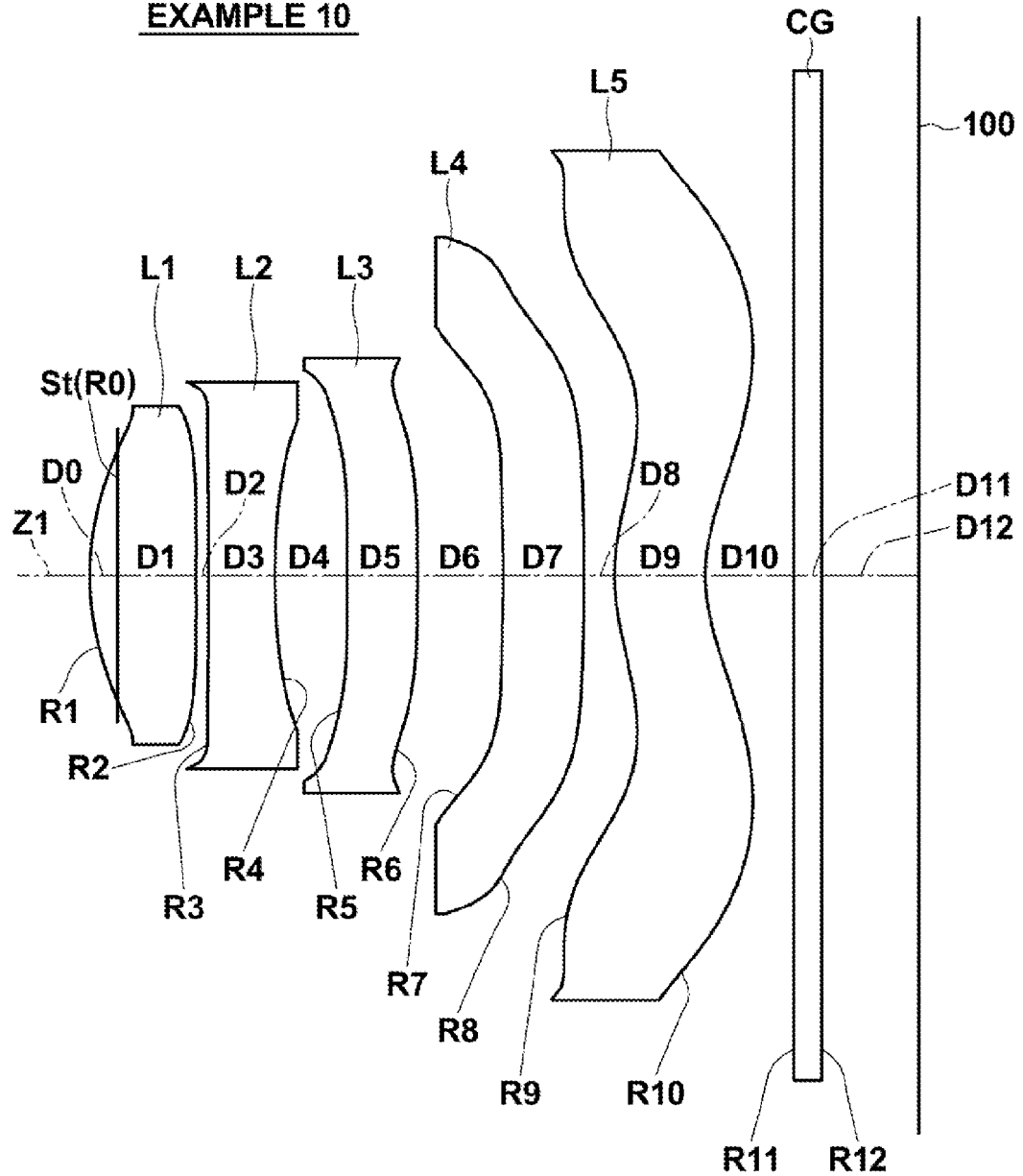
FIG. 10 illustrates a tenth configuration example of the image capturing lens according to an aspect of the present invention, which is a cross-sectional view of a lens corresponding to Example 10.
Figure 11:
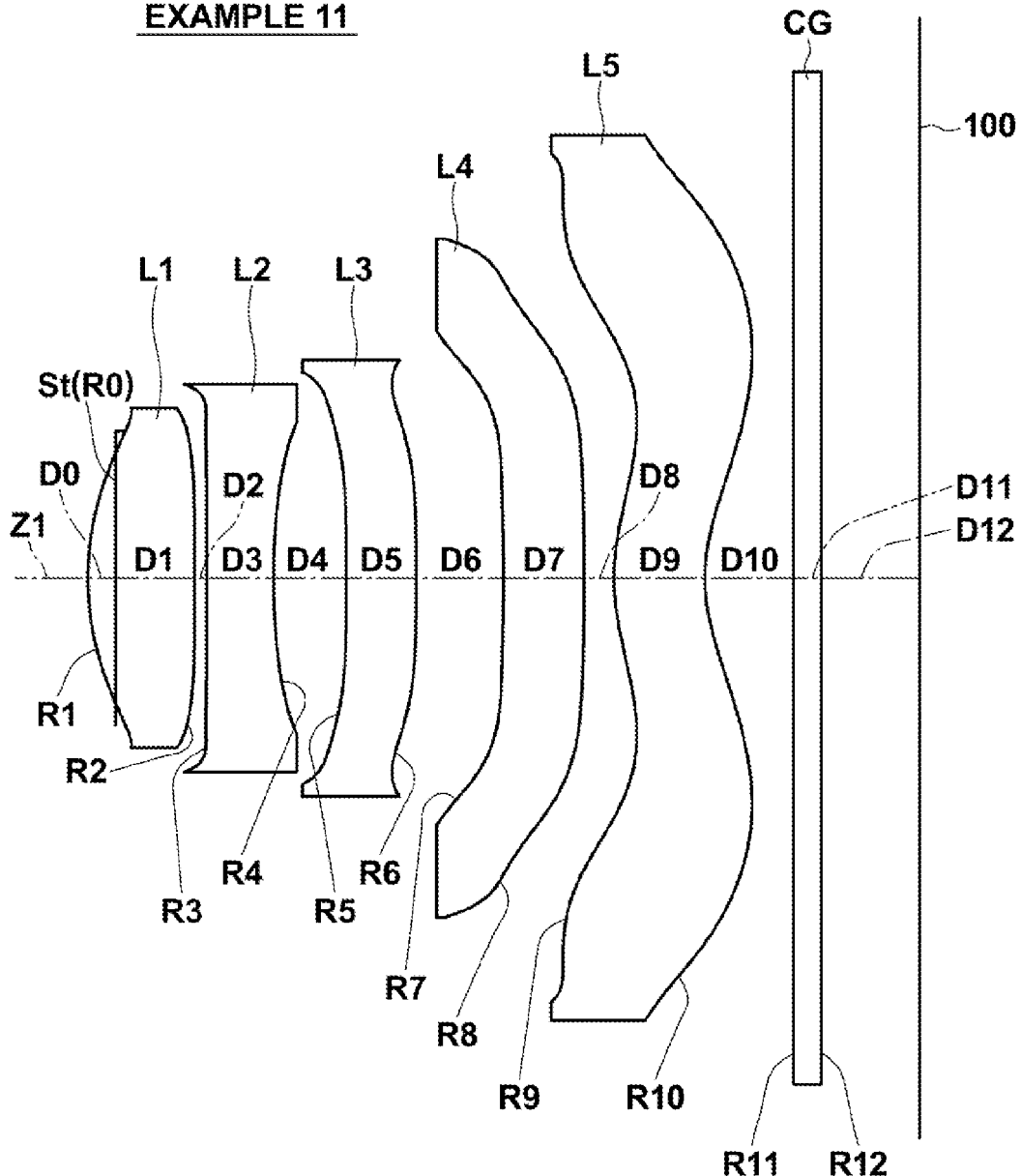
FIG. 11 illustrates an eleventh configuration example of the image capturing lens according to an aspect of the present invention, which is a cross-sectional view of a lens corresponding to Example 11.
Figure 12:
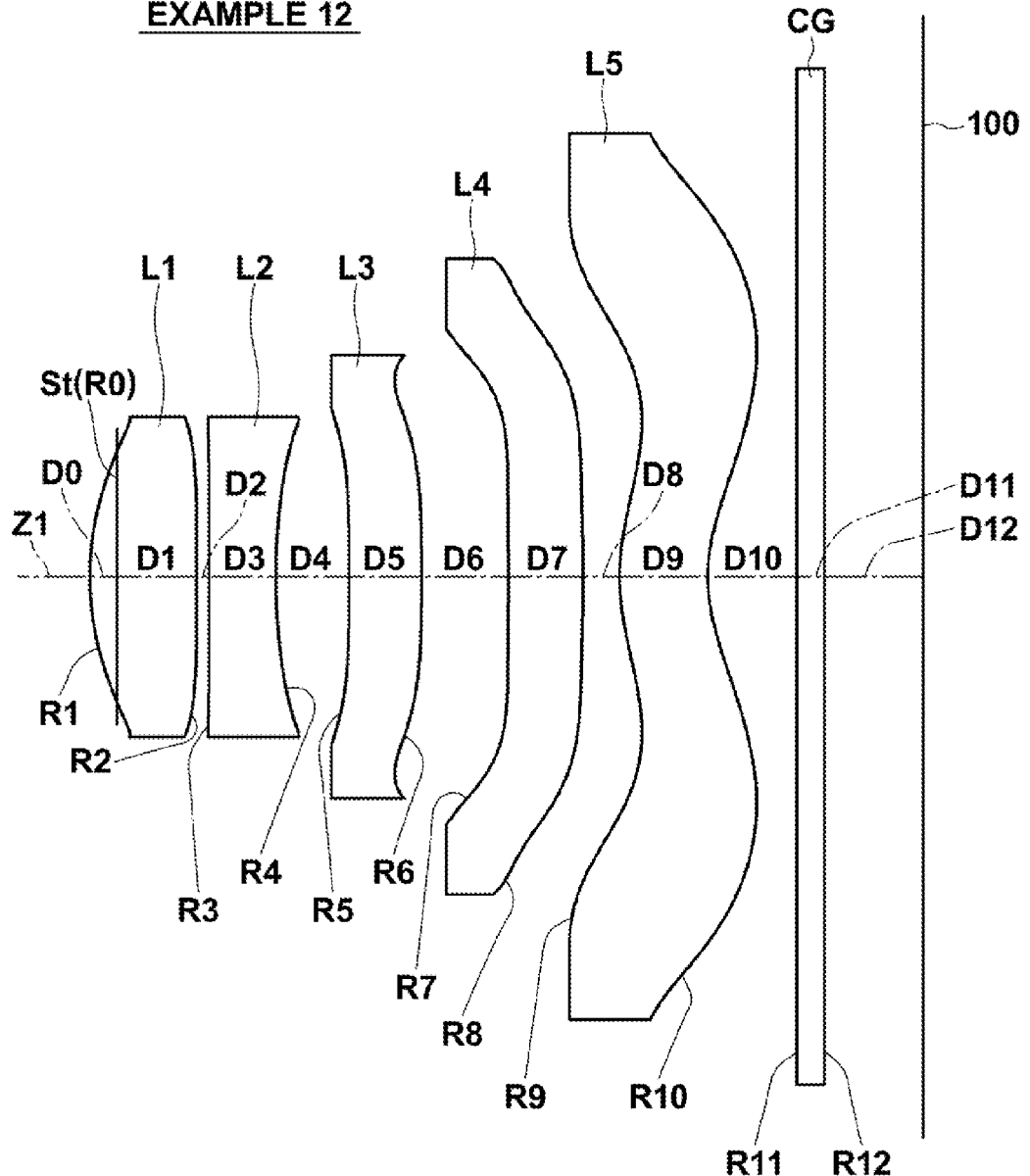
FIG. 12 illustrates a twelfth configuration example of the image capturing lens according to an aspect of the present invention, which is a cross-sectional view of a lens corresponding to Example 12.
Figure 13:
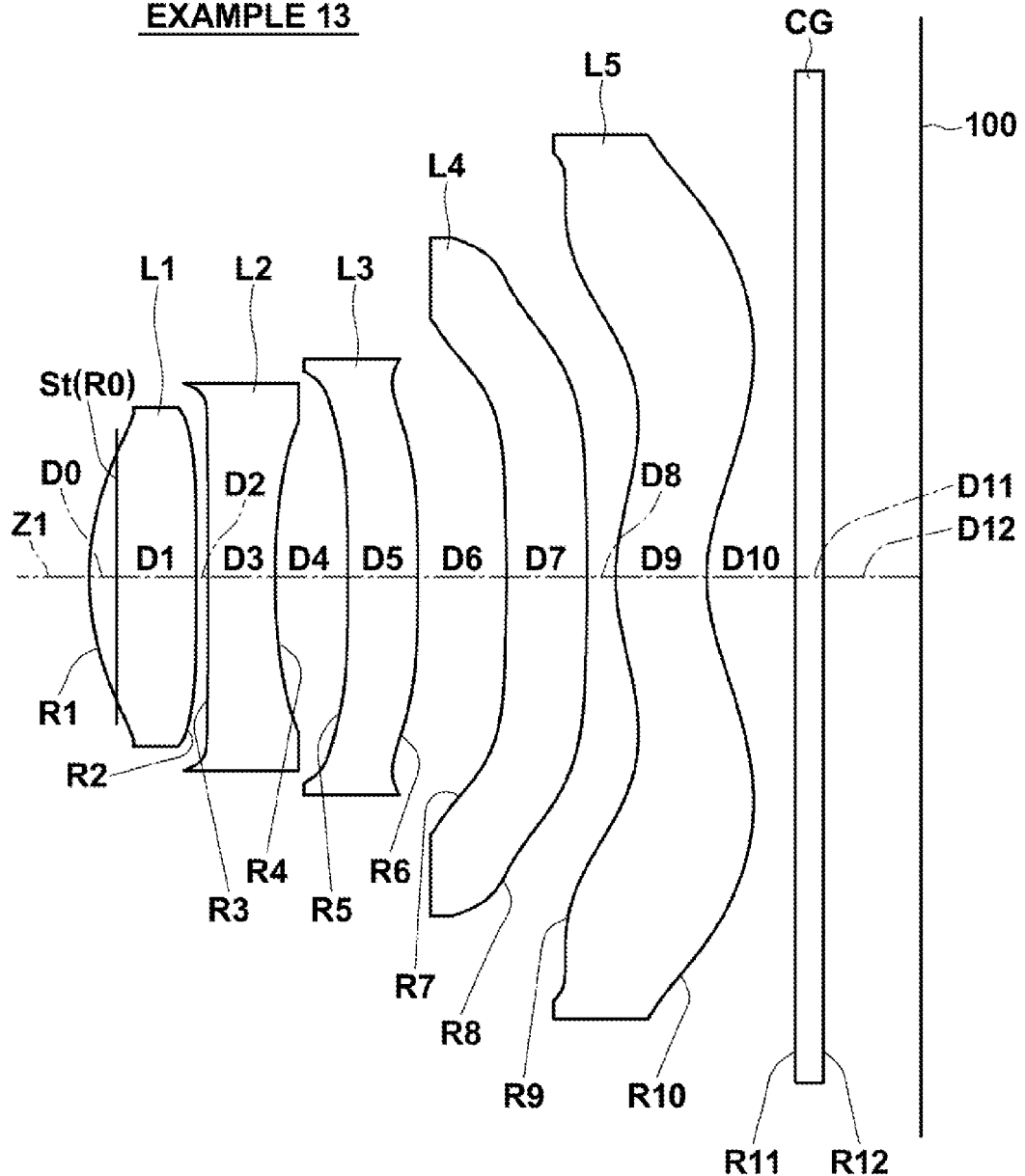
FIG. 13 illustrates a thirteenth configuration example of the image capturing lens according to an aspect of the present invention, which is a cross-sectional view of a lens corresponding to Example 13.
Figure 24:
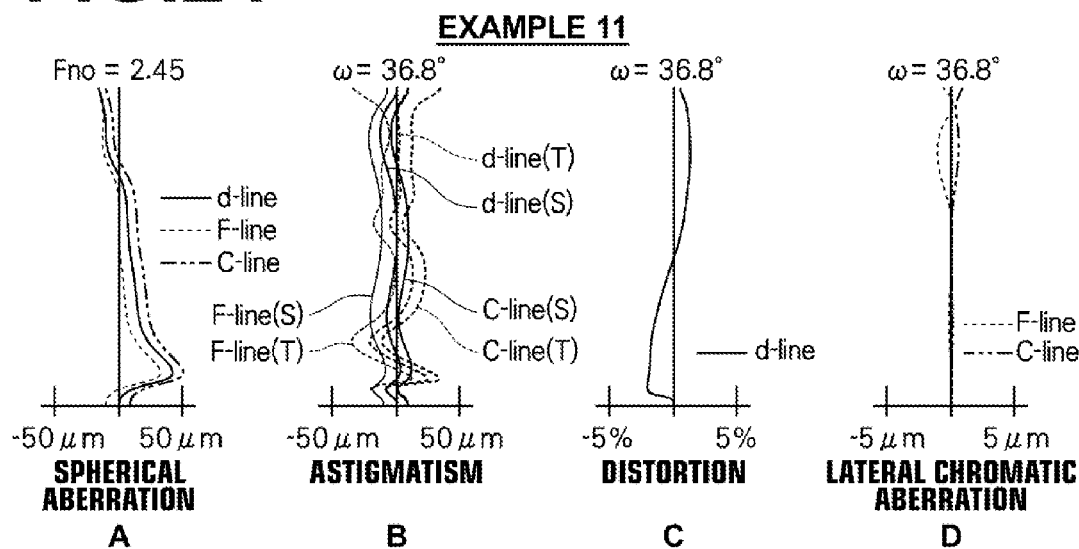
FIG. 24 shows aberration diagrams illustrating various types of aberrations of the image capturing lens according to Example 11 of the present invention, in which A illustrates spherical aberration, B illustrates astigmatism (field curvature), C illustrates distortion, and D illustrates lateral chromatic aberration.
Figure 25:
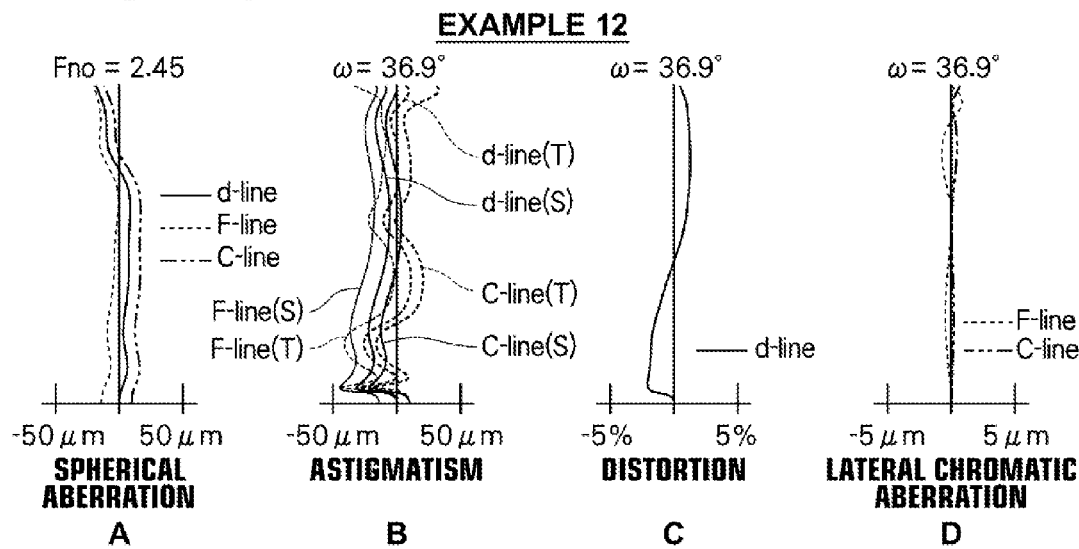
FIG. 25 shows aberration diagrams illustrating various types of aberrations of the image capturing lens according to Example 12 of the present invention, in which A illustrates spherical aberration, B illustrates astigmatism (field curvature), C illustrates distortion, and D illustrates lateral chromatic aberration.
Figure 28:
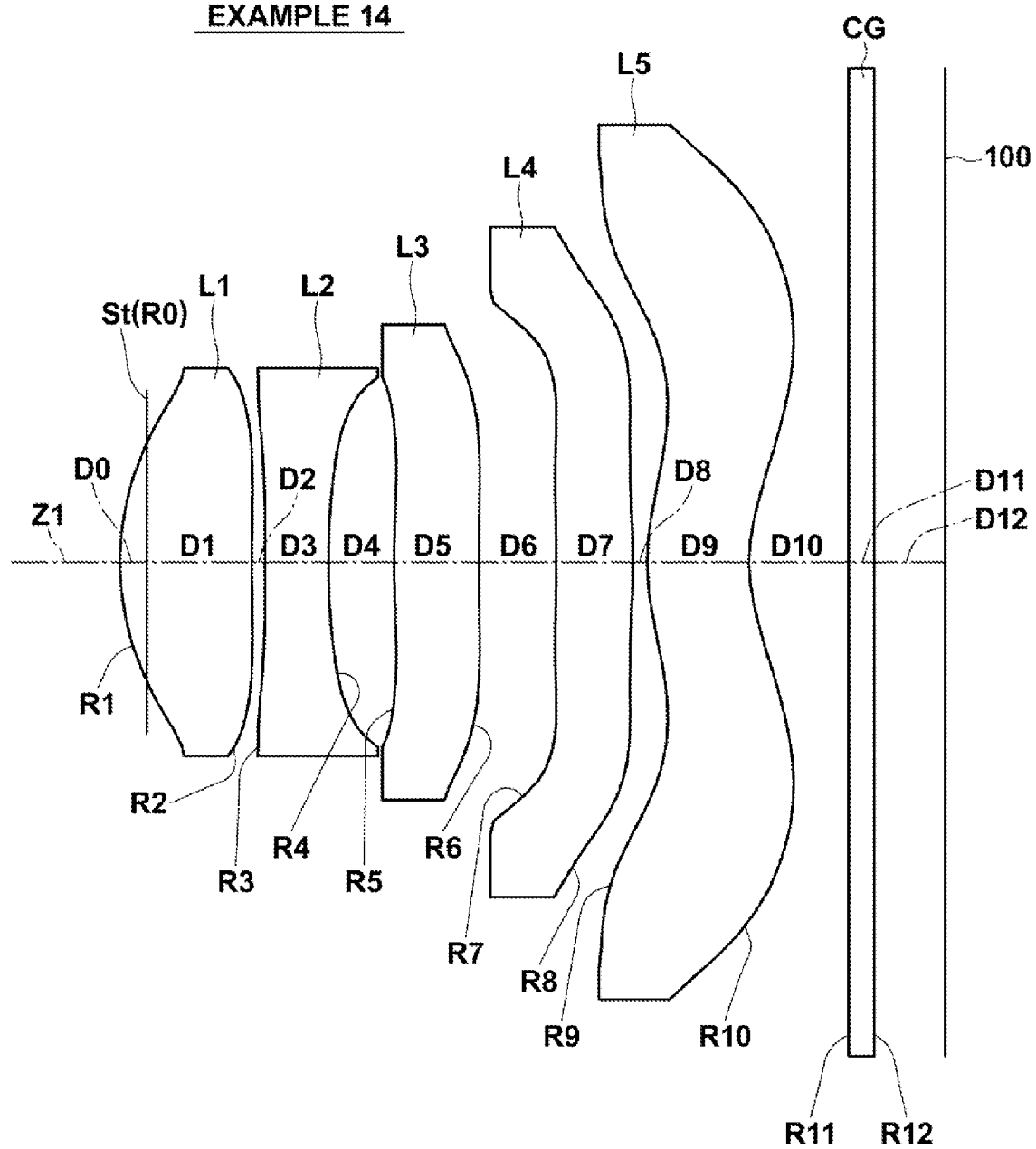
FIG. 28 illustrates a fourteenth configuration example of the image capturing lens according to an aspect of the present invention, which is a cross-sectional view of a lens corresponding to Example 14.
Figure 29:
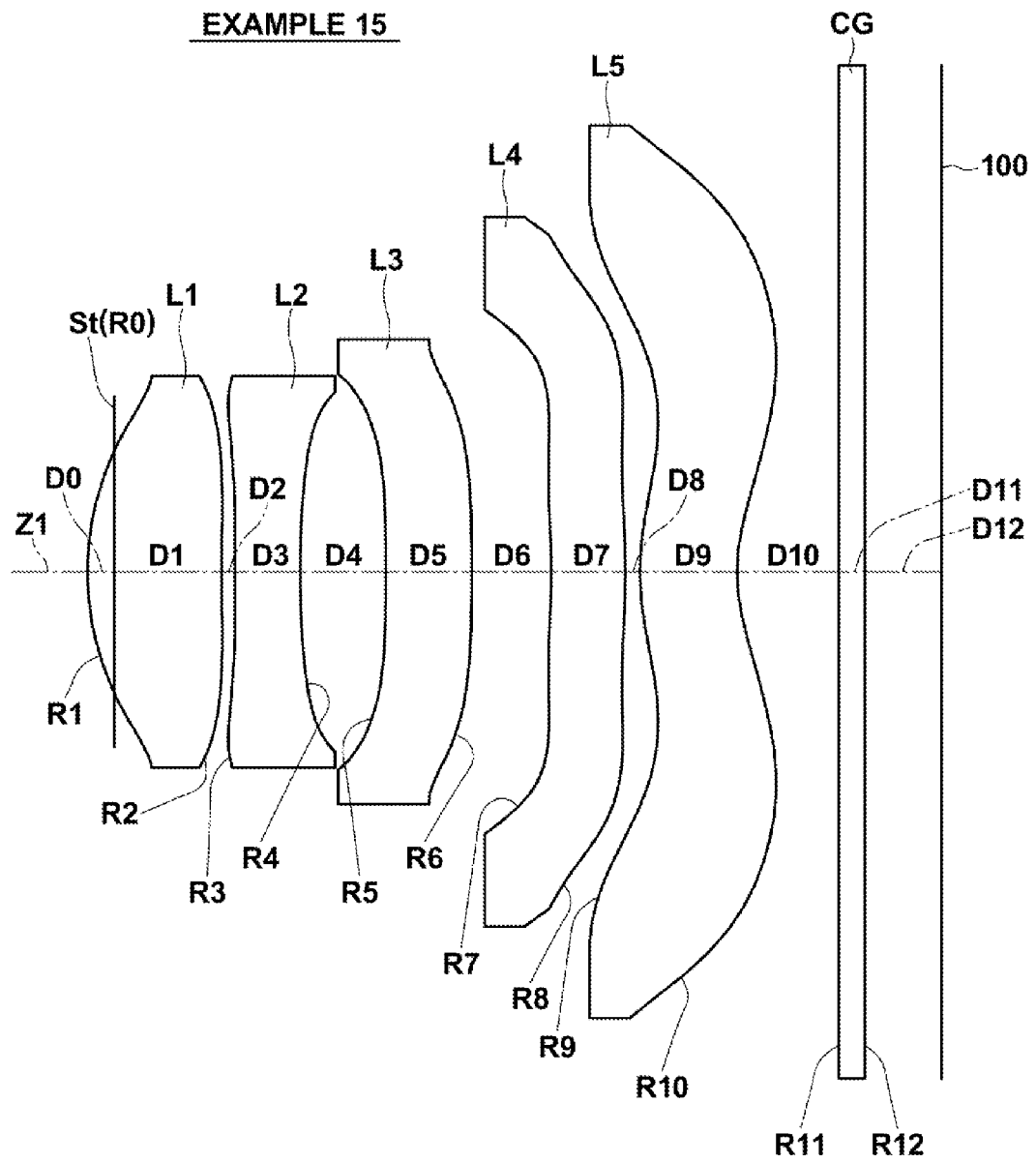
FIG. 29 illustrates a fifteenth configuration example of the image capturing lens according to an aspect of the present invention, which is a cross-sectional view of a lens corresponding to Example 15.

As in the image capturing lens of Example 1 described above, specific lens data corresponding to the configuration of image capturing lens shown in FIG. 2 are taken as Example 2 and shown in Tables 2 and 15. Likewise, specific lens data corresponding to the configurations of image capturing lenses shown in FIGS. 3 to 13 are taken as Examples 3 to 13 and shown in Tables 3 to 13 and tables 16 to 26. Likewise, specific lens data corresponding to the configurations of image capturing lenses shown in FIGS. 28 to 29 are taken as Examples 14 to 15 and shown in Tables 28 to 31. In the image capturing lens according to Examples 1 to 15, each of all the first lens L1 to fifth lens L5 have an aspherical shape on both sides.

A to D of FIG. 14 show spherical aberration, astigmatism (field curvature), distortion (distortion aberration), and lateral chromatic aberration of the image capturing lens of Example 1 respectively. Each of the aberration diagrams of spherical aberration, astigmatism (field curvature), and distortion (distortion aberration) illustrates the aberration with respect to the d-line (wavelength 587.56 nm). The diagrams of spherical aberration, astigmatism, and lateral chromatic aberration also indicate aberrations with respect to the F-line (wavelength 486.1 nm) and C-line (wavelength 656.27 nm). In the diagram of astigmatism, the solid line indicates aberration in the saggital direction (S) and the broken line indicates aberration in the tangential direction (T). The Fno represents an F-number and ω represents a half angle of view.

Figure 26:
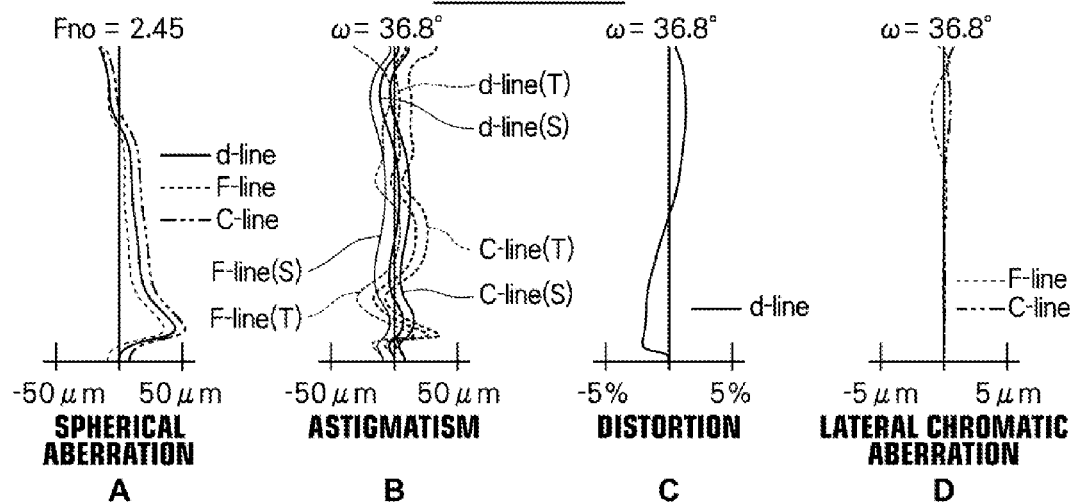
FIG. 26 shows aberration diagrams illustrating various types of aberrations of the image capturing lens according to Example 13 of the present invention, in which A illustrates spherical aberration, B illustrates astigmatism (field curvature), C illustrates distortion, and D illustrates lateral chromatic aberration.

Likewise, various aberrations of the image capturing lens of Example 2 are shown in A to D of FIG. 15. Similarly, various aberrations of image capturing lenses of Examples 3 to 15 are shown in A to D of FIG. 16 to A to D of FIG. 26 and A to D of FIG. 30 to A to D of FIG. 31. Note that in A to D of FIG. 30 and A to D of FIG. 31, the astigmatism diagrams show only aberrations with the d-line (wavelength 587.56 nm) as the reference wavelength.

Further, Table 27 summarizes values of each of conditional expressions (1) to (10) for each of Examples 1 to 15.

As is known from each numerical data and aberration diagram, high image forming performance is realized in each example along with the reduction in overall length.

It should be appreciated that the present invention is not limited to the aforementioned aspect and each example and various modifications may be made. For example, values of the radius of curvature of each lens component, surface distance, refractive index, Abbe number, aspherical surface coefficient and the like are not limited to those shown in each numerical example and other values may also be possible.

Further, in each example, the description has been made on the assumption that the image capturing lens is used as a fixed focal length lens. But it is possible to employ a configuration that allows focus adjustment. For example, it is also possible to employ a configuration that allows auto focusing by paying out the entire lens system or moving some of the lenses on the optical axis.

TABLE 1

EXAMPLE 1 • BASIC LENS DATA

| Si | Ri | Di | Ndj | vdj |
|---|---|---|---|---|
| 0 | ∞ | −0.1435 | | |
| 1* | 1.4588 | 0.5292 | 1.544884 | 54.88 |
| 2* | 11.5409 | 0.0984 | | |
| 3* | −219.0635 | 0.3465 | 1.633506 | 23.63 |
| 4* | 4.2112 | 0.3273 | | |
| 5* | 12.9960 | 0.3841 | 1.544884 | 54.88 |
| 6* | −15.1890 | 0.5473 | | |
| 7* | −4.2865 | 0.3968 | 1.633506 | 23.63 |
| 8* | −5.7462 | 0.1114 | | |
| 9* | 1.1808 | 0.4726 | 1.544884 | 54.88 |
| 10* | 0.8667 | 0.4612 | | |
| 11 | ∞ | 0.1450 | 1.516330 | 64.14 |
| 12 | ∞ | 0.5562 | | |

*ASPHERICAL SURFACE

TABLE 2

EXAMPLE 2 • BASIC LENS DATA

| Si | Ri | Di | Ndj | vdj |
|---|---|---|---|---|
| 0 | ∞ | −0.1435 | | |
| 1* | 1.4413 | 0.5462 | 1.544884 | 54.88 |
| 2* | 12.3489 | 0.0891 | | |
| 3* | −36.2538 | 0.3618 | 1.633506 | 23.63 |
| 4* | 4.7715 | 0.3228 | | |
| 5* | 23.5947 | 0.3948 | 1.544884 | 54.88 |
| 6* | −11.1758 | 0.5360 | | |
| 7* | −4.9955 | 0.4252 | 1.633506 | 23.63 |
| 8* | −5.4546 | 0.1319 | | |
| 9* | 1.2498 | 0.4409 | 1.544884 | 54.88 |
| 10* | 0.8358 | 0.4612 | | |
| 11 | ∞ | 0.1450 | 1.516330 | 64.14 |
| 12 | ∞ | 0.5222 | | |

*ASPHERICAL SURFACE

TABLE 3

EXAMPLE 3 • BASIC LENS DATA

| Si | Ri | Di | Ndj | vdj |
|---|---|---|---|---|
| 0 | ∞ | −0.1416 | | |
| 1* | 1.5238 | 0.5220 | 1.544884 | 54.88 |
| 2* | 18.7838 | 0.0731 | | |
| 3* | 24.6397 | 0.3393 | 1.633506 | 23.63 |
| 4* | 3.7024 | 0.3362 | | |
| 5* | 19.8657 | 0.3497 | 1.533914 | 55.89 |
| 6* | −17.3318 | 0.4794 | | |
| 7* | −6.5148 | 0.4330 | 1.633506 | 23.63 |
| 8* | −7.3016 | 0.1380 | | |
| 9* | 1.0604 | 0.4698 | 1.533914 | 55.89 |
| 10* | 0.7869 | 0.4553 | | |
| 11 | ∞ | 0.1450 | 1.516330 | 64.14 |
| 12 | ∞ | 0.5414 | | |

*ASPHERICAL SURFACE

TABLE 4

EXAMPLE 4 • BASIC LENS DATA

| Si | Ri | Di | Ndj | vdj |
|---|---|---|---|---|
| 0 | ∞ | −0.1416 | | |
| 1* | 1.4833 | 0.5159 | 1.544884 | 54.88 |
| 2* | 19.2082 | 0.0723 | | |
| 3* | 25.7899 | 0.3354 | 1.633506 | 23.63 |
| 4* | 3.5602 | 0.3096 | | |
| 5* | 14.5444 | 0.3505 | 1.533914 | 55.89 |
| 6* | −33.2147 | 0.4571 | | |
| 7* | −7.0273 | 0.4085 | 1.633506 | 23.63 |
| 8* | −10.3449 | 0.1547 | | |
| 9* | 1.0061 | 0.4643 | 1.533914 | 55.89 |
| 10* | 0.7767 | 0.4500 | | |
| 11 | ∞ | 0.1450 | 1.516330 | 64.14 |
| 12 | ∞ | 0.5403 | | |

*ASPHERICAL SURFACE

TABLE 5

EXAMPLE 5 • BASIC LENS DATA

| Si | Ri | Di | Ndj | vdj |
|---|---|---|---|---|
| 0 | ∞ | −0.1685 | | |
| 1* | 1.6017 | 0.6645 | 1.544884 | 54.88 |
| 2* | −19.3588 | 0.0870 | | |
| 3* | −28.5433 | 0.3726 | 1.633506 | 23.63 |
| 4* | 3.8130 | 0.4342 | | |
| 5* | 8000.0000 | 0.4201 | 1.544884 | 54.88 |
| 6* | −35.4350 | 0.6041 | | |
| 7* | −15.0074 | 0.4477 | 1.633506 | 23.63 |
| 8* | −34.0415 | 0.1115 | | |
| 9* | 1.1273 | 0.3992 | 1.544884 | 54.88 |
| 10* | 0.8521 | 0.5416 | | |
| 11 | ∞ | 0.1450 | 1.516330 | 64.14 |
| 12 | ∞ | 0.5029 | | |

*ASPHERICAL SURFACE

TABLE 6

EXAMPLE 6 • BASIC LENS DATA

| Si | Ri | Di | Ndj | vdj |
|---|---|---|---|---|
| 0 | ∞ | −0.1400 | | |
| 1* | 1.5002 | 0.5159 | 1.544884 | 54.88 |
| 2* | 18.7241 | 0.0723 | | |
| 3* | 24.2784 | 0.3353 | 1.633506 | 23.63 |
| 4* | 3.5564 | 0.3306 | | |
| 5* | 13.4076 | 0.3457 | 1.533914 | 55.89 |
| 6* | −32.0451 | 0.5127 | | |
| 7* | −7.2555 | 0.4102 | 1.633506 | 23.63 |
| 8* | −10.9070 | 0.1220 | | |
| 9* | 1.0203 | 0.4643 | 1.533914 | 55.89 |
| 10* | 0.7820 | 0.4500 | | |
| 11 | ∞ | 0.1450 | 1.516330 | 64.14 |
| 12 | ∞ | 0.5416 | | |

*ASPHERICAL SURFACE

TABLE 7

EXAMPLE 7 • BASIC LENS DATA

| Si | Ri | Di | Ndj | vdj |
|---|---|---|---|---|
| 0 | ∞ | −0.1688 | | |
| 1* | 1.5818 | 0.6657 | 1.544884 | 54.88 |
| 2* | −29.9407 | 0.0871 | | |
| 3* | −58.4641 | 0.3732 | 1.633506 | 23.63 |
| 4* | 3.5457 | 0.4131 | | |
| 5* | 5000.0000 | 0.3958 | 1.533914 | 55.89 |
| 6* | −21.5816 | 0.6083 | | |
| 7* | −9.1827 | 0.4416 | 1.633506 | 23.63 |
| 8* | −29.5660 | 0.1233 | | |
| 9* | 1.1264 | 0.4297 | 1.533914 | 55.89 |
| 10* | 0.8800 | 0.5425 | | |
| 11 | ∞ | 0.1450 | 1.516330 | 64.14 |
| 12 | ∞ | 0.5074 | | |

*ASPHERICAL SURFACE

TABLE 8

EXAMPLE 8 • BASIC LENS DATA

| Si | Ri | Di | Ndj | vdj |
|---|---|---|---|---|
| 0 | ∞ | −0.1435 | | |
| 1* | 1.4891 | 0.5544 | 1.544884 | 54.88 |
| 2* | 1927.2307 | 0.0630 | | |
| 3* | 39.5403 | 0.3466 | 1.633506 | 23.63 |
| 4* | 3.2777 | 0.3780 | | |
| 5* | 63.0000 | 0.3673 | 1.544884 | 54.88 |
| 6* | −29.1764 | 0.4149 | | |
| 7* | −25.2000 | 0.4431 | 1.544884 | 54.88 |
| 8* | −35.0000 | 0.1746 | | |
| 9* | 1.2001 | 0.4606 | 1.533914 | 55.89 |
| 10* | 0.9009 | 0.4612 | | |
| 11 | ∞ | 0.1450 | 1.516330 | 64.14 |
| 12 | ∞ | 0.5163 | | |

*ASPHERICAL SURFACE

TABLE 9

EXAMPLE 9 • BASIC LENS DATA

| Si | Ri | Di | Ndj | vdj |
|---|---|---|---|---|
| 0 | ∞ | −0.1435 | | |
| 1* | 1.4645 | 0.5292 | 1.544884 | 54.88 |
| 2* | 16.2679 | 0.0761 | | |
| 3* | −95.9199 | 0.3465 | 1.633506 | 23.63 |
| 4* | 4.5960 | 0.3150 | | |
| 5* | 273.4463 | 0.3983 | 1.544884 | 54.88 |
| 6* | −9.6126 | 0.4595 | | |
| 7* | −13.7064 | 0.4844 | 1.633506 | 23.63 |
| 8* | −14.1656 | 0.1546 | | |
| 9* | 1.2101 | 0.4410 | 1.544884 | 54.88 |
| 10* | 0.8457 | 0.4612 | | |
| 11 | ∞ | 0.1450 | 1.516330 | 64.14 |
| 12 | ∞ | 0.4826 | | |

*ASPHERICAL SURFACE

TABLE 10

EXAMPLE 10 • BASIC LENS DATA

| Si | Ri | Di | Ndj | vdj |
|---|---|---|---|---|
| 0 | ∞ | −0.1435 | | |
| 1* | 1.4806 | 0.5544 | 1.544884 | 54.88 |
| 2* | 56.4436 | 0.0630 | | |
| 3* | 44.3458 | 0.3465 | 1.633506 | 23.63 |
| 4* | 3.5509 | 0.3780 | | |
| 5* | 79.5758 | 0.3654 | 1.544884 | 54.88 |
| 6* | −16.9258 | 0.4483 | | |
| 7* | −11.3353 | 0.4216 | 1.633506 | 23.63 |
| 8* | −62.9943 | 0.1593 | | |
| 9* | 1.1759 | 0.4725 | 1.544884 | 54.88 |
| 10* | 0.9179 | 0.4612 | | |
| 11 | ∞ | 0.1450 | 1.516330 | 64.14 |
| 12 | ∞ | 0.5104 | | |

*ASPHERICAL SURFACE

TABLE 11

EXAMPLE 11 • BASIC LENS DATA

| Si | Ri | Di | Ndj | vdj |
|---|---|---|---|---|
| 0 | ∞ | −0.1435 | | |
| 1* | 1.4736 | 0.5544 | 1.544884 | 54.88 |
| 2* | 54.4018 | 0.0630 | | |
| 3* | 44.3458 | 0.3465 | 1.633506 | 23.63 |
| 4* | 3.5167 | 0.3780 | | |
| 5* | 64.3312 | 0.3654 | 1.544884 | 54.88 |
| 6* | −16.0769 | 0.4544 | | |
| 7* | −11.4545 | 0.4185 | 1.633506 | 23.63 |
| 8* | 42.4441 | 0.1540 | | |
| 9* | 1.1477 | 0.4725 | 1.544884 | 54.88 |
| 10* | 0.9378 | 0.4612 | | |
| 11 | ∞ | 0.1450 | 1.516330 | 64.14 |
| 12 | ∞ | 0.5124 | | |

*ASPHERICAL SURFACE

TABLE 12

EXAMPLE 12 • BASIC LENS DATA

| Si | Ri | Di | Ndj | vdj |
|---|---|---|---|---|
| 0 | ∞ | −0.1435 | | |
| 1* | 1.5025 | 0.5544 | 1.544884 | 54.88 |
| 2* | 88.8168 | 0.0648 | | |
| 3* | 37.8365 | 0.3465 | 1.633506 | 23.63 |
| 4* | 3.4499 | 0.3780 | | |
| 5* | 630.0000 | 0.3772 | 1.544884 | 54.88 |
| 6* | −15.8059 | 0.4526 | | |
| 7* | −29.1514 | 0.3861 | 1.633506 | 23.63 |
| 8* | −32.1661 | 0.1899 | | |
| 9* | 1.2347 | 0.4573 | 1.544884 | 54.88 |
| 10* | 0.8976 | 0.4612 | | |
| 11 | ∞ | 0.1450 | 1.516330 | 64.14 |
| 12 | ∞ | 0.5119 | | |

*ASPHERICAL SURFACE

TABLE 13

EXAMPLE 13 • BASIC LENS DATA

| Si | Ri | Di | Ndj | vdj |
|---|---|---|---|---|
| 0 | ∞ | −0.1435 | | |
| 1* | 1.4689 | 0.5544 | 1.544884 | 54.88 |
| 2* | 53.5332 | 0.0632 | | |
| 3* | 44.3458 | 0.3465 | 1.633506 | 23.63 |
| 4* | 3.4153 | 0.3780 | | |
| 5* | 62.9987 | 0.3654 | 1.544884 | 54.88 |
| 6* | −12.5999 | 0.4617 | | |
| 7* | −9.9493 | 0.4182 | 1.633506 | 23.63 |
| 8* | 40.7371 | 0.1493 | | |
| 9* | 1.1442 | 0.4725 | 1.544884 | 54.88 |
| 10* | 0.9426 | 0.4612 | | |
| 11 | ∞ | 0.1450 | 1.516330 | 64.14 |
| 12 | ∞ | 0.5100 | | |

*ASPHERICAL SURFACE

TABLE 14

EXAMPLE 1 · ASPHERICAL SURFACE DATA

| SURF. No. | K | A3 | A4 | A5 | A6 |
|---|---|---|---|---|---|
| 1 | −2.076521E+01 | −2.703612E−02 | 1.229156E+00 | −1.985368E+00 | 2.093304E+00 |
| 2 | −2.803123E+03 | 1.439280E−02 | −8.141240E−03 | 6.249132E−01 | −6.395726E+00 |
| 3 | −1.250965E+02 | 4.603811E−02 | −3.487964E−01 | −1.163403E+00 | 1.675946E+01 |
| 4 | −6.096116E−01 | 4.167427E−02 | −3.965590E−01 | 1.259774E+00 | −2.564719E+00 |
| 5 | −2.782544E+02 | −1.092454E−01 | 8.715041E−01 | −4.024004E+00 | 7.394012E+00 |
| 6 | 9.144817E+01 | −2.404377E−02 | 1.363852E−01 | −4.651465E−01 | 2.292327E−01 |
| 7 | −3.815477E+02 | −4.431229E−01 | 1.897620E+00 | −2.700438E+00 | 7.053403E−01 |
| 8 | 2.481303E+00 | −1.360376E−01 | −6.697276E−01 | 8.679891E+00 | −3.011459E+01 |
| 9 | −7.317213E+01 | 8.401261E−01 | −1.164888E+00 | −8.357061E−01 | 2.983682E+00 |
| 10 | −3.895334E+00 | 3.210409E−01 | −2.712217E+00 | 1.008542E+01 | −2.191734E+01 |

| | A7 | A8 | A9 | A10 | A11 |
|---|---|---|---|---|---|
| 1 | −1.837371E+01 | 8.777069E+01 | −1.636104E+02 | 4.643943E+01 | 2.407007E+02 |
| 2 | 2.030870E+01 | −2.748473E+01 | 3.568208E+00 | 3.623216E+01 | −5.185110E+01 |
| 3 | −8.272111E+01 | 2.268462E+02 | −3.446070E+02 | 1.838439E+02 | 3.032941E+02 |
| 4 | 3.406863E+00 | −3.046578E+00 | 7.085932E+00 | −1.751481E+01 | 2.029189E+01 |
| 5 | −3.143362E+00 | −1.299257E+01 | 2.385338E+01 | −8.874222E+00 | −9.648604E+00 |
| 6 | 1.636313E−01 | −1.951218E+00 | 5.196382E+00 | −4.994511E+00 | 1.600755E+00 |
| 7 | 9.366126E−01 | 4.303430E+00 | −1.478163E+01 | 1.777608E+01 | −1.036479E+01 |
| 8 | 5.813446E+01 | −6.925990E+01 | 4.764440E+01 | −1.252875E+01 | −4.848075E+00 |
| 9 | −3.209451E+00 | 2.577591E+00 | −2.307666E+00 | 1.626554E+00 | −5.640296E−01 |
| 10 | 2.683484E+01 | −1.521453E+01 | −3.367506E+00 | 1.184530E+01 | −8.269203E+00 |

| | A12 | A13 | A14 | A15 | A16 |
|---|---|---|---|---|---|
| 1 | −2.360945E+02 | −1.093695E+02 | 2.021426E+02 | −9.202543E+00 | −4.229613E+01 |
| 2 | 4.498899E+01 | −2.370019E+01 | −1.808632E+01 | 3.805746E+01 | −1.659593E+01 |
| 3 | −6.863714E+02 | 5.671346E+02 | −1.833068E+02 | −1.861446E+01 | 1.915403E+01 |
| 4 | −1.123195E+00 | 9.139180E+00 | −1.346977E+01 | 9.024343E+00 | −1.923517E+00 |
| 5 | −5.278369E+00 | 3.043982E+01 | −2.441076E+01 | 5.360826E+00 | 4.680682E−01 |
| 6 | −2.025591E−01 | −1.482491E+00 | 4.291825E+00 | −3.373550E+00 | 8.001097E−01 |
| 7 | 3.283808E+00 | −6.646825E−01 | −6.503793E−01 | 9.350822E−01 | −3.056737E−01 |
| 8 | 2.178950E+00 | 2.726767E+00 | −2.450285E+00 | 7.517922E−01 | −8.294613E−02 |
| 9 | 5.246892E−02 | −3.129418E−02 | 4.283676E−02 | −1.555991E−02 | 1.811352E−03 |
| 10 | 2.433885E+00 | 5.309424E−02 | −2.525494E−01 | 6.896233E−02 | −6.352555E−03 |

TABLE 15

EXAMPLE 2 · ASPHERICAL SURFACE DATA

| SURF. No. | K | A3 | A4 | A5 | A6 |
|---|---|---|---|---|---|
| 1 | −2.088673E+01 | −2.563103E−02 | 1.259709E+00 | −2.003890E+00 | 2.056880E+00 |
| 2 | −3.734436E+03 | 9.333687E−03 | 2.423008E−02 | 6.217302E−01 | −6.449787E+00 |
| 3 | −4.067076E+02 | 4.935621E−02 | −3.598273E−01 | −1.121471E+00 | 1.676980E+01 |
| 4 | −6.921712E−01 | 4.669481E−02 | −3.745685E−01 | 1.199752E+00 | −2.550998E+00 |
| 5 | −2.495443E+02 | −1.071701E−01 | 8.027587E−01 | −3.891422E+00 | 7.337519E+00 |
| 6 | 9.549880E+01 | −1.968947E−02 | 1.252332E−01 | −4.841874E−01 | 2.797434E−01 |
| 7 | −4.541666E+02 | −3.840639E−01 | 1.738396E+00 | −2.585891E+00 | 6.711465E−01 |
| 8 | 3.145122E+00 | −6.990889E−02 | −7.680669E−01 | 8.690468E+00 | −3.009270E+01 |
| 9 | −7.215284E+01 | 8.217375E−01 | −1.158701E+00 | −8.350612E−01 | 2.982721E+00 |
| 10 | −3.831431E+00 | 3.057424E−01 | −2.711785E+00 | 1.008955E+01 | −2.191672E+01 |

| | A7 | A8 | A9 | A10 | A11 |
|---|---|---|---|---|---|
| 1 | −1.837523E+01 | 8.781025E+01 | −1.634853E+02 | 4.639654E+01 | 2.407732E+02 |
| 2 | 2.028313E+01 | −2.733818E+01 | 3.706810E+00 | 3.606641E+01 | −5.188668E+01 |
| 3 | −8.277237E+01 | 2.267577E+02 | −3.445606E+02 | 1.839292E+02 | 3.031319E+02 |
| 4 | 3.435608E+00 | −2.984220E+00 | 6.987622E+00 | −1.777009E+01 | 2.102927E+01 |
| 5 | −3.207953E+00 | −1.300512E+01 | 2.377408E+01 | −8.713277E+00 | −9.521125E+00 |
| 6 | 1.783563E−01 | −1.992303E+00 | 5.198587E+00 | −5.007117E+00 | 1.597980E+00 |
| 7 | 9.428399E−01 | 4.312562E+00 | −1.481597E+01 | 1.779673E+01 | −1.035851E+01 |
| 8 | 5.813637E+01 | −6.925636E+01 | 4.764169E+01 | −1.253309E+01 | −4.847681E+00 |
| 9 | −3.209546E+00 | 2.577674E+00 | −2.307627E+00 | 1.626582E+00 | −5.640145E−01 |
| 10 | 2.683473E+01 | −1.521461E+01 | −3.367560E+00 | 1.184523E+01 | −8.269192E+00 |

| | A12 | A13 | A14 | A15 | A16 |
|---|---|---|---|---|---|
| 1 | −2.363707E+02 | −1.095014E+02 | 2.020852E+02 | −8.378756E+00 | −4.276854E+01 |
| 2 | 4.445278E+01 | −2.317952E+01 | −1.791875E+01 | 3.816277E+01 | −1.693370E+01 |
| 3 | −6.857130E+02 | 5.665718E+02 | −1.837998E+02 | −1.801969E+01 | 1.900429E+01 |

TABLE 15-continued

| EXAMPLE 2 • ASPHERICAL SURFACE DATA | | | | |
|---|---|---|---|---|
| 4 | −1.154882E+01 | 7.986103E+00 | −1.150423E+01 | 7.670257E+00 | −1.504215E+00 |
| 5 | −5.416283E+00 | 3.048966E+01 | −2.440389E+01 | 5.225635E+00 | 5.409565E−01 |
| 6 | −1.927558E−01 | −1.461367E+00 | 4.302594E+00 | −3.371218E+00 | 7.855139E−01 |
| 7 | 3.281166E+00 | −6.668132E−01 | −6.544090E−01 | 9.368221E−01 | −3.045736E−01 |
| 8 | 2.179289E+00 | 2.727027E+00 | −2.450117E+00 | 7.518790E−01 | −8.303848E−02 |
| 9 | 5.247445E−02 | −3.129189E−02 | 4.283679E−02 | −1.556108E−02 | 1.811042E−03 |
| 10 | 2.433888E+00 | 5.309754E−02 | −2.525484E−01 | 6.896287E−02 | −6.352920E−03 |

TABLE 16

| EXAMPLE 3 • ASPHERICAL SURFACE DATA | | | | | |
|---|---|---|---|---|---|
| SURF. No. | K | A3 | A4 | A5 | A6 |
| 1 | −2.097648E+01 | −5.057830E−02 | 1.220146E+00 | −2.010070E+00 | 2.305405E+00 |
| 2 | −1.343255E+04 | 1.276086E−02 | −7.241161E−02 | 6.998088E−01 | −6.755167E+00 |
| 3 | 6.851591E+01 | 3.538735E−02 | −3.526897E−01 | −1.216660E+00 | 1.786212E+01 |
| 4 | −5.670126E−01 | 4.371499E−02 | −4.061697E−01 | 1.326074E+00 | −2.745880E+00 |
| 5 | −1.114083E+02 | −1.048817E−01 | 8.931587E−01 | −4.269000E+00 | 7.900657E+00 |
| 6 | 8.419389E+01 | −1.228515E−02 | 1.169045E−01 | −4.776734E−01 | 2.181343E−01 |
| 7 | −3.290794E+02 | −3.326433E−01 | 1.832735E+00 | −2.790240E+00 | 7.836890E−01 |
| 8 | −2.756647E+01 | −2.291061E−01 | −5.834720E−01 | 9.101534E+00 | −3.210472E+01 |
| 9 | −6.527000E+01 | 8.691855E−01 | −1.216820E+00 | −8.792347E−01 | 3.181646E+00 |
| 10 | −3.636912E+00 | 3.341343E−01 | −2.815450E+00 | 1.061183E+01 | −2.336191E+01 |

| | A7 | A8 | A9 | A10 | A11 |
|---|---|---|---|---|---|
| 1 | −1.995254E+01 | 9.585686E+01 | −1.813164E+02 | 5.249905E+01 | 2.737505E+02 |
| 2 | 2.194768E+01 | −3.010644E+01 | 3.831711E+00 | 4.070454E+01 | −5.887863E+01 |
| 3 | −8.932781E+01 | 2.480616E+02 | −3.816929E+02 | 2.062303E+02 | 3.446140E+02 |
| 4 | 3.669515E+00 | −3.391325E+00 | 7.858208E+00 | −1.964755E+01 | 2.312534E+01 |
| 5 | −3.358209E+00 | −1.419339E+01 | 2.641564E+01 | −1.104313E+01 | −1.104313E+01 |
| 6 | 1.645855E−01 | −2.124827E+00 | 5.760158E+00 | −5.569923E+00 | 1.807623E+00 |
| 7 | 1.038340E+00 | 4.659711E+00 | −1.636276E+01 | 1.994668E+01 | −1.177756E+01 |
| 8 | 6.276673E+01 | −7.574085E+01 | 5.277709E+01 | −1.405705E+01 | −5.509276E+00 |
| 9 | −3.464912E+00 | 2.818891E+00 | −2.556074E+00 | 1.824786E+00 | −6.409267E−01 |
| 10 | 2.897279E+01 | −1.663846E+01 | −3.730023E+00 | 1.328924E+01 | −9.396471E+00 |

| | A12 | A13 | A14 | A15 | A16 |
|---|---|---|---|---|---|
| 1 | −2.720202E+02 | −1.277451E+02 | 2.383931E+02 | −1.115834E+01 | −5.051235E+01 |
| 2 | 5.177817E+01 | −2.765707E+01 | −2.135673E+01 | 4.543437E+01 | −1.978334E+01 |
| 3 | −7.899849E+02 | 6.612588E+02 | −2.164168E+02 | −2.238015E+01 | 2.337373E+01 |
| 4 | −1.291529E+01 | 1.057158E+01 | −1.610734E+01 | 1.103561E+01 | −2.305717E+00 |
| 5 | −6.124990E+00 | 3.561278E+01 | −2.883774E+01 | 6.430903E+00 | 5.918454E−01 |
| 6 | −2.521758E−01 | −1.748286E+00 | 5.051796E+00 | −4.033795E+00 | 1.000283E+00 |
| 7 | 3.780056E+00 | −7.771812E−01 | −7.687644E−01 | 1.118683E+00 | −3.706479E−01 |
| 8 | 2.507319E+00 | 3.178626E+00 | −2.893160E+00 | 8.991323E−01 | −1.004245E−01 |
| 9 | 6.036954E−02 | −3.649086E−02 | 5.058300E−02 | −1.860718E−02 | 2.193862E−03 |
| 10 | 2.801249E+00 | 6.189811E−02 | −2.981954E−01 | 8.247284E−02 | −7.695357E−03 |

TABLE 17

| EXAMPLE 4 • ASPHERICAL SURFACE DATA | | | | | |
|---|---|---|---|---|---|
| SURF. No. | K | A3 | A4 | A5 | A6 |
| 1 | −2.095687E+01 | −4.359779E−02 | 1.275938E+00 | −2.124436E+00 | 2.430357E+00 |
| 2 | −1.342563E+04 | 1.931696E−02 | −7.351166E−02 | 7.391338E−01 | −7.168002E+00 |
| 3 | 6.842491E+01 | 3.865849E−02 | −3.465181E−01 | −1.281121E+00 | 1.888781E+01 |
| 4 | −5.670511E−01 | 3.965263E−02 | −3.993199E−01 | 1.371544E+00 | −2.917598E+00 |
| 5 | −1.114382E+02 | −1.134036E−01 | 9.180418E−01 | −4.428343E+00 | 8.394157E+00 |
| 6 | 8.474729E+01 | 2.664726E−03 | 2.785399E−02 | −3.354076E−01 | 1.844640E−01 |
| 7 | −3.290808E+02 | −3.392939E−01 | 1.864120E+00 | −2.934272E+00 | 9.796026E−01 |
| 8 | −2.752744E+01 | −3.140686E−01 | −4.970199E−01 | 9.441162E+00 | −3.401083E+01 |
| 9 | −6.527225E+01 | 9.011647E−01 | −1.306191E+00 | −8.788844E−01 | 3.360125E+00 |
| 10 | −3.631949E+00 | 3.453314E−01 | −2.913649E+00 | 1.109969E+01 | −2.474909E+01 |

TABLE 17-continued

EXAMPLE 4 · ASPHERICAL SURFACE DATA

| | A7 | A8 | A9 | A10 | A11 |
|---|---|---|---|---|---|
| 1 | −2.138597E+01 | 1.040920E+02 | −1.991274E+02 | 5.820549E+01 | 3.078255E+02 |
| 2 | 2.352075E+01 | −3.272550E+01 | 4.170232E+00 | 4.532605E+01 | −6.608482E+01 |
| 3 | −9.587244E+01 | 2.692695E+02 | −4.189871E+02 | 2.291284E+02 | 3.872899E+02 |
| 4 | 3.931399E+00 | −3.804970E+00 | 8.896763E+00 | −2.191182E+01 | 2.595117E+01 |
| 5 | −3.635747E+00 | −1.550111E+01 | 2.911440E+01 | −1.121743E+01 | −1.230914E+01 |
| 6 | 1.154298E−01 | −2.306349E+00 | 6.329151E+00 | −6.122624E+00 | 2.014442E+00 |
| 7 | 8.914103E−01 | 5.162321E+00 | −1.795603E+01 | 2.214589E+01 | −1.317808E+01 |
| 8 | 6.734558E+00 | −8.218955E+01 | 5.793716E+01 | −1.561897E+01 | −6.194000E+00 |
| 9 | −3.714394E+00 | 3.058860E+00 | −2.807294E+00 | 2.026639E+00 | −7.206618E−01 |
| 10 | 3.107588E+01 | −1.806059E+01 | −4.095535E+00 | 1.476425E+01 | −1.056232E+01 |

| | A12 | A13 | A14 | A15 | A16 |
|---|---|---|---|---|---|
| 1 | −3.093456E+02 | −1.468925E+02 | 2.772067E+02 | −1.302483E+01 | −6.011482E+01 |
| 2 | 5.918840E+01 | −3.213560E+01 | −2.510209E+01 | 5.309680E+01 | −2.298267E+01 |
| 3 | −8.985412E+02 | 7.608582E+02 | −2.518502E+02 | −2.623370E+01 | 2.773208E+01 |
| 4 | −1.470854E+01 | 1.217770E+01 | −1.875733E+01 | 1.293857E+01 | −2.675690E+00 |
| 5 | −6.803281E+00 | 4.084114E+01 | −3.392928E+01 | 7.895188E+00 | 6.570352E−01 |
| 6 | −3.294281E−01 | −1.939739E+00 | 5.894413E+00 | −4.908055E+00 | 1.283443E+00 |
| 7 | 4.247453E+00 | −9.208345E−01 | −9.082311E−01 | 1.373471E+00 | −4.624774E−01 |
| 8 | 2.854922E+00 | 3.656988E+00 | −3.368200E+00 | 1.059077E+00 | −1.197205E−01 |
| 9 | 6.915514E−02 | −4.202904E−02 | 5.886041E−02 | −2.189927E−02 | 2.605605E−03 |
| 10 | 3.185886E+00 | 7.125818E−02 | −3.471490E−01 | 9.714324E−02 | −9.175445E−03 |

TABLE 18

EXAMPLE 5 · ASPHERICAL SURFACE DATA

| SURF. No. | K | A3 | A4 | A5 | A6 |
|---|---|---|---|---|---|
| 1 | −2.182708E+01 | −4.116080E−02 | 1.043325E+00 | −1.603531E+00 | 1.263803E+00 |
| 2 | −3.609918E+03 | −1.044021E−02 | −1.651756E−01 | 6.537868E−01 | −3.002078E+00 |
| 3 | 8.130600E+01 | 2.579150E−03 | −1.239780E−01 | −7.640455E−01 | 7.690345E+00 |
| 4 | 1.451939E+00 | 3.274120E−02 | −2.527381E−01 | 5.879177E−01 | −9.834037E−01 |
| 5 | 7.556638E+02 | −7.240695E−02 | 2.752857E−01 | −1.544049E+00 | 2.794993E+00 |
| 6 | −1.053758E+03 | −1.175144E−02 | −4.017672E−02 | −3.576333E−01 | 5.292844E−01 |
| 7 | −6.097521E+02 | −1.130833E−01 | 4.859942E−01 | −5.687017E−01 | −1.646972E−01 |
| 8 | 2.791890E+02 | −3.782669E−01 | −1.269667E−01 | 4.435087E+00 | −1.349836E+01 |
| 9 | −5.813138E+01 | 4.367151E−01 | −6.759031E−01 | −3.890137E−01 | 1.325741E+00 |
| 10 | −2.696790E+00 | 6.423968E−02 | −1.592907E+00 | 5.319415E+00 | −9.821742E+00 |

| | A7 | A8 | A9 | A10 | A11 |
|---|---|---|---|---|---|
| 1 | −6.889881E+00 | 2.846162E+01 | −4.519504E+01 | 1.069832E+01 | 4.807353E+01 |
| 2 | 7.718151E+00 | −8.909928E+00 | 9.362848E−01 | 8.484429E+00 | −1.020541E+01 |
| 3 | −3.145874E+01 | 7.345519E+01 | −9.526753E+01 | 4.319625E+01 | 6.069058E+01 |
| 4 | 1.398573E+00 | −1.283168E+00 | 1.926600E+00 | −4.103552E+00 | 4.309449E+00 |
| 5 | −1.282664E+00 | −3.921361E+00 | 6.739729E+00 | −2.154215E+00 | −1.950004E+00 |
| 6 | −8.972266E−02 | −7.922480E−01 | 1.413082E+00 | −1.107530E+00 | 4.315279E−01 |
| 7 | 3.586103E−01 | 1.395916E+00 | −3.991021E+00 | 4.183460E+00 | −2.103713E+00 |
| 8 | 2.215269E+01 | −2.245043E+01 | 1.315724E+01 | −2.944936E+00 | −9.711221E−01 |
| 9 | −1.224732E+00 | 8.360614E−01 | −6.376270E−01 | 3.825868E−01 | −1.130171E−01 |
| 10 | 1.022373E+01 | −4.933056E+00 | −9.307001E−01 | 2.784335E+00 | −1.654952E+00 |

| | A12 | A13 | A14 | A15 | A16 |
|---|---|---|---|---|---|
| 1 | −4.010045E+01 | −1.562653E+01 | 2.499799E+01 | −1.232780E+00 | −3.707940E+00 |
| 2 | 7.408253E+00 | −3.337095E+00 | −2.295137E+00 | 4.356453E+00 | −1.728445E+00 |
| 3 | −1.169053E+02 | 8.258951E+01 | −2.302754E+01 | −1.652657E+00 | 1.561261E+00 |
| 4 | −2.029338E+00 | 1.548423E+00 | −1.954324E+00 | 9.562243E−01 | −1.187279E−01 |
| 5 | −9.762099E−01 | 4.061410E+00 | −2.908034E+00 | 1.210369E+00 | −3.826175E−01 |
| 6 | −9.922094E−04 | −2.831287E−01 | 4.438160E−01 | −2.770172E−01 | 5.652892E−02 |
| 7 | 5.586439E−01 | −9.951033E−02 | −7.754257E−02 | 1.016256E−01 | −2.912535E−02 |
| 8 | 3.709977E−01 | 3.959351E−01 | −3.027782E−01 | 7.902592E−02 | −7.424995E−03 |
| 9 | 9.138805E−03 | −4.768125E−03 | 5.364178E−03 | −1.628089E−03 | 1.577334E−04 |
| 10 | 4.148243E−01 | 7.681792E−03 | −3.120131E−02 | 7.256691E−03 | −5.695054E−04 |

TABLE 19

EXAMPLE 6 • ASPHERICAL SURFACE DATA

| SURF. No. | K | A3 | A4 | A5 | A6 |
|---|---|---|---|---|---|
| 1 | −2.095444E+01 | −5.246653E−02 | 1.277602E+00 | −2.123582E+00 | 2.433261E+00 |
| 2 | −1.343254E+04 | 1.875521E−02 | −7.043900E−02 | 7.417485E−01 | −7.159937E+00 |
| 3 | 6.851430E+01 | 3.790711E−02 | −3.434071E−01 | −1.274218E+00 | 1.890139E+01 |
| 4 | −5.669478E−01 | 4.105567E−02 | −3.947903E−01 | 1.374486E−01 | −2.916153E+00 |
| 5 | −1.114058E+02 | −1.136739E−01 | 9.226192E−01 | −4.438561E+00 | 8.400015E+00 |
| 6 | 8.423170E+01 | −4.128864E−03 | 2.249256E−02 | −3.321477E−01 | 1.877389E−01 |
| 7 | −3.290840E+02 | −3.208882E−01 | 1.860650E+00 | −2.924092E+00 | 9.809737E−01 |
| 8 | −2.756653E+01 | −2.876736E−01 | −4.865997E−01 | 9.438699E+00 | −3.402169E+01 |
| 9 | −6.527203E+01 | 8.983369E−01 | −1.290398E+00 | −8.761036E−01 | 3.359110E+00 |
| 10 | −3.634275E+00 | 3.222864E−01 | −2.871814E+00 | 1.107917E+01 | −2.474438E+01 |

| | A7 | A8 | A9 | A10 | A11 |
|---|---|---|---|---|---|
| 1 | −2.138275E+01 | 1.040902E+02 | −1.991244E+02 | 5.820804E+01 | 3.078038E+02 |
| 2 | 2.353672E+01 | −3.271237E+01 | 4.171643E+00 | 4.531563E+01 | −6.610960E+01 |
| 3 | −9.586266E+01 | 2.692725E+02 | −4.189879E+02 | 2.291071E+02 | 3.872605E+02 |
| 4 | 3.930363E+00 | −3.794595E+00 | 8.905346E+00 | −2.191211E+01 | 2.594779E+01 |
| 5 | −3.626325E+00 | −1.550124E+01 | 2.910500E+01 | −1.123447E+01 | −1.228843E+01 |
| 6 | 1.084432E−01 | −2.310220E+00 | 6.327687E+00 | −6.119372E+00 | 2.014219E+00 |
| 7 | 8.725973E−01 | 5.180265E+00 | −1.796674E+01 | 2.213936E+01 | −1.316535E+01 |
| 8 | 6.734459E+01 | −8.218811E+01 | 5.793770E+01 | −1.561852E+01 | −6.194037E+00 |
| 9 | −3.715114E+00 | 3.058500E+00 | −2.807398E+00 | 2.026635E+00 | −7.206607E−01 |
| 10 | 3.107286E+01 | −1.805866E+01 | −4.095379E+00 | 1.476431E+01 | −1.056236E+01 |

| | A12 | A13 | A14 | A15 | A16 |
|---|---|---|---|---|---|
| 1 | −3.093612E+02 | −1.468593E+02 | 2.772067E+02 | −1.295732E+01 | −6.014293E+01 |
| 2 | 5.913909E+01 | −3.214923E+01 | −2.512366E+01 | 5.315787E+01 | −2.289518E+01 |
| 3 | −8.985738E+02 | 7.603337E+02 | −2.518393E+02 | −2.622283E+01 | 2.780432E+01 |
| 4 | −1.471472E+01 | 1.216186E+01 | −1.877045E+01 | 1.292978E+01 | −2.655633E+00 |
| 5 | −6.808549E+00 | 4.085841E+01 | −3.389899E+01 | 7.904001E+00 | 6.233355E−01 |
| 6 | −3.319237E−01 | −1.941614E+00 | 5.890191E+00 | −4.903650E+00 | 1.287024E+00 |
| 7 | 4.242695E+00 | −9.216117E−01 | −9.064101E−01 | 1.372309E+00 | −4.622983E−01 |
| 8 | 2.854920E+00 | 3.656966E+00 | −3.368218E+00 | 1.059077E+00 | −1.197224E−01 |
| 9 | 6.916796E−02 | −4.201206E−02 | 5.886633E−02 | −2.189917E−02 | 2.603191E−03 |
| 10 | 3.185853E+00 | 7.124129E−02 | −3.471563E−01 | 9.714375E−02 | −9.172140E−03 |

TABLE 20

EXAMPLE 7 • ASPHERICAL SURFACE DATA

| SURF. No. | K | A3 | A4 | A5 | A6 |
|---|---|---|---|---|---|
| 1 | −2.070465E+01 | −4.677069E−02 | 1.057595E+00 | −1.596958E+00 | 1.245243E+00 |
| 2 | −9.301359E+03 | −1.642075E−02 | −9.165845E−02 | 4.973549E−01 | −2.809512E+00 |
| 3 | 9.719907E+02 | 6.289248E−03 | −1.492873E−01 | −7.092353E−01 | 7.578684E+00 |
| 4 | −6.240327E−01 | 3.734646E−02 | −2.798245E−01 | 6.223163E−01 | −9.960961E−01 |
| 5 | −3.765063E+03 | −5.940965E−02 | 2.627295E−01 | −1.543577E+00 | 2.786216E+00 |
| 6 | −2.692828E+03 | −1.047120E−02 | −5.267208E−02 | −3.420856E−01 | 5.246736E−01 |
| 7 | −3.713789E+02 | −1.300877E−01 | 5.238609E−01 | −6.101177E−01 | −1.477075E−01 |
| 8 | 1.080355E+02 | −3.748094E−01 | −1.242729E+00 | 4.403227E+00 | −1.339250E+01 |
| 9 | −6.290272E+01 | 4.630980E−01 | −6.925738E−01 | −3.864692E−01 | 1.317267E+00 |
| 10 | −2.500566E+00 | 5.156683E−02 | −1.578844E+00 | 5.279372E+00 | −9.738936E+00 |

| | A7 | A8 | A9 | A10 | A11 |
|---|---|---|---|---|---|
| 1 | −6.822076E+00 | 2.815721E+01 | −4.461269E+01 | 1.054147E+01 | 4.729887E+01 |
| 2 | 7.617950E+00 | −8.870852E+00 | 9.142650E−01 | 8.385246E+00 | −1.001736E+01 |
| 3 | −3.116331E+01 | 7.265484E+01 | −9.403572E+01 | 4.257162E+01 | 5.971550E+01 |
| 4 | 1.368837E+00 | −1.270115E+00 | 1.910997E+00 | −4.034233E+00 | 4.247206E+00 |
| 5 | −1.265501E+00 | −3.885235E+00 | 6.652257E+00 | −2.125237E+00 | −1.919896E+00 |
| 6 | −9.067594E−02 | −7.841259E−01 | 1.395075E+00 | −1.091529E+00 | 4.257698E−01 |
| 7 | 3.577141E−01 | 1.381070E+00 | −3.940193E+00 | 4.123032E+00 | −2.071091E+00 |
| 8 | 2.194111E+01 | −2.219866E+01 | 1.298952E+01 | −2.902600E+00 | −9.556569E−01 |
| 9 | −1.212724E+00 | 8.266969E−01 | −6.294885E−01 | 3.770650E−01 | −1.112130E−01 |
| 10 | 1.012483E+01 | −4.877959E+00 | −9.187915E−01 | 2.744290E+00 | −1.628536E+00 |

| | A12 | A13 | A14 | A15 | A16 |
|---|---|---|---|---|---|
| 1 | −3.939603E+01 | −1.532211E+01 | 2.448737E+01 | −1.203097E+00 | −3.624771E+00 |
| 2 | 7.289396E+00 | −3.277210E+00 | −2.252958E+00 | 4.248668E+00 | −1.693754E+00 |
| 3 | −1.148586E+02 | 8.101051E+01 | −2.255070E+01 | −1.617516E+00 | 1.518068E+00 |

TABLE 20-continued

| EXAMPLE 7 • ASPHERICAL SURFACE DATA | | | | | |
|---|---|---|---|---|---|
| 4 | −1.997518E+00 | 1.507552E+00 | −1.926915E+00 | 9.348297E−01 | −9.608104E−02 |
| 5 | −9.592470E−01 | 3.985551E+00 | −2.850166E+00 | 1.185668E+00 | −3.670448E−01 |
| 6 | −5.095142E−04 | −2.769933E−01 | 4.350648E−01 | −2.706267E−01 | 5.526058E−02 |
| 7 | 5.486528E−01 | −9.767149E−02 | −7.582365E−02 | 9.938810E−02 | −2.837118E−02 |
| 8 | 3.644869E−01 | 3.883647E−01 | −2.965217E−01 | 7.726014E−02 | −7.249091E−03 |
| 9 | 8.972809E−03 | −4.676947E−03 | 5.253029E−03 | −1.591864E−03 | 1.541980E−04 |
| 10 | 4.075468E−01 | 7.534739E−03 | −3.055495E−02 | 7.095091E−03 | −5.559030E−04 |

TABLE 21

| EXAMPLE 8 • ASPHERICAL SURFACE DATA | | | | | |
|---|---|---|---|---|---|
| SURF. No. | K | A3 | A4 | A5 | A6 |
| 1 | −2.369345E+01 | −1.790458E−02 | 1.111266E+00 | −1.201170E+00 | 2.397087E−01 |
| 2 | −3.535704E+05 | −1.570100E−02 | −1.195870E−01 | 8.529013E−01 | −6.407303E+00 |
| 3 | −8.283320E+05 | 8.791931E−02 | −3.789550E−01 | −1.137028E+00 | 1.674642E+01 |
| 4 | 2.328410E+00 | 2.880101E−02 | −2.870636E−01 | 1.159842E+00 | −2.570532E+00 |
| 5 | −1.279617E+11 | −5.698655E−02 | 6.123875E−01 | −3.621769E+00 | 7.229295E+00 |
| 6 | −7.592227E+00 | 6.834030E−03 | −4.239356E−02 | −3.346567E−01 | 2.732502E−01 |
| 7 | −9.820830E+01 | −3.097602E−01 | 1.626439E+00 | −2.579410E+00 | 6.482574E−01 |
| 8 | −3.488360E+02 | −1.803034E−01 | −8.668073E−01 | 8.841433E+00 | −3.010112E+01 |
| 9 | −7.288435E+01 | 8.338911E−01 | −1.145829E+00 | −8.392039E−01 | 2.981672E+00 |
| 10 | −3.588666E+00 | 3.524650E−01 | −2.746527E+00 | 1.010621E+01 | −2.191658E+01 |

| | A7 | A8 | A9 | A10 | A11 |
|---|---|---|---|---|---|
| 1 | −1.813118E+01 | 9.087296E+01 | −1.620962E+02 | 3.789255E+01 | 2.411543E+02 |
| 2 | 2.002103E+01 | −2.730060E+01 | 4.225773E+00 | 3.416189E+01 | −5.033654E+01 |
| 3 | −8.265116E+01 | 2.273458E+02 | −3.455142E+02 | 1.836068E+02 | 3.032247E+02 |
| 4 | 3.565867E+00 | −3.347197E+00 | 7.192007E+00 | −1.753383E+01 | 2.158336E+01 |
| 5 | −3.250843E+00 | −1.305617E+01 | 2.400275E+01 | −8.893103E+00 | −9.492688E+00 |
| 6 | 1.514470E−01 | −2.046157E+00 | 5.204419E+00 | −4.973703E+00 | 1.641207E+00 |
| 7 | 1.045536E+00 | 4.288848E+00 | −1.480291E+01 | 1.775596E+01 | −1.036542E+01 |
| 8 | 5.810985E+01 | −6.926279E+01 | 4.764167E+01 | −1.253242E+01 | −4.845962E+00 |
| 9 | −3.211618E+00 | 2.577705E+00 | −2.307319E+00 | 1.626646E+00 | −5.640239E−01 |
| 10 | 2.683253E+01 | −1.521542E+01 | −3.367756E+00 | 1.184541E+01 | −8.269169E+00 |

| | A12 | A13 | A14 | A15 | A16 |
|---|---|---|---|---|---|
| 1 | −2.303557E+02 | −1.057387E+02 | 1.989268E+02 | −1.399096E+01 | −3.936061E+01 |
| 2 | 4.785063E+01 | −2.772971E+01 | −2.415346E+01 | 5.238032E+01 | −2.388755E+01 |
| 3 | −6.849581E+02 | 5.662319E+02 | −1.813394E+02 | −2.102853E+01 | 1.967544E+01 |
| 4 | −1.304183E+01 | 7.486274E+00 | −1.041949E+01 | 9.899873E+00 | −3.703253E+01 |
| 5 | −5.530634E+00 | 3.048877E+01 | −2.437817E+01 | 5.353614E+00 | 4.519720E−01 |
| 6 | −1.920806E−01 | −1.491575E+00 | 4.250677E+00 | −3.394049E+00 | 8.342721E−01 |
| 7 | 3.274152E+00 | −6.386483E−01 | −6.551211E−01 | 9.345491E−01 | −3.063039E−01 |
| 8 | 2.179413E+00 | 2.727627E+00 | −2.449982E+00 | 7.519000E−01 | −8.324562E−02 |
| 9 | 5.250335E−02 | −3.130657E−02 | 4.283884E−02 | −1.555851E−02 | 1.809073E−03 |
| 10 | 2.433926E+00 | 5.312126E−02 | −2.525610E−01 | 6.896510E−02 | −6.354659E−03 |

TABLE 22

| EXAMPLE 9 • ASPHERICAL SURFACE DATA | | | | | |
|---|---|---|---|---|---|
| SURF. No. | K | A3 | A4 | A5 | A6 |
| 1 | −2.119388E+01 | −3.084332E−02 | 1.251902E+00 | −1.997361E+00 | 2.054248E+00 |
| 2 | −3.890591E+03 | −1.429063E−02 | 5.149289E−02 | 6.295444E−01 | −6.461084E+00 |
| 3 | −2.927721E+04 | 4.501943E−02 | −3.047543E−01 | −1.167119E+00 | 1.675298E+01 |
| 4 | −4.934003E−01 | 5.188260E−02 | −3.550203E−01 | 1.187622E+00 | −2.545988E+00 |
| 5 | −1.302960E+06 | −1.191618E−01 | 8.434488E−01 | −3.900618E+00 | 7.290836E+00 |
| 6 | 6.613045E+01 | −1.528920E−02 | 9.400521E−02 | −4.813340E−01 | 2.759330E−01 |
| 7 | −3.189725E+02 | −2.086464E−01 | 1.425189E+00 | −2.440153E+00 | 6.939524E−01 |
| 8 | −3.050848E+00 | −4.421456E−02 | −9.322155E−01 | 8.776286E+00 | −3.006533E+01 |
| 9 | −8.000741E+01 | 8.113200E−01 | −1.154674E+00 | −8.354887E−01 | 2.983244E+00 |
| 10 | −4.140770E+00 | 3.156019E−01 | −2.723843E+00 | 1.009820E+01 | −2.191614E+01 |

TABLE 22-continued

EXAMPLE 9 • ASPHERICAL SURFACE DATA

| | A7 | A8 | A9 | A10 | A11 |
|---|---|---|---|---|---|
| 1 | −1.838820E+01 | 8.783146E+01 | −1.633164E+02 | 4.617308E+01 | 2.404395E+02 |
| 2 | 2.028705E+01 | −2.734940E+01 | 3.609532E+00 | 3.618543E+01 | −5.212052E+01 |
| 3 | −8.277025E+01 | 2.267846E+02 | −3.445905E+02 | 1.838779E+02 | 3.030460E+02 |
| 4 | 3.464242E+00 | −3.014321E+00 | 6.925243E+00 | −1.783303E+01 | 2.115270E+01 |
| 5 | −3.192061E+00 | −1.290682E+01 | 2.375124E+01 | −8.731975E+00 | −9.549881E+00 |
| 6 | 1.939657E−01 | −1.993536E+00 | 5.196251E+00 | −5.008990E+00 | 1.624195E+00 |
| 7 | 9.357142E−01 | 4.281761E+00 | −1.479499E+01 | 1.778304E+01 | −1.035580E+01 |
| 8 | 5.812094E+01 | −6.926146E+01 | 4.764053E+01 | −1.253341E+01 | −4.847019E+00 |
| 9 | −3.209586E+00 | 2.577847E+00 | −2.307607E+00 | 1.626582E+00 | −5.640228E−01 |
| 10 | 2.683410E+01 | −1.521500E+01 | −3.367667E+00 | 1.184525E+01 | −8.269185E+00 |

| | A12 | A13 | A14 | A15 | A16 |
|---|---|---|---|---|---|
| 1 | −2.361902E+02 | −1.093549E+02 | 2.027944E+02 | −8.820580E+00 | −4.311205E+01 |
| 2 | 4.431885E+01 | −2.301314E+01 | −1.741039E+01 | 3.805681E+01 | −1.714225E+01 |
| 3 | −6.858384E+02 | 5.669012E+02 | −1.838830E+02 | −1.791679E+01 | 1.903204E+01 |
| 4 | −1.166839E+01 | 8.032465E+00 | −1.133423E+01 | 7.756820E+00 | −1.712910E+00 |
| 5 | −5.455041E+00 | 3.047056E+01 | −2.439632E+01 | 5.305674E+00 | 5.199273E−01 |
| 6 | −1.922318E−01 | −1.479164E+00 | 4.280689E+00 | −3.384219E+00 | 8.186510E−01 |
| 7 | 3.281645E+00 | −6.646157E−01 | −6.545685E−01 | 9.378154E−01 | −3.056001E−01 |
| 8 | 2.179264E+00 | 2.727394E+00 | −2.450055E+00 | 7.518942E−01 | −8.310776E−02 |
| 9 | 5.246672E−02 | −3.129840E−02 | 4.283536E−02 | −1.556140E−02 | 1.811949E−03 |
| 10 | 2.433900E+00 | 5.310385E−02 | −2.525479E−01 | 6.896250E−02 | −6.353675E−03 |

TABLE 23

EXAMPLE 10 • ASPHERICAL SURFACE DATA

| SURF. No. | K | A3 | A4 | A5 | A6 |
|---|---|---|---|---|---|
| 1 | −2.318511E+01 | −3.578738E−02 | 1.235289E+00 | −1.566591E+00 | 5.796710E−01 |
| 2 | −1.304672E+05 | −6.614507E−03 | −8.793526E−02 | 7.917013E−01 | −6.468121E+00 |
| 3 | −7.070627E+05 | 8.756027E−02 | −3.824928E−01 | −1.155783E+00 | 1.679453E+01 |
| 4 | 2.509203E+00 | 3.033341E−02 | −2.844587E−01 | 1.144278E+00 | −2.586462E+00 |
| 5 | −1.206508E+09 | −7.933304E−02 | 6.475526E−01 | −3.580068E+00 | 7.193045E+00 |
| 6 | 2.315054E+01 | −1.207938E−02 | 5.389101E−03 | −3.475186E−01 | 2.654198E−01 |
| 7 | −1.010232E+01 | −3.108220E−01 | 1.633380E+00 | −2.574662E+00 | 6.462839E−01 |
| 8 | −1.540291E+03 | −1.704675E−01 | −8.853417E−01 | 8.839965E+00 | −3.009630E+01 |
| 9 | −6.948997E+01 | 8.214267E−01 | −1.143750E+00 | −8.390627E−01 | 2.983250E+00 |
| 10 | −4.095013E+00 | 3.574772E−01 | −2.754071E+00 | 1.010788E+01 | −2.191617E+01 |

| | A7 | A8 | A9 | A10 | A11 |
|---|---|---|---|---|---|
| 1 | −1.764322E+01 | 9.042540E+01 | −1.647711E+02 | 4.339397E+01 | 2.383696E+02 |
| 2 | 2.015351E+01 | −2.727428E+01 | 4.292938E+00 | 3.401427E+01 | −5.010549E+01 |
| 3 | −8.268116E+01 | 2.272219E+02 | −3.456533E+02 | 1.843758E+02 | 3.028720E+02 |
| 4 | 3.561258E+00 | −3.340167E+00 | 7.235763E+00 | −1.748317E+01 | 2.159945E+01 |
| 5 | −3.307543E+00 | −1.309799E+01 | 2.401383E+01 | −8.751897E+00 | −9.481819E+00 |
| 6 | 1.514303E−01 | −2.051598E+00 | 5.203150E+00 | −4.975956E+00 | 1.644236E+00 |
| 7 | 1.050156E+00 | 4.280395E+00 | −1.480668E+01 | 1.775426E+01 | −1.036187E+01 |
| 8 | 5.811225E+01 | −6.926315E+01 | 4.764145E+01 | −1.253279E+01 | −4.846165E+00 |
| 9 | −3.211729E+00 | 2.577644E+00 | −2.307404E+00 | 1.626685E+00 | −5.640291E−01 |
| 10 | 2.683289E+01 | −1.521527E+01 | −3.367630E+00 | 1.184529E+01 | −8.269212E+00 |

| | A12 | A13 | A14 | A15 | A16 |
|---|---|---|---|---|---|
| 1 | −2.333671E+02 | −1.030570E+02 | 2.069989E+02 | −2.888892E+01 | −3.224368E+01 |
| 2 | 4.538265E+01 | −2.601896E+01 | −1.651263E+01 | 4.008646E+01 | −1.865220E+01 |
| 3 | −6.856240E+02 | 5.671773E+02 | −1.838961E+02 | −1.700283E+01 | 1.777224E+01 |
| 4 | −1.314296E+01 | 7.140554E+00 | −1.036469E+01 | 1.045253E+01 | −3.936124E+00 |
| 5 | −5.507387E+00 | 3.044557E+01 | −2.448197E+01 | 5.214854E+00 | 6.323819E−01 |
| 6 | −1.857206E−01 | −1.482833E+00 | 4.257324E+00 | −3.393314E+00 | 8.237180E−01 |
| 7 | 3.275598E+00 | −6.381826E−01 | −6.547354E−01 | 9.346156E−01 | −3.067790E−01 |
| 8 | 2.179412E+00 | 2.727634E+00 | −2.449976E+00 | 7.519112E−01 | −8.322703E−02 |
| 9 | 5.250643E−02 | −3.131096E−02 | 4.283823E−02 | −1.555987E−02 | 1.810045E−03 |
| 10 | 2.433927E+00 | 5.312748E−02 | −2.525602E−01 | 6.896518E−02 | −6.354732E−03 |

TABLE 24

EXAMPLE 11 • ASPHERICAL SURFACE DATA

| SURF. No. | K | A3 | A4 | A5 | A6 |
|---|---|---|---|---|---|
| 1 | −2.319386E+01 | −3.439863E−02 | 1.244927E+00 | −1.582566E+00 | 5.718747E−01 |
| 2 | −1.195050E+05 | −6.136958E−03 | −8.780113E−02 | 7.897725E−01 | −6.470451E+00 |
| 3 | −7.369601E+05 | 8.725264E−02 | −3.837801E−01 | −1.155892E+00 | 1.679525E+01 |
| 4 | 2.527323E+00 | 3.030083E−02 | −2.845972E−01 | 1.144049E+00 | −2.586622E+00 |
| 5 | −1.766041E+08 | −7.724936E−02 | 6.472058E−01 | −3.582351E+00 | 7.193225E+00 |
| 6 | 2.309911E+01 | −1.273506E−02 | 7.480089E−03 | −3.467380E−01 | 2.647568E−01 |
| 7 | −1.018820E+01 | −3.148234E−01 | 1.631297E+00 | −2.573902E+00 | 6.462463E−01 |
| 8 | −3.152992E+05 | −1.804681E−01 | −8.840972E−01 | 8.840308E+00 | −3.009602E+01 |
| 9 | −6.903575E+01 | 8.215070E−01 | −1.143941E+00 | −8.390796E−01 | 2.983245E+00 |
| 10 | −4.100829E+00 | 3.572089E−01 | −2.754133E+00 | 1.010780E+01 | −2.191621E+01 |

| | A7 | A8 | A9 | A10 | A11 |
|---|---|---|---|---|---|
| 1 | −1.762435E+01 | 9.044561E+01 | −1.647216E+02 | 4.324386E+01 | 2.383089E+02 |
| 2 | 2.015336E+01 | −2.726348E+01 | 4.313160E+00 | 3.399806E+01 | −5.011974E+01 |
| 3 | −8.267987E+01 | 2.272258E+02 | −3.456645E+02 | 1.843856E+02 | 3.028919E+02 |
| 4 | 3.562044E+00 | −3.337716E+00 | 7.238826E+00 | −1.748079E+01 | 2.159931E+01 |
| 5 | −3.306049E+00 | −1.309681E+01 | 2.401248E+01 | −8.753235E+00 | −9.482084E+00 |
| 6 | 1.508628E−01 | −2.051585E+00 | 5.203561E+00 | −4.975351E+00 | 1.644797E+00 |
| 7 | 1.050168E+00 | 4.280350E+00 | −1.480675E+01 | 1.775440E+01 | −1.036179E+01 |
| 8 | 5.811245E+01 | −6.926311E+01 | 4.764145E+01 | −1.253283E+01 | −4.846179E+00 |
| 9 | −3.211722E+00 | 2.577644E+00 | −2.307404E+00 | 1.626885E+00 | −5.640298E−01 |
| 10 | 2.683289E+01 | −1.521527E+01 | −3.367629E+00 | 1.184529E+01 | −8.269211E+00 |

| | A12 | A13 | A14 | A15 | A16 |
|---|---|---|---|---|---|
| 1 | −2.331968E+02 | −1.030401E+02 | 2.072721E+02 | −2.949444E+01 | −3.196312E+01 |
| 2 | 4.523576E+01 | −2.582686E+01 | −1.626578E+01 | 3.960154E+01 | −1.846121E+01 |
| 3 | −6.856000E+02 | 5.670917E+02 | −1.838701E+02 | −1.698025E+01 | 1.775843E+01 |
| 4 | −1.313902E+01 | 7.100352E+00 | −1.036330E+01 | 1.057696E+01 | −4.035212E+00 |
| 5 | −5.506353E+00 | 3.044716E+01 | −2.447942E+01 | 5.215982E+00 | 6.274297E−01 |
| 6 | −1.854289E−01 | −1.482799E+00 | 4.257131E+00 | −3.393634E+00 | 8.233574E−01 |
| 7 | 3.275649E+00 | −6.381200E−01 | −6.547108E−01 | 9.346015E−01 | −3.068133E−01 |
| 8 | 2.179390E+00 | 2.727631E+00 | −2.449975E+00 | 7.519127E−01 | −8.322442E−02 |
| 9 | 5.250640E−02 | −3.131091E−02 | 4.283826E−02 | −1.555989E−02 | 1.810063E−03 |
| 10 | 2.433927E+00 | 5.312741E−02 | −2.525602E−01 | 6.896518E−02 | −6.354731E−03 |

TABLE 25

EXAMPLE 12 • ASPHERICAL SURFACE DATA

| SURF. No. | K | A3 | A4 | A5 | A6 |
|---|---|---|---|---|---|
| 1 | −2.334757E+01 | −3.150965E−02 | 1.175919E+00 | −1.526276E+00 | 9.010247E−01 |
| 2 | −2.080599E+05 | −1.419296E−02 | −6.385116E−02 | 7.972797E−01 | −6.478964E+00 |
| 3 | −4.471538E+05 | 9.645978E−02 | −3.789637E−01 | −1.164383E+00 | 1.679064E+01 |
| 4 | 2.508919E+00 | 3.525117E−02 | −2.919810E−01 | 1.140991E+00 | −2.588181E+00 |
| 5 | −5.268352E+10 | −7.932793E−02 | 6.216278E−01 | −3.517237E+00 | 7.178657E+00 |
| 6 | 3.283903E+01 | −7.190186E−03 | −8.724788E−03 | −3.516607E−01 | 2.785505E−01 |
| 7 | −3.816333E+01 | −3.318092E−01 | 1.661650E+00 | −2.583654E+00 | 6.375792E−01 |
| 8 | −7.489990E+01 | −1.295467E−01 | −9.109671E−01 | 8.841753E+00 | −3.009536E+01 |
| 9 | −7.375891E+01 | 8.196274E−01 | −1.142757E+00 | −8.390987E−01 | 2.983381E+00 |
| 10 | −4.023096E+00 | 3.569765E−01 | −2.753533E+00 | 1.010759E+01 | −2.191617E+01 |

| | A7 | A8 | A9 | A10 | A11 |
|---|---|---|---|---|---|
| 1 | −1.805778E+01 | 8.973084E+01 | −1.643594E+02 | 4.555719E+01 | 2.376753E+02 |
| 2 | 2.010302E+01 | −2.733090E+01 | 4.297374E+00 | 3.447128E+01 | −5.038867E+01 |
| 3 | −8.268969E+01 | 2.272063E+02 | −3.456787E+02 | 1.843338E+02 | 3.029384E+02 |
| 4 | 3.559015E+00 | −3.346016E+00 | 7.211554E+00 | −1.752318E+01 | 2.159224E+01 |
| 5 | −3.349161E+00 | −1.311584E+01 | 2.401917E+01 | −8.727177E+00 | −9.456258E+00 |
| 6 | 1.599750E−01 | −2.050215E+00 | 5.192990E+00 | −4.985109E+00 | 1.637506E+00 |
| 7 | 1.049011E+00 | 4.283295E+00 | −1.480389E+01 | 1.775574E+01 | −1.036219E+01 |
| 8 | 5.811133E+01 | −6.926331E+01 | 4.764127E+01 | −1.253244E+01 | −4.845917E+00 |
| 9 | −3.211683E+00 | 2.577738E+00 | −2.307407E+00 | 1.626684E+00 | −5.640433E−01 |
| 10 | 2.683272E+01 | −1.521532E+01 | −3.367640E+00 | 1.184529E+01 | −8.269210E+00 |

| | A12 | A13 | A14 | A15 | A16 |
|---|---|---|---|---|---|
| 1 | −2.338542E+02 | −1.069027E+02 | 2.034020E+02 | −1.294526E+01 | −4.148137E+01 |
| 2 | 4.473032E+01 | −2.480221E+01 | −1.807003E+01 | 4.170093E+01 | −1.938213E+01 |
| 3 | −6.852426E+02 | 5.665289E+02 | −1.831954E+02 | −1.781227E+01 | 1.815816E+01 |

TABLE 25-continued

EXAMPLE 12 • ASPHERICAL SURFACE DATA

| | | | | | |
|---|---|---|---|---|---|
| 4 | −1.294761E+01 | 7.398639E+00 | −1.087156E+01 | 1.011974E+01 | −3.457694E+00 |
| 5 | −5.499135E+00 | 3.041145E+01 | −2.453749E+01 | 5.179174E+00 | 7.307374E−01 |
| 6 | −1.882025E−01 | −1.481301E+00 | 4.261049E+00 | −3.389750E+00 | 8.251908E−01 |
| 7 | 3.274586E+00 | −6.390444E−01 | −6.553358E−01 | 9.345820E−01 | −3.063369E−01 |
| 8 | 2.179575E+00 | 2.727685E+00 | −2.449965E+00 | 7.512909E−01 | −8.326652E−02 |
| 9 | 5.250241E−02 | −3.130969E−02 | 4.283719E−02 | −1.555947E−02 | 1.810247E−03 |
| 10 | 2.433929E+00 | 5.312978E−02 | −2.525601E−01 | 6.896516E−02 | −6.354857E−03 |

TABLE 26

EXAMPLE 13 • ASPHERICAL SURFACE DATA

| SURF. No. | K | A3 | A4 | A5 | A6 |
|---|---|---|---|---|---|
| 1 | −2.317999E+01 | −3.304124E−02 | 1.248970E+00 | −1.584821E+00 | 5.665882E−01 |
| 2 | −1.210727E+05 | −5.478176E−03 | −8.675857E−02 | 7.902281E−01 | −6.468705E+00 |
| 3 | −7.332330E+05 | 8.685306E−02 | −3.849358E−01 | −1.156896E+00 | 1.679518E+01 |
| 4 | 2.528715E+00 | 2.966553E−02 | −2.845741E−01 | 1.143794E+00 | −2.586737E+00 |
| 5 | −4.057148E+08 | −7.861277E−02 | 6.549048E−01 | −3.583168E−01 | 7.192311E+00 |
| 6 | 2.305458E+01 | −1.167023E−02 | 9.938881E−03 | −3.452851E−01 | 2.649359E−01 |
| 7 | −1.028804E+01 | −3.161929E−01 | 1.631418E+01 | 2.573903E+00 | 6.462255E−01 |
| 8 | −3.144679E+05 | −1.848202E−01 | −8.832289E−01 | 8.840747E+00 | −3.009580E+01 |
| 9 | −6.898010E+01 | 8.213696E−01 | −1.143948E+00 | −8.390657E−01 | 2.983264E+00 |
| 10 | −4.100306E+00 | 3.568392E−01 | −2.754186E+00 | 1.010781E+01 | −2.191618E+01 |
| | A7 | A8 | A9 | A10 | A11 |
| 1 | −1.761993E+01 | 9.045331E+01 | −1.647191E+02 | 4.325317E+01 | 2.382721E+02 |
| 2 | 2.015670E+01 | −2.725821E+01 | 4.316623E+00 | 3.399577E+01 | −5.015558E+01 |
| 3 | −8.267851E+01 | 2.272291E+02 | −3.456530E+02 | 1.843821E+02 | 3.028753E+02 |
| 4 | 3.562004E+00 | −3.337776E+00 | 7.239695E+00 | −1.747816E+01 | 2.167360E+01 |
| 5 | −3.306485E+00 | −1.309685E+01 | 2.401307E+01 | −8.753218E+00 | −9.482035E+00 |
| 6 | 1.503726E−01 | −2.052187E+00 | 5.203144E+00 | −4.975648E+00 | 1.644708E+00 |
| 7 | 1.050270E+00 | 4.280561E+00 | −1.480654E+01 | 1.775456E+01 | −1.036168E+01 |
| 8 | 5.811251E+01 | −6.926309E+01 | 4.764144E+01 | −1.253284E+01 | −4.846183E+00 |
| 9 | −3.211712E+00 | 2.577647E+00 | −2.307403E+00 | 1.626685E+00 | −5.640300E−01 |
| 10 | 2.683291E+01 | −1.521526E+01 | −3.367628E+00 | 1.184529E+01 | −8.269211E+00 |
| | A12 | A13 | A14 | A15 | A16 |
| 1 | −2.331912E+02 | −1.030153E+02 | 2.073308E+02 | −2.959622E+01 | −3.193135E+01 |
| 2 | 4.522600E+01 | −2.575832E+01 | −1.625970E+01 | 3.948067E+01 | −1.838700E+01 |
| 3 | −6.856217E+02 | 5.670696E+02 | −1.838651E+02 | −1.692999E+01 | 1.774418E+01 |
| 4 | −1.313644E+01 | 7.087742E+00 | −1.037980E+01 | 1.054401E+01 | −3.984391E+00 |
| 5 | −5.506149E+00 | 3.044728E+01 | −2.447963E+01 | 5.215315E+00 | 6.251964E−01 |
| 6 | −1.854242E−01 | −1.482716E+00 | 4.257304E+00 | −3.393466E+00 | 8.235103E−01 |
| 7 | 3.275708E+00 | −6.380928E−01 | −6.547125E−01 | 9.345857E−01 | −3.068361E−01 |
| 8 | 2.179389E+00 | 2.727632E+00 | −2.449973E+00 | 7.519145E−01 | −8.322283E−02 |
| 9 | 5.250635E−02 | −3.131102E−02 | 4.283823E−02 | −1.555988E−02 | 1.810060E−03 |
| 10 | 2.433927E+00 | 5.312739E−02 | −2.525602E−01 | 6.896516E−02 | −6.354734E−03 |

TABLE 27

VALUES OF CONDITIONAL EXPRESSIONS

| | EXP. No. | EXAMPLE 1 | EXAMPLE 2 | EXAMPLE 3 | EXAMPLE 4 | EXAMPLE 5 |
|---|---|---|---|---|---|---|
| f3/f1 | (1) | 4.3 | 4.7 | 5.8 | 6.5 | 23.6 |
| f2/f1 | (2) | −2.2 | −2.3 | −2.3 | −2.2 | −1.9 |
| D6/f | (3) | 0.14 | 0.14 | 0.13 | 0.12 | 0.14 |
| D6/D8 | (4) | 4.93 | 4.06 | 3.47 | 2.95 | 5.39 |
| νd1 | (5) | 54.88 | 54.88 | 54.88 | 54.88 | 54.88 |
| νd2 | (6) | 23.63 | 23.63 | 23.63 | 23.63 | 23.63 |
| D2/D1 | (7) | 0.19 | 0.16 | 0.14 | 0.14 | 0.13 |
| |R3/f2| | (8) | 33.6 | 5.5 | 3.6 | 3.9 | 5.4 |
| TL/f | (9) | 1.11 | 1.10 | 1.14 | 1.13 | 1.07 |
| (R7 − R8)/(R7 + R8) | (10) | −0.15 | −0.04 | −0.06 | −0.19 | −0.39 |

TABLE 27-continued

VALUES OF CONDITIONAL EXPRESSIONS

| | EXP. No. | EXAMPLE 6 | EXAMPLE 7 | EXAMPLE 8 | EXAMPLE 9 | EXAMPLE 10 |
|---|---|---|---|---|---|---|
| f3/f1 | (1) | 6.0 | 14.2 | 13.4 | 8.2 | 9.2 |
| f2/f1 | (2) | −2.2 | −1.9 | −2.1 | −2.7 | −2.2 |
| D6/f | (3) | 0.14 | 0.14 | 0.11 | 0.12 | 0.12 |
| D6/D8 | (4) | 4.20 | 4.94 | 2.37 | 2.97 | 2.82 |
| vd1 | (5) | 54.88 | 54.88 | 54.88 | 54.88 | 54.88 |
| vd2 | (6) | 23.63 | 23.63 | 23.63 | 23.63 | 23.63 |
| D2/D1 | (7) | 0.14 | 0.13 | 0.11 | 0.14 | 0.11 |
| |R3/f2| | (8) | 3.7 | 11.1 | 7.0 | 12.3 | 7.3 |
| TL/f | (9) | 1.13 | 1.07 | 1.11 | 1.11 | 1.11 |
| (R7 − R8)/(R7 + R8) | (10) | −0.20 | −0.53 | −0.16 | −0.02 | −0.69 |
| | EXP. No. | EXAMPLE 11 | EXAMPLE 12 | EXAMPLE 13 | EXAMPLE 14 | EXAMPLE 15 |
| f3/f1 | (1) | 8.5 | 10.1 | 7.0 | 6.0 | 11.1 |
| f2/f1 | (2) | −2.2 | −2.1 | −2.1 | −2.3 | −3.0 |
| D6/f | (3) | 0.12 | 0.12 | 0.12 | 0.11 | 0.10 |
| D6/D8 | (4) | 2.95 | 2.38 | 3.10 | 5.42 | 5.42 |
| vd1 | (5) | 54.88 | 54.88 | 54.88 | 54.87 | 54.87 |
| vd2 | (6) | 23.63 | 23.63 | 23.63 | 25.48 | 25.48 |
| D2/D1 | (7) | 0.11 | 0.12 | 0.11 | 0.10 | 0.10 |
| |R3/f2| | (8) | 7.3 | 6.3 | 7.6 | 9.0 | 7.1 |
| TL/f | (9) | 1.11 | 1.11 | 1.11 | 1.15 | 1.12 |
| (R7 − R8)/(R7 + R8) | (10) | −1.74 | −0.05 | −1.65 | −0.02 | −0.11 |

TABLE 28

EXAMPLE 14 • BASIC LENS DATA

| Si | Ri | Di | Ndj | vdj |
|---|---|---|---|---|
| 0 | ∞ | −0.1509 | | |
| 1* | 1.5589 | 0.7479 | 1.544884 | 54.87 |
| 2* | 10.3299 | 0.0748 | | |
| 3* | 67.9987 | 0.3604 | 1.613986 | 25.48 |
| 4* | 4.3312 | 0.3756 | | |
| 5* | 7.6232 | 0.4787 | 1.544884 | 54.87 |
| 6* | 25.4831 | 0.4420 | | |
| 7* | −4.2500 | 0.4337 | 1.633506 | 23.63 |
| 8* | −4.4435 | 0.0816 | | |
| 9* | 1.4438 | 0.5773 | 1.544884 | 54.87 |
| 10* | 1.0262 | 0.5665 | | |
| 11 | ∞ | 0.1450 | 1.516330 | 64.14 |
| 12 | ∞ | 0.4011 | | |

*ASPHERICAL SURFACE

TABLE 29

EXAMPLE 15 • BASIC LENS DATA

| Si | Ri | Di | Ndj | vdj |
|---|---|---|---|---|
| 0 | ∞ | −0.1509 | | |
| 1* | 1.5517 | 0.7480 | 1.544884 | 54.87 |
| 2* | 12.1695 | 0.0747 | | |
| 3* | 67.8350 | 0.3603 | 1.613986 | 25.48 |
| 4* | 5.3910 | 0.4778 | | |
| 5* | −10.0271 | 0.4788 | 1.544884 | 54.87 |
| 6* | −6.6952 | 0.4419 | | |
| 7* | −3.5241 | 0.4114 | 1.633506 | 23.63 |
| 8* | −4.3631 | 0.0816 | | |
| 9* | 1.5001 | 0.5413 | 1.544884 | 54.87 |
| 10* | 1.0720 | 0.5665 | | |
| 11 | ∞ | 0.1450 | 1.516330 | 64.14 |
| 12 | ∞ | 0.4258 | | |

*ASPHERICAL SURFACE

TABLE 30

EXAMPLE 14 • ASPHERICAL SURFACE DATA

| SURF. No. | K | A3 | A4 | A5 | A6 |
|---|---|---|---|---|---|
| 1 | −1.662001E+01 | 1.994470E−03 | 5.598852E−01 | 9.738872E−02 | −2.767602E+00 |
| 2 | −9.800000E+01 | −2.702404E−02 | −1.027593E−01 | 3.372026E−01 | −1.700423E+00 |
| 3 | 0.000000E+00 | 5.916461E−03 | −2.423799E−01 | 6.144046E−02 | 1.217423E+00 |
| 4 | −9.823987E−02 | 6.637656E−02 | −4.059275E−01 | 1.019808E+00 | −1.053998E+00 |
| 5 | −1.530000E+02 | −4.837280E−02 | 3.760461E−01 | −1.717997E+00 | 3.161316E+00 |
| 6 | 1.000009E+00 | 7.462436E−02 | −2.511074E−01 | 4.479026E−01 | −8.571869E−01 |
| 7 | −8.830001E+01 | 4.059043E−02 | 4.502405E−01 | −9.820517E−01 | 1.285072E+00 |
| 8 | −1.232933E+01 | 1.420659E−01 | −5.701991E−01 | 2.339214E+00 | −4.745851E+00 |
| 9 | −5.004966E+01 | 4.786310E−01 | −6.042990E−01 | −3.090807E−01 | 7.900376E−01 |
| 10 | −3.000009E+00 | 1.322402E−01 | −1.061878E+00 | 2.504915E+00 | −3.446342E+00 |

| | A7 | A8 | A9 | A10 | A11 |
|---|---|---|---|---|---|
| 1 | 5.093527E+00 | −4.827266E+00 | 4.244181E+00 | −2.456259E+00 | −4.851014E+00 |
| 2 | 3.582577E+00 | −2.834564E+00 | −4.859394E−01 | 9.836054E−01 | 1.366987E+00 |
| 3 | −4.198199E+00 | 7.077241E+00 | −5.878964E+00 | 4.929873E+00 | −1.332374E+01 |
| 4 | −1.154677E+00 | 6.107961E+00 | −7.899655E+00 | 1.675850E−01 | 1.345386E+01 |
| 5 | −2.137393E+00 | −2.125297E+00 | 4.407619E+00 | −8.750455E−01 | −2.650922E+00 |
| 6 | 1.005187E+00 | −9.721066E−01 | 4.293548E−01 | 1.089662E+00 | −1.797813E+00 |
| 7 | −1.376548E+00 | 1.234592E+00 | −1.328617E+00 | 1.367622E+00 | −9.376208E−01 |

TABLE 30-continued

EXAMPLE 14 • ASPHERICAL SURFACE DATA

| | | | | | |
|---|---|---|---|---|---|
| 8 | 5.688972E+00 | −3.864247E−00 | 6.501571E−01 | 8.668486E−01 | −3.407692E−01 |
| 9 | −3.564520E−01 | −5.234514E−02 | 1.335911E−02 | 4.469338E−02 | 1.228212E−02 |
| 10 | 2.526907E+00 | −5.833773E−01 | −4.092128E−01 | 2.552543E−01 | 2.390740E−03 |

| | A12 | A13 | A14 | A15 | A16 |
|---|---|---|---|---|---|
| 1 | 8.529538E+00 | 1.926091E+00 | −1.283303E+01 | 9.990947E+00 | −2.546190E+00 |
| 2 | 9.020008E−03 | −4.283265E+00 | 4.404749E+00 | −1.348023E+00 | −1.645497E−02 |
| 3 | 2.207439E+01 | −1.406158E+01 | −2.345879E+00 | 7.191354E+00 | −2.552063E+00 |
| 4 | −2.244198E+01 | 2.122327E+01 | −1.339348E+01 | 5.604988E+00 | −1.190697E+00 |
| 5 | 1.045523E+00 | 1.062413E+00 | −3.621622E−01 | −4.182344E−01 | 1.887933E−01 |
| 6 | −1.573986E−02 | 2.195642E+00 | −2.195200E+00 | 9.245564E−01 | −1.494191E−01 |
| 7 | 3.882396E−01 | −1.026495E−01 | 3.482355E−02 | −2.372085E−02 | 7.858774E−03 |
| 8 | −2.028422E−01 | 9.906753E−02 | 4.557598E−02 | −3.363059E−02 | 5.333931E−03 |
| 9 | −3.261780E−02 | 1.373408E−02 | −2.559234E−03 | 3.745011E−04 | −5.059829E−05 |
| 10 | −9.206538E−04 | −3.675628E−02 | 2.342415E−02 | −5.747746E−03 | 5.201150E−04 |

TABLE 31

EXAMPLE 15 • ASPHERICAL SURFACE DATA

| SURF. No. | K | A3 | A4 | A5 | A6 |
|---|---|---|---|---|---|
| 1 | −1.661968E+01 | −1.001091E−02 | 6.414825E−01 | −4.834842E−01 | 9.451157E−01 |
| 2 | −9.800000E−01 | −7.057023E−03 | −2.344211E−01 | 1.296151E+00 | −7.420864E+00 |
| 3 | 2.030001E+01 | −1.656705E−02 | −2.472372E−01 | 1.124190E+00 | −6.124648E+00 |
| 4 | −9.804464E−02 | 6.965972E−02 | −5.137852E−01 | 2.081585E+00 | −6.557301E+00 |
| 5 | 1.000009E+00 | 1.833697E−01 | −4.485171E−01 | −1.851231E+00 | 9.637982E+00 |
| 6 | 1.260825E−04 | 1.072057E−01 | 1.090396E+00 | −1.238070E+01 | 5.308647E+01 |
| 7 | −8.830001E+01 | −2.724368E−02 | 8.478033E−01 | −3.575196E+00 | 1.136761E+01 |
| 8 | −1.232932E+01 | 1.013356E−01 | −3.698592E−01 | 1.889138E+00 | −4.740764E+00 |
| 9 | −5.004966E+01 | 4.720680E−01 | −7.850973E−01 | 5.602258E−01 | −1.546355E+00 |
| 10 | −3.000009E+00 | 1.141694E−01 | −1.041113E+00 | 2.728863E+00 | −4.805668E+00 |

| SURF. No. | A7 | A8 | A9 | A10 | A11 | A12 |
|---|---|---|---|---|---|---|
| 1 | −9.295454E+00 | 2.871818E+01 | −4.357278E+01 | 3.620708E+01 | −1.577544E+01 | 2.785068E+00 |
| 2 | 2.406558E+01 | −4.871171E+01 | 6.355979E+01 | −5.157143E+01 | 2.344193E+01 | −4.535298E+00 |
| 3 | 2.088744E+01 | −4.584212E+01 | 6.628776E+01 | −5.970829E+01 | 2.987684E+01 | −6.280523E+00 |
| 4 | 1.706139E+01 | −3.461227E+01 | 5.074081E+01 | −4.777118E+01 | 2.510409E+01 | −5.501663E+00 |
| 5 | −1.353605E+01 | −1.252227E+01 | 6.439297E+01 | −8.549396E+01 | 5.177907E+01 | −1.226156E+01 |
| 6 | −1.286913E+02 | 1.923636E+02 | −1.814400E+02 | 1.054949E+02 | −3.460109E+01 | 4.913246E+00 |
| 7 | −2.419028E+01 | 3.348459E+01 | −3.058899E+01 | 1.792322E+01 | −6.108252E+00 | 9.177311E−01 |
| 8 | 8.562247E+00 | −1.125810E+01 | 9.672872E+00 | −5.036014E+00 | 1.438046E+00 | −1.725862E−01 |
| 9 | 3.449000E+00 | −3.952901E+00 | 2.545047E+00 | −9.333590E−01 | 1.815323E−01 | −1.448102E−02 |
| 10 | 5.594656E+00 | −4.278359E+00 | 2.124665E+00 | −6.580447E−01 | 1.150239E−01 | −8.628135E−03 |

What is claimed is:

1. An image capturing lens substantially consisting of five lenses, composed of:

an aperture stop;

a first lens having a positive refractive power with the object side surface being formed in a convex shape toward the object side;

a second lens having a negative refractive power with the object side surface being formed in a convex shape toward the object side;

a third lens;

a fourth lens having the object side surface being formed in a concave shape toward the object side; and a fifth lens having a negative refractive power with a region in which the negative refractive power is gradually reduced outwardly in a radial direction from the optical axis, arranged in this order from the object side, wherein the image capturing lens is configured to satisfy a conditional expression given below:

$$-4.0 < f2/f1 \qquad (2\text{-}3),$$

$$3.3 < |R3/f2| < 40.0 \qquad (8\text{-}2),$$

$$1.0 < TL/f < 1.2 \qquad (9),$$

where:

f2 is a focal length of the second lens;

f1 is a focal length of the first lens;

R3 is a paraxial radius of curvature of the object side surface of the second lens;

TL is a length from the object side surface of the first lens to the image forming surface on the optical axis; and f is a focal length of the entire system.

2. The image capturing lens of claim 1, wherein the third lens has a positive refractive power.

3. The image capturing lens of claim 1, wherein the image capturing lens is configured to satisfy a conditional expression given below:

$$4.2 < f3/f1 < 25.0 \qquad (1),$$

where:

f1 is a focal length of the first lens; and f3 is a focal length of the third lens.

4. The image capturing lens of claim 1, wherein the fifth lens has a meniscus shape with a convex surface on the object side near the optical axis.

5. The image capturing lens of claim 1, further satisfying a conditional expression given below:

$$0.09<D6/f<0.20 \quad (3),$$

where:

f is a focal length of the entire system; and

D6 is a distance between the third and fourth lenses on the optical axis.

6. The image capturing lens of claim 1, further satisfying a conditional expression given below:

$$2.00<D6/D8<6.00 \quad (4),$$

where:

D6 is a distance between the third and fourth lenses on the optical axis; and

D8 is a distance between the fourth and fifth lenses on the optical axis.

7. The image capturing lens of claim 1, wherein the third lens has a convex surface on the object side near the optical axis.

8. The image capturing lens of claim 1, further satisfying conditional expressions given below:

$$vd1>50 \quad (5); \text{ and}$$

$$vd2<30 \quad (6),$$

where:

vd1 is an Abbe number of the first lens with respect to the d-line; and vd2 is an Abbe number of the second lens with respect to the d-line.

9. The image capturing lens of claim 1, further satisfying a conditional expression given below:

$$0.09<D2/D1<0.25 \quad (7),$$

where:

D1 a axial thickness of the first lens; and

D2 is a distance between the first and second lenses on the optical axis.

10. The image capturing lens of claim 1, further satisfying a conditional expression given below:

$$-1.9<(R7-R8)/(R7+R8)<0 \quad (10),$$

where:

R7 is a paraxial radius of curvature of the object side surface of the fourth lens; and R8 is a paraxial radius of curvature of the image side surface of the fourth lens.

11. The image capturing lens of claim 1, further satisfying a conditional expression given below:

$$4.2<f3/f1<20.0 \quad (1-1),$$

where:

f1 is a focal length of the first lens; and f3 is a focal length of the third lens.

12. The image capturing lens of claim 1, further satisfying a conditional expression given below:

$$0.09<D6/f<0.18 \quad (3-1),$$

where:

f is a focal length of the entire system; and

D6 is a distance between the third and fourth lenses on the optical axis.

13. The image capturing lens of claim 1, further satisfying a conditional expression given below:

$$2.20<D6/D8<5.60 \quad (4-1),$$

where:

D6 is a distance between the third and fourth lenses on the optical axis; and

D8 is a distance between the fourth and fifth lenses on the optical axis.

14. The image capturing lens of claim 1, further satisfying conditional expressions given below:

$$vd1>53 \quad (5-1); \text{ and}$$

$$vd2<25 \quad (6-1),$$

where:

vd1 is an Abbe number of the first lens with respect to the d-line; and vd2 is an Abbe number of the second lens with respect to the d-line.

15. The image capturing lens of claim 1, further satisfying a conditional expression given below:

$$0.09<D2/D1<0.22 \quad (7-1),$$

where:

D1 is a axial thickness of the first lens; and

D2 is a distance between the first and second lenses on the optical axis.

16. The image capturing lens of claim 1, further satisfying a conditional expression given below:

$$1.05<TL/f<1.15 \quad (9-1),$$

where:

TL is a length from the object side surface of the first lens to the image forming surface on the optical axis; and f is a focal length of the entire system.

17. An image capturing apparatus provided with the image capturing lens of claim 1.

18. An image capturing lens substantially consisting of five lenses, composed of:

an aperture stop;

a first lens having a positive refractive power with the object side surface being formed in a convex shape toward the object side;

a second lens having a negative refractive power with the object side surface being formed in a convex shape toward the object side;

a third lens;

a fourth lens having the object side surface being formed in a concave shape toward the object side; and a fifth lens having a negative refractive power, a convex surface on the object side near an optical axis and a region in which the negative refractive power is gradually reduced outwardly in a radial direction from the optical axis, arranged in this order from the object side, wherein the image capturing lens is configured to satisfy a conditional expression given below:

$$-4.0<f2/f1 \quad (2-3),$$

$$0.09<D2/D1<0.25 \quad (7),$$

$$3.3<|R3/f2| \quad (8-3),$$

$$1.0<TL/f<1.2 \quad (9),$$

where:
f2 is a focal length of the second lens;
f1 is a focal length of the first lens;
D1 is an axial thickness of the first lens;
D2 is a distance between the first and second lenses on the opticalaxis;
R3 is a paraxial radius of curvature of the object side surface of the second lens;
TL is a length from the object side surface of the first lens to the image forming surface on the optical axis; and
f is a focal length of the entire system.

19. The image capturing lens of claim 18, wherein the third lens has a positive refractive power.

20. The image capturing lens of claim 18, wherein the image capturing lens is configured to satisfy a conditional expression given below:

$$4.2 < f3/f1 < 25.0 \qquad (1),$$

where:
f1 is a focal length of the first lens; and
f3 is a focal length of the third lens.

21. The image capturing lens of claim 18, wherein the fifth lens has a meniscus shape with a convex surface on the object side near the optical axis.

22. The image capturing lens of claim 18, further satisfying a conditional expression given below:

$$0.09 < D6/f < 0.20 \qquad (3),$$

where:
f is a focal length of the entire system; and
D6 is a distance between the third and fourth lenses on the optical axis.

23. The image capturing lens of claim 18, further satisfying a conditional expression given below:

$$2.00 < D6/D8 < 6.00 \qquad (4),$$

where:
D6 is a distance between the third and fourth lenses on the optical axis; and
D8 is a distance between the fourth and fifth lenses on the optical axis.

24. The image capturing lens of claim 18, wherein the third lens has a convex surface on the object side near the optical axis.

25. The image capturing lens of claim 18, further satisfying conditional expressions given below:

$$vd1 > 50 \qquad (5); \text{ and}$$

$$vd2 < 30 \qquad (6),$$

where:
vd1 is an Abbe number of the first lens with respect to the d-line; and
vd2 is an Abbe number of the second lens with respect to the d-line.

26. The image capturing lens of claim 18, further satisfying a conditional expression given below:

$$-1.9 < (R7-R8)/(R7+R8) < 0 \qquad (10),$$

where:
R7 is a paraxial radius of curvature of the object side surface of the fourth lens; and
R8 is a paraxial radius of curvature of the image side surface of the fourth lens.

27. The image capturing lens of claim 18, further satisfying a conditional expression given below:

$$4.2 < f3/f1 < 20.0 \qquad (1-1),$$

where:
f1 is a focal length of the first lens; and
f3 is a focal length of the third lens.

28. The image capturing lens of claim 18, further satisfying a conditional expression given below:

$$0.09 < D6/f < 0.18 \qquad (3-1),$$

where:
f is a focal length of the entire system; and
D6 is a distance between the third and fourth lenses on the optical axis.

29. The image capturing lens of claim 18, further satisfying a conditional expression given below:

$$2.20 < D6/D8 < 5.60 \qquad (4-1),$$

where:
D6 is a distance between the third and fourth lenses on the optical axis; and
D8 is a distance between the fourth and fifth lenses on the optical axis.

30. The image capturing lens of claim 18, further satisfying conditional expressions given below:

$$vd1 > 53 \qquad (5-1); \text{ and}$$

$$vd2 < 25 \qquad (6-1),$$

where:
vd1 is an Abbe number of the first lens with respect to the d-line; and
vd2 is an Abbe number of the second lens with respect to the d-line.

31. The image capturing lens of claim 18, further satisfying a conditional expression given below:

$$0.09 < D2/D1 < 0.22 \qquad (7-1),$$

where:
D1 is a axial thickness of the first lens; and
D2 is a distance between the first and second lenses on the optical axis.

32. The image capturing lens of claim 18, further satisfying a conditional expression given below:

$$1.05 < TL/f < 1.15 \qquad (9-1),$$

where:
TL is a length from the object side surface of the first lens to the image forming surface on the optical axis; and
f is a focal length of the entire system.

33. An image capturing apparatus provided with the image capturing lens of claim 18.

* * * * *